United States Patent
Kakinada et al.

(10) Patent No.: US 10,492,204 B2
(45) Date of Patent: Nov. 26, 2019

(54) METHODS AND APPARATUS FOR UTILIZATION OF QUASI-LICENSED WIRELESS SPECTRUM FOR IOT (INTERNET-OF-THINGS) SERVICES

(71) Applicant: Charter Communications Operating, LLC, St. Louis, MO (US)

(72) Inventors: Umamaheswar Kakinada, Carpentersville, IL (US); Don Gunasekara, Reston, VA (US); Ahmed Bencheikh, Lorton, VA (US); Shane Newberg, Aurora, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 62 days.

(21) Appl. No.: 15/814,133

(22) Filed: Nov. 15, 2017

(65) Prior Publication Data

US 2019/0150134 A1    May 16, 2019

(51) Int. Cl.
*H04W 4/00* (2018.01)
*H04W 72/04* (2009.01)
(Continued)

(52) U.S. Cl.
CPC ......... *H04W 72/048* (2013.01); *H04L 67/125* (2013.01); *H04L 69/18* (2013.01);
(Continued)

(58) Field of Classification Search
None
See application file for complete search history.

(56) References Cited

U.S. PATENT DOCUMENTS 8,189,465 B1   5/2012  Pawar et al.
8,997,136 B2   3/2015  Brooks et al.
(Continued)

OTHER PUBLICATIONS

Signaling Protocols and Procedures for Citizens Broadband Radio Service (CBRS): Spectrum Access System, (SAS)—Citizens Broadband Radio Service Device (CBSD) Interface Technical Specification—Document WINNF-TS-0016, Version V1.2.1, Jan. 3, 2018.
(Continued)

*Primary Examiner* — Farah Faroul
(74) *Attorney, Agent, or Firm* — Gazdzinski & Associates, PC

(57) ABSTRACT

Methods and apparatus for providing quasi-licensed spectrum access within an area or application to enable "end to end" IoT (Internet-of-Things) device connectivity. In one embodiment, the quasi-licensed spectrum utilizes 3.5 GHz CBRS (Citizens Broadband Radio Service) spectrum allocated by a Federal or commercial SAS (Spectrum Access System) to a managed content delivery network that includes one or more wireless access nodes (e.g., CBSDs (Citizens Broadband radio Service Devices) and IoT hubs or gateways) in data communication with a controller. In one variant, the controller dynamically allocates (i) spectrum within the area or venue within CBRS bands, and (ii) MSO (multiple systems operator) users to CBRS bands or IoT bands (e.g., public ISM (industrial, scientific and medical)) bands to maximize connectivity and performance. In another variant, the controller cooperates with a provisioning server to implement a client device application program on an IoT device which enables inter-RAT (radio access technology) connectivity.

20 Claims, 32 Drawing Sheets

(51) Int. Cl.
  *H04L 29/06* (2006.01)
  *H04L 29/08* (2006.01)
  *H04W 4/80* (2018.01)
  *H04W 16/14* (2009.01)
  *H04W 40/12* (2009.01)
  *H04W 28/02* (2009.01)
  *H04W 72/08* (2009.01)

(52) U.S. Cl.
  CPC ............ *H04W 4/80* (2018.02); *H04W 16/14* (2013.01); *H04W 72/0446* (2013.01); *H04W 28/0268* (2013.01); *H04W 40/12* (2013.01); *H04W 72/0453* (2013.01); *H04W 72/085* (2013.01)

(56) References Cited

U.S. PATENT DOCUMENTS

| | | |
|---|---|---|
| 9,166,891 B2 | 10/2015 | Hu et al. |
| 9,413,651 B2 | 8/2016 | Tsym et al. |
| 9,564,932 B1 | 2/2017 | Pack et al. |
| 9,591,491 B2 | 3/2017 | Tapia et al. |
| 9,612,816 B2 | 4/2017 | Choi et al. |
| 9,654,149 B2 | 5/2017 | Piipponen et al. |
| 9,730,135 B1 | 8/2017 | Rahman |
| 9,730,143 B2 | 8/2017 | Gormley et al. |
| 2010/0309806 A1 | 12/2010 | Wu et al. |
| 2013/0336175 A1 | 12/2013 | Um et al. |
| 2015/0071239 A1 | 3/2015 | Zhang et al. |
| 2016/0127185 A1 | 5/2016 | McAllister |
| 2016/0165066 A1 | 6/2016 | Yang et al. |
| 2017/0155703 A1* | 6/2017 | Hao ............... H04L 67/12 |
| 2017/0188241 A1 | 6/2017 | Mueck et al. |
| 2017/0208540 A1* | 7/2017 | Egner ............. H04W 4/029 |
| 2017/0237767 A1 | 8/2017 | George et al. |
| 2017/0257750 A1 | 9/2017 | Gunasekara et al. |
| 2017/0295578 A1 | 10/2017 | Khoshnevisan et al. |
| 2017/0318472 A1 | 11/2017 | Yu et al. |
| 2017/0359731 A1 | 12/2017 | Soldati et al. |
| 2018/0007587 A1 | 1/2018 | Feldman et al. |
| 2018/0115903 A1 | 4/2018 | Badic et al. |
| 2018/0132112 A1 | 5/2018 | Khoshnevisan et al. |
| 2018/0316563 A1* | 11/2018 | Kumar ............. H04L 41/0893 |
| 2018/0352386 A1 | 12/2018 | Gunasekara et al. |
| 2019/0021012 A1 | 1/2019 | Beck et al. |
| 2019/0081690 A1 | 3/2019 | Mueck et al. |
| 2019/0098510 A1 | 3/2019 | Guo et al. |
| 2019/0115950 A1 | 4/2019 | Kakinada et al. |

OTHER PUBLICATIONS

Deering et al., Internet Protocol, Version 6 (Ipv6) Specification, IETF RFC 2460 (Dec. 1998).

Internet Protocol DARPA Internet Program Protocol Specification, IETF RFC 791 (Sep. 1981).

* cited by examiner

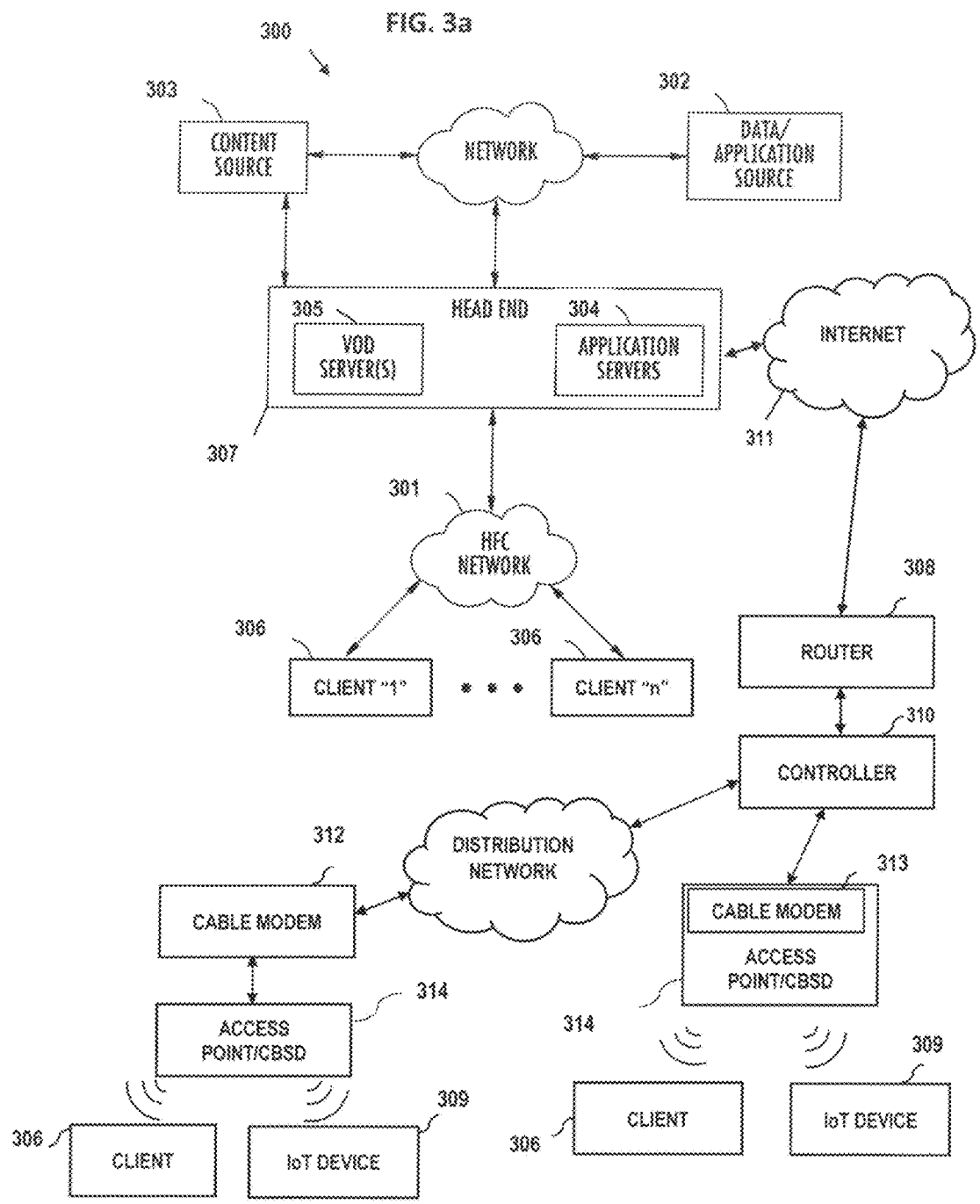

METHODS AND APPARATUS FOR UTILIZATION OF QUASI-LICENSED WIRELESS SPECTRUM FOR IOT (INTERNET-OF-THINGS) SERVICES

RELATED APPLICATIONS

This application is related to co-owned and co-pending U.S. patent application Ser. No. 15/677,940 filed Aug. 15, 2017 and entitled "METHODS AND APPARATUS FOR DYNAMIC CONTROL AND UTILIZATION OF QUASI-LICENSED WIRELESS SPECTRUM", and Ser. No. 15/785,283 filed Oct. 16, 2017 METHODS AND APPARATUS FOR COORDINATED UTILIZATION OF QUASI-LICENSED WIRELESS SPECTRUM,", each of the foregoing incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of wireless networks and specifically, in one or more exemplary embodiments, to methods and apparatus for dynamically controlling and optimizing utilization of quasi-licensed radio frequency spectrum, such as for example those providing connectivity via Citizens Broadband Radio Service (CBRS) technologies and/or IoT ("Internet of Things") technologies.

2. Description of Related Technology

A multitude of wireless networking technologies, also known as Radio Access Technologies ("RATs"), provide the underlying means of connection for radio-based communication networks to user devices. Such RATs often utilize licensed radio frequency spectrum (i.e., that allocated by the FCC per the Table of Frequency Allocations as codified at Section 2.106 of the Commission's Rules. In the United States, regulatory responsibility for the radio spectrum is divided between the U.S. Federal Communications Commission (FCC) and the National Telecommunications and Information Administration (NTIA). The FCC, which is an independent regulatory agency, administers spectrum for non-Federal use (i.e., state, local government, commercial, private internal business, and personal use) and the NTIA, which is an operating unit of the Department of Commerce, administers spectrum for Federal use (e.g., use by the Army, the FAA, and the FBI). Currently only frequency bands between 9 kHz and 275 GHz have been allocated (i.e., designated for use by one or more terrestrial or space radio communication services or the radio astronomy service under specified conditions). For example, a typical cellular service provider might utilize spectrum for so-called "3G" (third generation) and "4G" (fourth generation) wireless communications as shown in Table 1 below:

TABLE 1

| Technology | Bands |
| --- | --- |
| 3G | 850 MHz Cellular, Band 5 (GSM/GPRS/EDGE). |
|  | 1900 MHz PCS, Band 2 (GSM/GPRS/EDGE). |
|  | 850 MHz Cellular, Band 5 (UMTS/HSPA+ up to 21 Mbit/s). |
|  | 1900 MHz PCS, Band 2 (UMTS/HSPA+ up to 21 Mbit/s). |
| 4G | 700 MHz Lower B/C, Band 12/17 (LTE). |
|  | 850 MHz Cellular, Band 5 (LTE). |
|  | 1700/2100 MHz AWS, Band 4 (LTE). |
|  | 1900 MHz PCS, Band 2 (LTE). |
|  | 2300 MHz WCS, Band 30 (LTE). |

Alternatively, unlicensed spectrum may be utilized, such as that within the so-called ISM-bands. The ISM bands are defined by the ITU Radio Regulations (Article 5) in footnotes 5.138, 5.150, and 5.280 of the Radio Regulations. In the United States, uses of the ISM bands are governed by Part 18 of the Federal Communications Commission (FCC) rules, while Part 15 contains the rules for unlicensed communication devices, even those that share ISM frequencies. Table 2 below shows typical ISM frequency allocations:

TABLE 2

| Frequency range | Type | Center frequency | Availability | Licensed users |
| --- | --- | --- | --- | --- |
| 6.765 MHz-6.795 MHz | A | 6.78 MHz | Subject to local acceptance | Fixed service & mobile service |
| 13.553 MHz-13.567 MHz | B | 13.56 MHz | Worldwide | Fixed & mobile services except aeronautical mobile (R) service |
| 26.957 MHz-27.283 MHz | B | 27.12 MHz | Worldwide | Fixed & mobile service except aeronautical mobile service, CB radio |
| 40.66 MHz-40.7 MHz | B | 40.68 MHz | Worldwide | Fixed, mobile services & earth exploration-satellite service |
| 433.05 MHz-434.79 MHz | A | 433.92 MHz | only in Region 1, subject to local acceptance | amateur service & radiolocation service, additional apply the provisions of footnote 5.280 |

TABLE 2-continued

| Frequency range | Type | Center frequency | Availability | Licensed users |
|---|---|---|---|---|
| 902 MHz-928 MHz | B | 915 MHz | Region 2 only (with some exceptions) | Fixed, mobile except aeronautical mobile & radiolocation service; in Region 2 additional amateur service |
| 2.4 GHz-2.5 GHz | B | 2.45 GHz | Worldwide | Fixed, mobile, radiolocation, amateur & amateur-satellite service |
| 5.725 GHz-5.875 GHz | B | 5.8 GHz | Worldwide | Fixed-satellite, radiolocation, mobile, amateur & amateur-satellite service |
| 24 GHz-24.25 GHz | B | 24.125 GHz | Worldwide | Amateur, amateur-satellite, radiolocation & earth exploration-satellite service (active) |
| 61 GHz-61.5 GHz | A | 61.25 GHz | Subject to local acceptance | Fixed, inter-satellite, mobile & radiolocation service |
| 122 GHz-123 GHz | A | 122.5 GHz | Subject to local acceptance | Earth exploration-satellite (passive), fixed, inter-satellite, mobile, space research (passive) & amateur service |
| 244 GHz-246 GHz | A | 245 GHz | Subject to local acceptance | Radiolocation, radio astronomy, amateur & amateur-satellite service |

ISM bands are also been shared with (non-ISM) license-free communications applications such as wireless sensor networks in the 915 MHz and 2.450 GHz bands, as well as wireless LANs and cordless phones in the 915 MHz, 2.450 GHz, and 5.800 GHz bands.

Additionally, the 5 GHz band has been allocated for use by, e.g., WLAN equipment, as shown in Table 3:

TABLE 3

| Band Name | Frequency Band | Dynamic Freq. Selection Required (DFS)? |
|---|---|---|
| UNII-1 | 5.15 to 5.25 GHz | No |
| UNII-2 | 5.25 to 5.35 GHz | Yes |
| UNII-2 Extended | 5.47 to 5.725 GHz | Yes |
| UNII-3 | 5.725 to 5.825 GHz | No |

User client devices (e.g., smartphone, tablet, phablet, laptop, smartwatch, or other wireless-enabled devices, mobile or otherwise) generally support multiple RATs that enable the devices to connect to one another, or to networks (e.g., the Internet, intranets, or extranets), often including RATs associated with both licensed and unlicensed spectrum. In particular, wireless access to other networks by client devices is made possible by wireless technologies that utilize networked hardware, such as a wireless access point ("WAP" or "AP"), small cells, femtocells, or cellular towers, serviced by a backend or backhaul portion of service provider network (e.g., a cable network). A user may generally access the network at a "hotspot," a physical location at which the user may obtain access by connecting to modems, routers, APs, etc. that are within wireless range.

CBRS—

In 2016, the FCC made available Citizens Broadband Radio Service (CBRS) spectrum in the 3550-3700 MHz (3.5 GHz) band, making 150 MHz of spectrum available for mobile broadband and other commercial users. The CBRS is unique, in that it makes available a comparatively large amount of spectrum (frequency bandwidth) without the need for expensive auctions, and without ties to a particular operator or service provider.

Moreover, the CBRS spectrum is suitable for shared use between government and commercial interests, based on a system of existing "incumbents," including the Department of Defense (DoD) and fixed satellite services. Specifically, a three-tiered access framework for the 3.5 GHz is used; i.e., (i) an Incumbent Access tier 102, (ii) Priority Access tier 104, and (iii) General Authorized Access tier 106. See FIG. 1*a*. The three tiers are coordinated through one or more dynamic Federal Spectrum Access Systems (FSAS) 122 as shown in FIG. 1*b*.

Incumbent Access (existing DOD and satellite) users 102 include authorized federal and grandfathered Fixed Satellite Service (FSS) users currently operating in the 3.5 GHz band shown in FIG. 1*a*. These users will be protected from harmful interference from Priority Access License (PAL) and General Authorized Access (GAA) users. The sensor networks, operated by Environmental Sensing Capability (ESC) operators, make sure that incumbents and others utilizing the spectrum are protected from interference.

The Priority Access tier 104 (including acquisition of spectrum for up to three years through an auction process) consists of Priority Access Licenses (PALs) that will be assigned using competitive bidding within the 3550-3650 MHz portion of the band. Each PAL is defined as a non-renewable authorization to use a 10 MHz channel in a single census tract for three years. Up to seven (7) total PALs may be assigned in any given census tract, with up to four PALs going to any single applicant. Applicants may acquire up to two-consecutive PAL terms in any given license area during the first auction.

The General Authorized Access tier 106 (for any user with an authorized 3.5 GHz device) is licensed-by-rule to permit open, flexible access to the band for the widest possible group of potential users. General Authorized Access users are permitted to use any portion of the 3550-3700 MHz band not assigned to a higher tier user and may also operate opportunistically on unused Priority Access channels. See FIG. 1c.

The FCC's three-tiered spectrum sharing architecture of FIG. 1a utilizes "fast-track" band (3550-3700 MHz) identified by PCAST and NTIA, while Tier 2 and 3 are regulated under a new Citizens Broadband Radio Service (CBRS). CBSDs (Citizens Broadband radio Service Devices—in effect, wireless access points) 126 (FIG. 1b) can only operate under authority of a centralized Spectrum Access System (SAS) 122. Rules are optimized for small-cell use, but also accommodate point-to-point and point-to-multipoint, especially in rural areas.

Under the FCC system, the standard FSAS 122 includes the following elements: (1) CBSD registration; (2) interference analysis; (3) incumbent protection; (4) PAL license validation; (5) CBSD channel assignment; (6) CBSD power limits; (7) PAL protection; and (8) FSAS-to-FSAS coordination. As shown in FIG. 1c, these functions are provided for by, inter alia, an incumbent detection (i.e., environmental sensing) function 127 configured to detect use by incumbents, and an incumbent information function 129 configured to inform the incumbent when use by another user occurs. An FCC database 131 is also provided, such as for PAL license validation, CBSD registration, and other functions.

An optional Domain Proxy (DP) 128 is also provided for in the FCC architecture. Each DP includes: (1) SAS interface GW including security; (2) directive translation between CBSD 126 and domain commands; (3) bulk CBSD directive processing; and (4) interference contribution reporting to the FSAS.

A domain is defined is any collection of CBSDs 126 that need to be grouped for management; e.g.: large enterprises, venues, stadiums, train stations. Domains can be even larger/broader in scope, such as for example a terrestrial operator network. Moreover, domains may or may not use private addressing. A Domain Proxy (DP) 128 can aggregate control information flows to Commercial SAS (CSAS), not shown, and generate performance reports, channel requests, heartbeats, etc.

CBSDs 126 can generally be categorized as either Category A or Category B. Category A CBSDs have an EIRP or Equivalent Isotropic Radiated Power of 30 dBm (1 Watt)/10 MHz, fixed indoor or outdoor location (with an antenna <6 m in length if outdoor). Category B CBSDs have 47 dBm EIRP (50 Watts)/10 MHz, and fixed outdoor location only. Professional installation of Category B CBSDs is required, and the antenna must be less than 6 m in length. All CBSD's have a vertical positioning accuracy requirement of +/−3 m. Terminals (i.e., user devices akin to UE) have 23 dBm EIRP (0.2 Watts)/10 MHz requirements, and mobility of the terminals is allowed.

In terms of spectral access, CBRS utilizes a time division duplex (TDD) multiple access architecture.

Unlicensed Spectrum Technologies—

Extant wireless technologies intended for use in the unlicensed spectrum (such as Wi-Fi and LTE-U and LTE-LAA) must coexist with other users in those bands, and hence necessarily employ contention management techniques to help optimize performance. For example, Wi-Fi utilizes a back-off mechanism for collision avoidance known as carrier-sense multiple access with collision avoidance ("CSMA/CA"). In particular, when a first network node or station receives a packet to be sent to another node or station, Wi-Fi (according to, e.g., the prevailing 802.11 standard under which the system operates) initiates physical carrier sensing and virtual carrier sensing mechanisms to determine whether the medium (e.g., a channel and/or frequency used by the Wi-Fi transceiver) is busy or occupied by other transmissions (physical and virtual carrier sensing). In addition to the conditions set by physical carrier sensing and virtual carrier sensing, the Wi-Fi CSMA/CA may impose further checks by a node to ensure that the channel on which the packet is to be sent is clear.

Likewise, LTE-U collision avoidance mechanisms (at least in theory) attempt to choose a free or idle channel (i.e., not in use) in which no other LTE-U node or Wi-Fi AP is operating; if a free channel is not found, the LTE-U node should apply duty cycle procedures that allow the node to share a channel with Wi-Fi and other LTE-U signals. In some circumstances, duty cycling parameters may be adapted to usage of other signals, e.g., in response to Wi-Fi usage.

However, even with such mechanisms, increasing numbers of users (whether users of wireless interfaces of the aforementioned standards, or others) invariably lead to "crowding" of the spectrum, including interference. Interference may also exist from non-user sources such as solar radiation, electrical equipment, military uses, etc. In effect, a given amount of spectrum has physical limitations on the amount of bandwidth it can provide, and as more users are added in parallel, each user potentially experiences more interference and degradation of performance. Simply stated, contention management has limits on the benefits it can provide.

Moreover, technologies such as Wi-Fi have limited range (due in part to the unlicensed spectral power mask imposed in those bands), and may suffer from spatial propagation variations (especially inside structures such as buildings) and deployment density issues. Wi-Fi has become so ubiquitous that, especially in high-density scenarios such as hospitality units (e.g., hotels), enterprises, crowded venues, and the like, the contention issues may be unmanageable, even with a plethora of Wi-Fi APs installed to compensate. Yet further, there is generally no coordination between such APs, each in effect contending for bandwidth on its backhaul with others.

Additionally, lack of integration with other services provided by e.g., a managed network operator, typically exists with unlicensed technology such as Wi-Fi. Wi-Fi typically acts as a "data pipe" opaquely carried by the network operator/service provider.

Whether individually or collectively, the foregoing factors can result in less-than-optimal user experience, since the coverage, reliability, and data throughput associated with the unlicensed technology may vary significantly as a function of time, location, and application, and opportunities for integration with other services or functionality of the network operator are lost.

IoT Devices—

IoT devices can use any number of lower- and higher-layer protocol stacks. Many are based on the IEEE Std. 802.15.4 WPAN MAC/PHY (including Zigbee and Thread), while others utilize BLE (Bluetooth Low Energy, also referred to colloquially as Bluetooth Smart). These technologies utilize unlicensed portions of the radio frequency spectrum (e.g., ISM bands in the U.S.) for communication, and may attempt to avoid interference or conflict with other ISM-band technologies such as Wi-Fi (IEEE Std. 802.11).

FIG. 2a is a graphical representation of radio frequency bands associated with such IEEE Std. 802.15.4 and Bluetooth Low Energy (BLE) wireless interfaces, and their relationship.

FIG. 2b shows the 5 MHz-spaced channels of 3 MHz width used by 802.15.4 in the same band(s) as IEEE Std. 802.11.

Currently, the following non-exhaustive list of exemplary technologies are available or under development for IoT applications:

Zigbee—ZigBee 3.0 is based on IEEE Std. 802.15.4, and operates at a nominal frequency of 2.4 GHz as well as 868 and 915 MHz (ISM), supports data rates on the order of 250 kbps, and has a range on the order of 10-100 meters. Zigbee radios use direct-sequence spread spectrum (DSSS) spectral access/coding, and binary phase-shift keying (BPSK) is used in the 868 and 915 MHz bands, and offset quadrature phase-shift keying (OQPSK) that transmits two bits per symbol is used for the 2.4 GHz band.

Z-Wave—Z-Wave technology is specified by the Z-Wave Alliance Standard ZAD12837 and ITU-T G.9959 (for PHY and MAC layers). It operates in the U.S. at a nominal frequency of 900 MHz (ISM), as shown in Table 4 below:

TABLE 4

| Region | Center frequency G.9959 MHz | Date rate G.9959 | Channel Width kHz |
|---|---|---|---|
| United States of America | $f_{US1}$ 916.00 | R3 | 400 |
| | $f_{US2}$ 908.40 | R2 | 300 |
| | | R1 | 300 |

R1 - Type 1 of supported data rate - 9.6 kbps
R2 - Type 2 of supported data rate - 40 kbps
R3 - Type 3 of supported data rate - 100 kbps Z-Wave has a range on the order of 30 meters, and supports full mesh networks without the need for a coordinator node (as in 802.15.4). It is scalable, enabling control of up to 232 devices. Z-Wave uses a simpler protocol than some others, which can ostensibly enable faster and simpler development. Z-Wave also supports AES128 encryption and IPv6.

6LowPAN—6LowPAN (IPv6 Low-power wireless Personal Area Network) is an IP-based network protocol technology (rather than an IoT application protocol technology such as Bluetooth or ZigBee), as set forth in RFC 6282. 6LowPAN defines encapsulation and header compression mechanisms, and is not tied to any particular PHY configuration. It can also be used along with multiple communications platforms, including Ethernet, Wi-Fi, 802.15.4 and sub-1 GHz ISM. The IPv6 (Internet Protocol version 6) stack enables embedded objects or devices to have their own unique IP address, and connect to the Internet. IPv6 provides a basic transport mechanism to e.g., enable complex control systems, and to communicate with devices via a low-power wireless network.

For instance, 6LowPAN can send IPv6 packets over an IEEE 802.15.4-based network which implements "open" IP standards such TCP, UDP, HTTP, COAP, MQTT, and websockets to enable end-to-end addressable nodes, allowing a router to connect the network to IP. Moreover, mesh router devices can route data destined for other devices, while hosts are able to sleep (and hence conserve power).

Thread—Thread is a royalty-free protocol based on various standards including IEEE Std. 802.15.4 (as the air-interface protocol) and 6LoWPAN. It is intended to offer an IP-based solution for IoT applications, and is designed to interoperate with existing IEEE Std. 802.15.4-compliant wireless silicon. Thread supports mesh networking using IEEE Std. 802.15.4 radio transceivers, and can handle numerous nodes, including use of authentication and encryption.

Bluetooth Smart/BLE—Bluetooth Smart or BLE is intended to provide considerably reduced power consumption and cost while maintaining a similar communication range to that of conventional Bluetooth radios. Devices that employ Bluetooth Smart features incorporate the Bluetooth Core Specification Version 4.0 (or higher—e.g., Version 4.2 announced in late 2014) with a combined basic-data-rate and low-energy core configuration for a RF transceiver, baseband and protocol stack. Version 4.2, via its Internet Protocol Support Profile, allows Bluetooth Smart sensors to access the Internet directly via 6LoWPAN connectivity (discussed supra). This IP connectivity enables use of existing IP infrastructure to manage Bluetooth Smart "edge" devices. In 2017, the Bluetooth SIG released Mesh Profile and Mesh Model specifications, which enable using Smart for many-to-many device communications. Moreover, many mobile operating systems including iOS, Android, Windows Phone, BlackBerry, and Linux, natively support Bluetooth Smart.

The Bluetooth 4.2 Core Specification specifies a frequency of 2.4 GHz (ISM band), supports data rates on the order of 1 Mbps, utilizes GFSK (Gaussian Frequency Shift Keying) modulation, and has a typical range on the order of 50 to 150 meters. BLE uses frequency hopping (FHSS) over 37 channels (0-36 in FIG. 1a) for (bidirectional) communication, and over 3 channels for (unidirectional) advertising. The Bluetooth 4.0 link-layer MTU is 27 bytes, while 4.2 used 251 bytes. Core specification 5.0 (adopted Dec. 6, 2016) yet further extends and improves upon features of the v4.2 specification.

A BLE device can operate in four (4) different device roles, each which may cause the devices to behave differently. Two of the roles are connection-based; i.e., a peripheral device is an advertiser that is connectable and can operate as a slave as part of a two-way (bidirectional) data connection, and a central device that monitors for advertisers, and can initiate connections operating as a master for those connections. Conversely, the other two device roles are used for unidirectional communications; i.e., a broadcaster (a non-connectable advertiser which, for example, merely broadcasts data from a sensor of the IoT device, or an observer that monitors for advertisements, but cannot initiate connections (e.g., the receiver for the above-referenced broadcaster). Peripheral devices that implement a GATT Server (storage/exchange architecture) can be branded as a "Bluetooth Smart" device.

Extant technologies adapted for intermediate range WAN (e.g., somewhere between cellular and WLAN) IoT functionality applications include Sigfox, Neul, and LoRaWAN. These are typically employed for much longer distances than the comparatively short-range PAN solutions described above.

Generally speaking, there are two (2) classes or types of IoT installations, whether within a premises or venue or more broadly distributed (such as within infrastructure of a populated area): (i) "transparent" installations, wherein the installed IoT end-devices are visible to network devices, whether within or external to the premises; and (ii) "proxy managed" installations, wherein the installed IoT end-devices are managed by a proxy device such as a hub or gateway, and may be invisible to network devices outside the proxy device. Some applications may also freely intermix these two types of installations, such as where some IoT devices are behind a proxy and utilize a proprietary protocol of a common manufacturer, while others are added "ad hoc" without regard to the proxy or proprietary protocol (and which do not inter-communicate therewith), as now described with respect to FIG. 2c.

Referring to FIG. 2c, in the first type of installation ("transparent"), individual IoT end-devices 202 within a premises or venue 200 may be networked according to various types of topologies (e.g., master-slave, peer-to-peer (P2P), coordinator-simple node, star, cluster, mesh, tree, or other), and may maintain their own status on the network via e.g., assignment of an externally accessible IP address. This makes such devices 202 externally accessible and addressable for, inter alia, remote network entities 106 via any interposed networks such as the Internet 201 and the service provider distribution network 201. For instance, a web server 206 operated by a manufacturer of an IoT-enabled sensor may be able to, assuming suitable permissions, communicate directly with the IoT device over the Internet 211 and interposed ISP modem 205 (e.g., DOCSIS cable modem, DSP modem, etc.), a router 207, and local wireless access node 209 (e.g., an IEEE Std. 802.15.4 coordinator or Bluetooth LE master) via its assigned IP address (e.g., an IPv4 or IPv6 address), such as to obtain data logged by the IoT sensor (e.g., temperature or pressure profile over time, vibration/seismic activity as a function of time, loss-of-power events, etc.), and/or "push" firmware or other updates to the device such as to implement new or enhanced functions. The assigned IP address may be globally unique (i.e., such that it is unique across the Internet 211 external to the premises), or alternatively locally unique (e.g., unique within its local topology, but not necessarily globally unique). The latter can be translated (via e.g., NAT or network address translation functions) into the former such as by a router 110 or other associated "edge" device configured to perform NAT.

In the second type of installation ("proxy managed"), a hub 212 or other intermediary device is interposed between the IoT end-device(s) 204 and the service provider distribution network 201 external to the premises, venue or other place where the device is installed (including the modem 205 and router 207). The hub 212 may include, as shown, its own internal wireless access interface, whereby the "managed" IoT devices 204 communicate with the hub 212 wirelessly so as to communicate data. The protocols used between the hub 212 and the managed IoT devices 204 may be proprietary (e.g., at the higher layers of the protocol stack, or even including proprietary PHY and lower layer protocols), and may even employ security measures such as encryption of data, password protection, etc. so as to maintain the managed IoT devices 104 and the hub itself less susceptible to surreptitious communications, MITM attacks, etc.

The web server 206 may communicate with the IoT proxy (hub) 212, such as to "pull" data from, or "push" data to, the IoT end-devices 204. For instance, in one model, the hub periodically polls or receives data from the IoT devices 204, and then reports this aggregated data to the web server 206 via a push/pull mechanism. For instance, the hub 212 may have an outward-facing API (application programming interface) whereby the web server 206 or other process can implement the API function (e.g., a data "GET"). However, such API functionality (and hub access in general) is typically highly restricted, primarily for security and privacy reasons. Given that the hub 212 can "talk" to the managed IoT devices 204, surreptitious access to the hub (and hence IoT devices 204) could result in a host of undesirable consequences, including third parties reprogramming the IoT device 204, obtaining private use or other data from the devices 204, accessing indigenous features of the device 204 (e.g., turning on/off a camera or motion detection function of a security system), corrupting or accessing a user's private data (including changing passwords for devices, so as to lock out the user akin to ransomware), and so forth.

Regardless of whether the "transparent" or "proxy managed" architectures referenced above are used for a particular IoT-enabled device, there is also setup and configuration required to enable data communication, including with other devices within the premises.

For instance, a wireless-enabled IoT device might require a complementary wireless access node (akin to a Wi-Fi AP) be installed and connected to a premises or venue network (e.g., as in the exemplary configuration shown in FIG. 2c herein), and may need to be placed at a particular location within the premises or venue such that sufficient connectivity exists. Moreover, the various layers of the IoT device stack may need to be configured, including for instance operational modes, passwords, permissions, and network addresses. Network addresses, protocols, APIs, etc. associated with one device may be wholly inapplicable for other devices in the same or different premises, venue or application.

Such connectivity-based placement restrictions can be significantly limiting on certain types of extant and envisioned IoT applications. For instance, where a number of sensors or other "end" IoT devices are contemplated for use across a broad area (e.g., pressure or seismic sensors on a large bridge, dam, railway, building, or other infrastructure element), comparatively short-range protocols such as 802.15.4, BLE, or even Wi-Fi are not well suited, since either (i) a large number of access nodes or hubs would need to be placed to maintain connectivity with each end device/sensor, each requiring its own backhaul to a larger node or hub, or (ii) the devices would need to be "meshed" or "daisy-chained to great degrees, which is both unwieldy from a communications perspective, and potentially introduces reliability failure issues (e.g., "weakest link in the chain" type effects for serialized architectures).

Improvements Needed

Based on the foregoing, improved apparatus and methods are needed to support diverse types and installations of IoT devices (including those with different capabilities and bandwidth needs) across multiple access technologies and radio frequency bands, and potentially over larger distances. Ideally, such methods and apparatus would be configured to optimize access, bandwidth and routing needs of the IoT devices, including those within a prescribed area, application or venue.

SUMMARY

The present disclosure addresses the foregoing needs by providing, inter alia, methods and apparatus for dynamically controlling access to and utilization of quasi-licensed spectrum (such as for example that of CBRS) to provide IoT device connectivity within a prescribed service area, application, or apparatus.

In one aspect, a method for providing IoT device connectivity is disclosed. In one embodiment, the device includes a first wireless interface configured to use a first wireless protocol in a first frequency band, and the method includes: establishing wireless communication according to the first wireless protocol with an access node, the access node comprising a second wireless interface configured to use a second wireless protocol, the second wireless protocol configured to use a quasi-licensed spectral band; establishing wireless communication according to the second wireless protocol with a second access node, the second access node comprising a wireless interface configured to use the second wireless protocol, the second access node configured to transmit data generated by the IoT-enabled device to a network entity via a managed network backhaul and infrastructure.

In another aspect of the disclosure, a controller apparatus for use within a managed content delivery network is described. In one embodiment, the controller apparatus is configured to manage CBRS (Citizens Broadband Radio Service) wireless connectivity to one or more wireless-enabled IoT devices utilized within a prescribed application, area or premises, and includes: a processor apparatus; and a storage apparatus in data communication with the processor apparatus and having a non-transitory computer-readable storage medium, the storage medium comprising at least one computer program having a plurality of instructions stored thereon.

In a further aspect of the disclosure, a networked system configured to provide quasi-licensed wireless connectivity to a plurality of wireless-enabled IoT devices located within a prescribed area, application or premises is disclosed. In one embodiment, the system includes: wireless access node apparatus, the wireless access node apparatus disposed at least partly within the area, application or premises and comprising a first wireless interface capable of (i) utilizing at least a portion of quasi-licensed radio frequency (RF) spectrum for data communications between the plurality of user devices and a network entity, and (ii) generating data relating to signal interference within the at least a portion of quasi-licensed radio frequency (RF) spectrum; and a controller apparatus in data communication with the access node apparatus, the controller apparatus comprising a wireless access management process.

In another exemplary aspect, methods and apparatus for providing optimized access, bandwidth and routing needs of the IoT devices, including those within a prescribed area or venue, are supported through one or more co-located IoT-serving nodes and a managed network (e.g., MSO) core, leveraging a diverse array of spectrum and access technologies (including LTE, Wi-Fi, LoRa, CBRS, ZigBee, BLE), as well as a high-bandwidth backhaul of the MSO (e.g. a DOCSIS system).

In a further aspect, a method for providing wireless connectivity for at least one IoT-enabled device is disclosed. In one embodiment, the device includes a first wireless interface configured to use a first wireless protocol in a first frequency band, and the method includes: establishing wireless communication according to the first wireless protocol with an access node, the first wireless protocol configured to use a quasi-licensed radio frequency (RF) spectral band, the access node configured to transmit data generated by the at least one IoT-enabled device to a network entity via a managed content distribution network backhaul and infrastructure; determining an application type used by the at least IoT enabled device to generate the data; and applying at least one data policy to at least a portion of the generated data as part of the transmission thereof.

In a further aspect, computerized access node apparatus for use within a managed content distribution network is disclosed. In one embodiment, the computerized access node apparatus includes: processor apparatus; first wireless interface apparatus in data communication with the processor apparatus; quasi-licensed band wireless interface apparatus in data communication with the processor apparatus; and storage apparatus in data communication with the processor apparatus and comprising at least one computer program, the at least one computer program comprising a plurality of instructions.

In one variant, the instructions are configured to, when executed by the processor apparatus, cause the computerized access node apparatus to: establish one or more first wireless data communication sessions via the first wireless interface apparatus with a plurality of IoT-enabled end devices; establish a second wireless data communication session via the quasi-licensed band wireless interface apparatus with at least one wireless access node of the managed network; and cause transfer of data received from the plurality of IoT-enabled end devices via the first one or more sessions to the wireless access node via the second session.

In another aspect, a managed network architecture for providing connectivity between a plurality of IoT-enabled devices and an IoT data consuming entity is disclosed. In one embodiment, the architecture includes: at least one quasi-licensed band wireless access node disposed so as to be within communications range of the plurality of IoT-enabled devices; a managed network core portion configured for data communication with an external network serving the data consuming entity; a data communications backhaul in data communication with the at least one wireless access node and the managed network core portion, the data communications backhaul configured to provide backhaul and aggregation of data from the respective ones of the plurality of IoT-enabled devices to the core portion for subsequent distribution to the data consuming entity via the external network; and controller apparatus in data communication with the at least one wireless access node. In one variant, the controller apparatus is configured to: obtain data relating to operation of the at least one wireless access node in support of the plurality of IoT-enabled devices; determine one or more operational policies relating to the plurality of IoT-enabled devices; and communicate data to the at least one wireless access node to implement the determined one or more operational policies.

In another aspect, methods for IoT device access to CBRS services via a managed content distribution network are disclosed.

In an additional aspect of the disclosure, computer readable apparatus is described. In one embodiment, the apparatus includes a storage medium configured to store one or more computer programs. In one embodiment, the apparatus comprises a program memory or HDD or SDD on a computerized controller device. In another embodiment, the apparatus comprises a program memory, HDD or SSD on a computerized access node (e.g., CBSD). In yet another embodiment, the apparatus comprises a program memory, HDD or SSD on a wireless-enabled mobile user device. In yet a further embodiment, the apparatus comprises a program memory, HDD or SSD on a wireless-enabled IoT device.

In another aspect of the disclosure, methods for IoT end device connectivity optimization are disclosed.

In a further aspect of the present disclosure, business methods for enabling an wireless connectivity to one or more IoT devices (e.g., within an MSO-served premises such as an enterprise) are provided.

In a further aspect of the present disclosure, business methods for collecting data usage information via wireless connectivity provided to one or more IoT devices are provided.

These and other aspects shall become apparent when considered in light of the disclosure provided herein.

BRIEF DESCRIPTION OF THE DRAWINGS

FIG. 3a is a functional block diagram illustrating an exemplary hybrid fiber network configuration useful with various aspects of the present disclosure.

FIG. 4a-1 is a graphical representation of a first exemplary embodiment of a CBRS domain proxy/SAS software architecture useful with the architecture of FIG. 4a.

FIG. 4a-2 is a graphical representation of a first exemplary embodiment of an MSO/MNO IoT-enabled software architecture useful with the architecture of FIG. 4a.

FIG. 4a-3 is a graphical representation of a second exemplary embodiment of an MSO/MNO IoT-enabled software architecture useful with the architecture of FIG. 4a.

FIG. 4a-4 is a graphical representation of a third exemplary embodiment of an MNO/MSO IoT-enabled software architecture useful with the architecture of FIG. 4a.

FIG. 4a-5 is a graphical representation of a fourth exemplary embodiment of a MSO/MNO IoT-enabled software architecture useful with the architecture of FIG. 4a.

FIG. 4b-1 is a graphical representation of a first exemplary embodiment of a CBRS IoT/domain proxy/SAS software architecture useful with the architecture of FIG. 4b.

FIGS. 5c-1 and 5c-2 are graphical representations of prior art BLE advertising and connection event timing, respectively.

FIG. 5c-3 is a graphical representation of a prior art BLE data packet format.

FIG. 5c-4 is graphical representations of a prior art BLE data packet payload format.

Figure 1A:
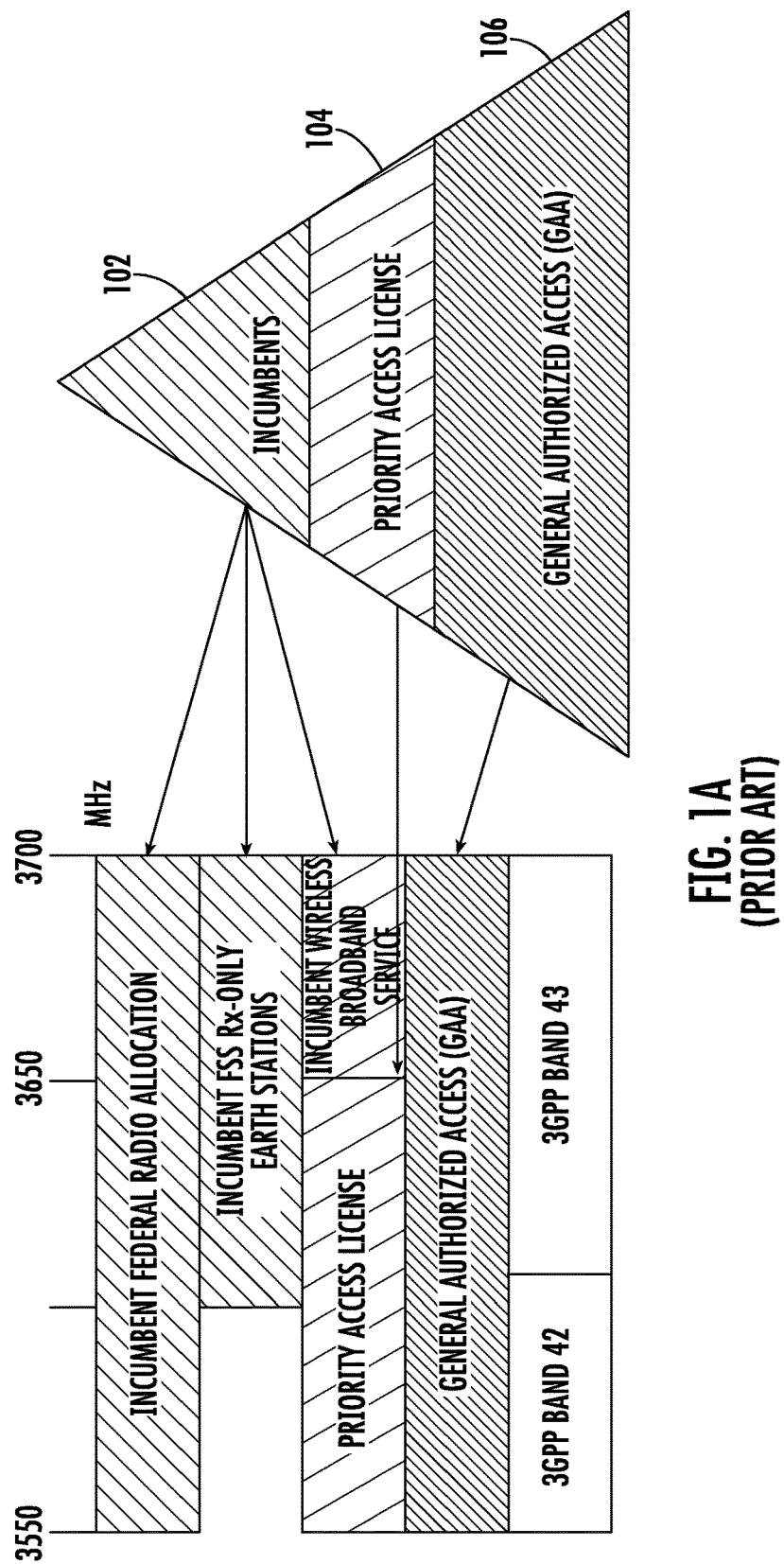
FIG. 1a is a graphical illustration of prior art CBRS (Citizens Broadband Radio Service) users and their relationship to allocated frequency spectrum in the 3.550 to 3.700 GHz band.
Figure 1B:
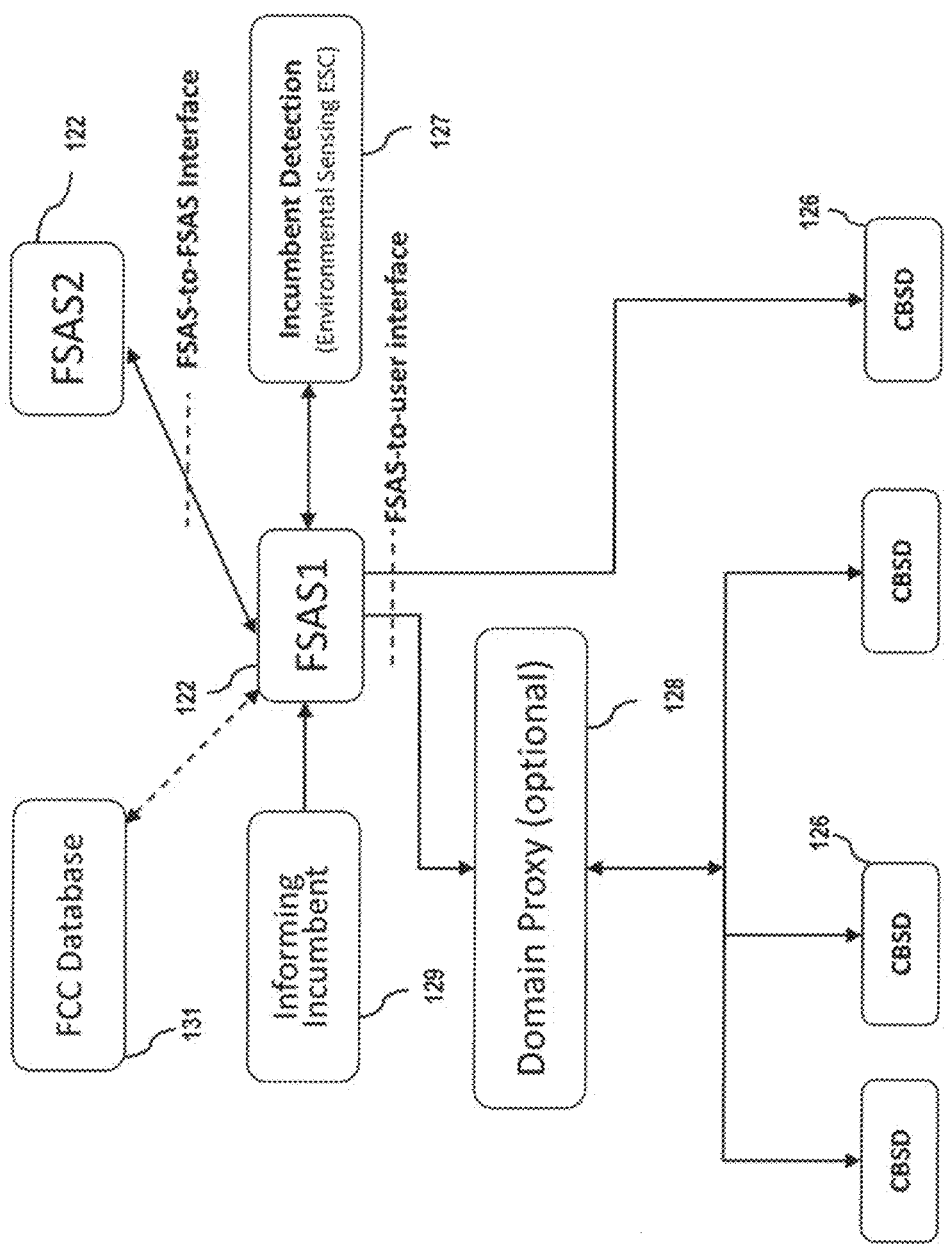
FIG. 1b is a block diagram illustrating a general architecture for the CBRS system of the prior art.
Figure 1C:
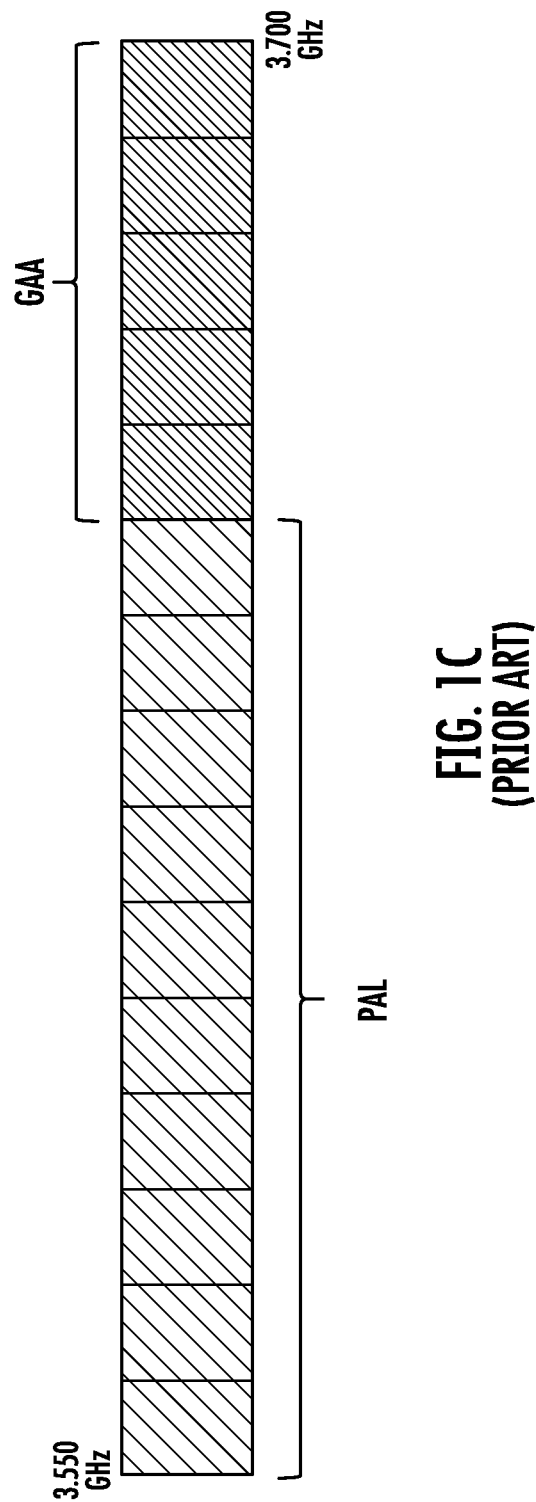
FIG. 1c is a graphical representation of allocations for PAL versus GAA users within the frequency band of FIG. 1b.

Figures © Copyright 2017 Charter Communications Operating, LLC. All rights reserved.

DETAILED DESCRIPTION

Reference is now made to the drawings wherein like numerals refer to like parts throughout.

As used herein, the term "access node" refers generally and without limitation to a network node which enables communication between a user or client device and another entity within a network, such as for example a CBRS CBSD, a Wi-Fi AP, or a Wi-Fi-Direct enabled client or other device acting as a Group Owner (GO).

As used herein, the term "application" refers generally and without limitation to a unit of executable software that implements a certain functionality or theme. The themes of applications vary broadly across any number of disciplines and functions (such as on-demand content management, e-commerce transactions, brokerage transactions, home entertainment, calculator, etc.), and one application may have more than one theme. The unit of executable software generally runs in a predetermined environment; for example, the unit could include a downloadable Java Xlet™ that runs within the JavaTV™ environment.

As used herein, the term "client device" or "user device" or "UE" include, but are not limited to, set-top boxes (e.g., DSTBs), gateways, modems, personal computers (PCs), and minicomputers, whether desktop, laptop, or otherwise, and mobile devices such as handheld computers, PDAs, personal media devices (PMDs), tablets, "phablets", smartphones, smart TVs, USB-based devices, and vehicle infotainment or navigation systems. Client devices or UEs may also comprise one or more IoT devices (defined below).

As used herein, the term "codec" refers to a video, audio, or other data coding and/or decoding algorithm, process or apparatus including, without limitation, those of the MPEG (e.g., MPEG-1, MPEG-2, MPEG-4/H.264, H.265, etc.), Real (RealVideo, etc.), AC-3 (audio), DiVX, XViD/ViDX, Windows Media Video (e.g., WMV 7, 8, 9, 10, or 11), ATI Video codec, or VC-1 (SMPTE standard 421M) families.

As used herein, the term "computer program" or "software" is meant to include any sequence of human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

The term "Customer Premises Equipment (CPE)" refers without limitation to any type of electronic equipment located within a customer's or subscriber's premises and connected to or in communication with a network.

As used herein, the term "display" means any type of device adapted to display information, including without limitation CRTs, LCDs, TFTs, plasma displays, LEDs (e.g., OLEDs), incandescent and fluorescent devices, or combinations/integrations thereof. Display devices may also include less dynamic devices such as, for example, printers, e-ink devices, and the like.

As used herein, the term "DOCSIS" refers to any of the existing or planned variants of the Data Over Cable Services Interface Specification, including for example DOCSIS versions 1.0, 1.1, 2.0, 3.0, and 3.1.

As used herein, the term "headend" or "backend" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, over-the-top services, streaming services, and the Internet.

As used herein, the terms "Internet" and "internet" are used interchangeably to refer to inter-networks including, without limitation, the Internet.

As used herein, the term "IoT device" refers without limitation to electronic devices having one or more primary functions and being configured to provide and/or receive data via one or more communication protocols. Examples of IoT devices include security or monitoring systems, appliances, consumer electronics, vehicles, infrastructure (e.g., traffic signaling systems), and medical devices, as well as receivers, hubs, proxy devices, or gateways used in association therewith. IoT devices may also comprise or be part of a client device or UE.

As used herein, the term "IoT network" refers without limitation to any logical, physical, or topological connection or aggregation of two or more IoT devices (or one IoT device and one or more non-IoT devices). Examples of IoT networks include networks of one or more IoT devices arranged in a peer-to-peer (P2P), star, ring, tree, mesh, master-slave, and coordinator-device topology.

As used herein, the term "LTE" refers to, without limitation and as applicable, any of the variants or Releases of the Long-Term Evolution wireless communication standard, including LTE-U (Long Term Evolution in unlicensed spectrum), LTE-LAA (Long Term Evolution, Licensed Assisted Access), LTE-A (LTE Advanced), LTE-M, and other related wireless data standards (as applicable).

As used herein, the term "memory" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "microprocessor" and "processor" or "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, LTE, WAP, SIP, UDP, FTP, RTP/RTCP, H.323, etc.).

As used herein, the term "network interface" refers to any signal or data interface with a component or network including, without limitation, those of the FireWire (e.g., FW400, FW800, etc.), USB (e.g., USB2), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11, Wi-Fi Direct, etc.), LTE/LTE-A, WiMAX (802.16), Zigbee®, Z-wave, PAN (e.g., 802.15), power line carrier (PLC), or IrDA families.

As used herein, the term "QAM" refers to modulation schemes used for sending signals over cable networks. Such modulation scheme might use any constellation level (e.g. QPSK, 16-QAM, 64-QAM, 256-QAM, etc.) depending on details of a cable network. A QAM may also refer to a physical channel modulated according to the schemes.

As used herein, the term "server" refers to any computerized component, system or entity regardless of form which is adapted to provide data, files, applications, content, or other services to one or more other devices or entities on a computer network.

As used herein, the term "storage" refers to without limitation computer hard drives, DVR device, memory, RAID devices or arrays, optical media (e.g., CD-ROMs, Laserdiscs, Blu-Ray, etc.), or any other devices or media capable of storing content or other information, whether local, virtual, or cloud-based.

As used herein, the term "Wi-Fi" refers to, without limitation and as applicable, any of the variants of IEEE Std. 802.11 or related standards including 802.11 a/b/g/n/s/v/ac/ax or 802.11-2012/2013, as well as Wi-Fi Direct (including inter alia, the "Wi-Fi Peer-to-Peer (P2P) Specification", incorporated herein by reference in its entirety).

As used herein, the term "wireless" means any wireless signal, data, communication, or other interface including without limitation Wi-Fi, Bluetooth/BLE/Bluetooth Mesh Networking, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), CBRS (3.5 GHz), 802.20, Zigbee®, Z-wave, NFC (near field communication), RFID, narrowband/FDMA, OFDM, PCS/DCS, LTE/LTE-A/LTE-U/LTE-LAA, analog cellular, CDPD, satellite systems, millimeter wave or microwave systems, acoustic, Li-Fi, and infrared (i.e., IrDA).

Overview

In one exemplary aspect, the present disclosure provides improved methods and apparatus for wireless network connectivity of IoT-enabled devices using, for example, "quasi-licensed" spectrum such as that provided by the recent CBRS technology initiatives. In an exemplary implementation, a network architecture is provided which leverages an MSO's extant distribution and backhaul capability to enhance performance and IoT device connectivity to its subscribers (and even non-subscriber "ad hoc" users), or otherwise provide wireless coverage where it would be otherwise not available, or provide less than suitable levels of performance.

In one implementation, extant TD-LTE (Long Term Evolution) technology is leveraged within the available CBRS band(s) for improved connectivity and coverage of IoT applications, which may be highly localized, or geographically disparate. The ability for the MSO to acquire 'temporary' licenses also provides for new use cases not currently available to the MSO; for example, providing capacity and coverage augmentation for IoT sensor arrays, infrastructure elements (e.g., buildings, bridges, tunnels), seismic monitoring, and a number of different applications where indigenous IoT interfaces such as BLE, 802.15.4, and Z-Wave do not provide suitable connectivity due to inherent limitations thereof. For example "daisy chaining" of networks is used to provide enhanced connectivity of an IoT device. In one variant, an MSO CBSD uses its indigenous CBRS interface to communicate with an IoT device in a coverage area (e.g., building or venue) so as to provide range extension for the device, which otherwise would be limited in range by virtue of use of a typically short-range IoT RAT such as BLE or 802.15.4. This can, inter alia, obviate the need for another IoT device or hub in close proximity to the end IoT device, such as for mesh networking.

In another variant, the MSO CBSD uses both indigenous CBRS and IoT interfaces to provide a bridge between the end IoT device (or hub) and a CBRS-enabled UE or other device.

The quasi-licensed CBRS band utilized by the exemplary embodiments of the present disclosure also advantageously supports QoS aspects though use of TD-LTE access technology. Moreover, RF spectrum utilization and efficiency are high due to efficiencies inherent in the TD-LTE technology coupled with use of low-contention quasi-licensed spectrum. Any disruptions caused by the incumbent protection and PAL when operating in GAA mode are addressed by the MSO controller logic and optimizations, as implemented through the CBSDs and IoT infrastructure served by the MSO CBRS network. Other advantages include: (i) provision of range extension for (native) IoT device access technologies; (ii) case-by-case support for QoS for different IoT applications, which is not feasible in many prevailing IoT access technologies; (iii) security enhancement via provision of secure communication between IoT devices and network infrastructure.

The exemplary architecture disclosed herein also advantageously facilitates collection of targeted metrics from these devices and network infrastructure, which is analyzed to gather insights and generate actionable intelligence to optimize and enhance services, network performance and device/service capabilities including e.g., reduced latency, prioritization of certain types of IoT-related traffic, and access to IoT end-devices via a user's UE (whether within a fully- or quasi-licensed coverage area).

Detailed Description of Exemplary Embodiments

Exemplary embodiments of the apparatus and methods of the present disclosure are now described in detail. While these exemplary embodiments are described in the context of the previously mentioned wireless access points (e.g., CBSDs and WLAN APs) associated with a managed network (e.g., hybrid fiber coax (HFC) cable architecture having a multiple systems operator (MSO), digital networking capability, IP delivery capability, and a plurality of client devices), the general principles and advantages of the disclosure may be extended to other types of radio access technologies ("RATs"), networks and architectures that are configured to deliver digital data (e.g., text, images, games, software applications, video and/or audio). Such other networks or architectures may be broadband, narrowband, or otherwise, the following therefore being merely exemplary in nature.

It will also be appreciated that while described generally in the context of a network providing service to a customer or consumer or end user (i.e., within a prescribed venue, or other type of premises), the present disclosure may be readily adapted to other types of environments including, e.g., outdoors, commercial/retail, or enterprise domain (e.g., businesses), or even governmental uses, such as those outside the proscribed "incumbent" users such as U.S. DoD and the like. Yet other applications are possible.

Similarly, while described primarily in terms of IEEE Std. 802.15.4 (and related) and BLE/Bluetooth Smart technologies used for communication to/from IoT devices in the 2.4 GHz ISM band, the various aspects of the disclosure may be applied to other frequency bands (e.g., 5 or 5.8 GHz) and/or types of air interfaces and protocols, whether RF-based or otherwise.

Moreover, while primarily described with respect to operation using an LTE-U/LAA technology and mode (e.g., TDD) operating in the 3.5 GHz band, the present disclosure contemplates other RATs for use between the IoT enabled end device(s) and the MSO infrastructure, including without limitation (i) LTE-M (Cat-M1), an evolution of LTE optimized for IoT in 3GPP RAN the within an LTE carrier, which supports both frequency division duplex (FDD) and time division duplex (TDD) modes using a common sub frame structure of 1ms (thereby allowing minimization of latency, ensuring good end-device connectivity); (ii) NB-IoT, a narrowband evolution of LTE for IoT in 3GPP RAN;

or (iii) EC-GSM-IoT, an evolution of GSM optimized for IoT in 3GPP GERAN, which may be deployed within a GSM carrier.

Also, while certain aspects are described primarily in the context of the well-known Internet Protocol (described in, inter alia, *Internet Protocol DARPA Internet Program Protocol Specification*, IETF RCF 791 (September 1981) and Deering et al., *Internet Protocol, Version 6 (IPv6) Specification*, IETF RFC 2460 (December 1998), each of which is incorporated herein by reference in its entirety), it will be appreciated that the present disclosure may utilize other types of protocols (and in fact bearer networks to include other internets and intranets) to implement the described functionality.

Moreover, while the current SAS framework is configured to allocate spectrum in the 3.5 GHz band (specifically 3,550 to 3.700 GHz), it will be appreciated by those of ordinary skill when provided the present disclosure that the methods and apparatus described herein may be configured to utilize other "quasi licensed" or other spectrum, including without limitations above 4.0 GHz (e.g., currently proposed allocations up to 4.2 GHz).

Other features and advantages of the present disclosure will immediately be recognized by persons of ordinary skill in the art with reference to the attached drawings and detailed description of exemplary embodiments as given below.

Service Provider Network—

FIG. 3a illustrates a typical service provider network configuration useful with the features of the CBRS-based wireless network(s) described herein. This service provider network 300 is used in one embodiment of the disclosure to provide backbone and Internet access from the service provider's wireless access nodes (e.g., CBSDs, IoT access nodes or hubs, Wi-Fi APs or base stations 314 operated or maintained by the service provider or its customers/subscribers), one or more stand-alone or embedded cable modems (CMs) 312, 313 in data communication therewith, or even third party access points accessible to the service provider via, e.g., an interposed network such as the Internet 311 (e.g., with appropriate permissions from the access node owner/operator/user).

As described in greater detail subsequently herein with respect to FIG. 4a, one or more controllers 310 are utilized for, inter alia, control of the wireless network access nodes 314 at least partly by the MSO. As opposed to an unmanaged network, the managed service-provider network 300 of FIG. 3a advantageously allows, inter alia, control and management of a given user's and/or IoT device's access (such user which may be a network subscriber, or merely an incidental/opportunistic user of the service, such as a subscriber of a "partner" MNO) via the wireless access node(s) 314, including imposition and/or reconfiguration of various access "rules" or other configurations applied to the wireless access nodes. For example, the service provider network 300 allows components at an area, premises or venue of interest (e.g., CBSDs, IoT access nodes, Wi-Fi APs and any supporting infrastructure such as routers, switches, etc.) to be remotely reconfigured by the network MSO, based on e.g., prevailing operational conditions in the network, changes in user population and/or makeup of users or IoT devices at the service location, business models (e.g., to maximize profitability or provide other benefits such as enhanced user experience, as described infra), spectrum channel changes or withdrawals, provide IoT connectivity and/or "backhaul," or even simply to enhance user experience using one RAT (e.g., CBRS) when another RAT (e.g., WLAN or IoT native PAN is sub-optimal for whatever reason).

In certain embodiments, the service provider network 300 also advantageously permits the aggregation and/or analysis of IoT device-, subscriber-, or account-specific data (including inter alia, particular mobile or IoT devices associated with such subscriber or accounts) as part of the provision of services to users under the exemplary delivery models described herein. As but one example, device-specific IDs (e.g., MAC address or the like) can be cross-correlated to MSO subscriber data maintained at e.g., the network head end(s) 307 so as to permit or at least facilitate, among other things, (i) user or IoT device authentication; (ii) correlation of aspects of the event or venue to particular subscriber demographics, such as for delivery of targeted advertising; and (iii) determination of subscription level, and hence device or subscriber privileges and access to features or functions. Moreover, device profiles for particular user or IoT devices can be maintained by the MSO, such that the MSO (or its automated proxy processes) can model the user or IoT device for wireless capabilities.

The wireless access nodes 314 disposed at the service location(s) (e.g., areas, premises, or venue(s) of interest) can be coupled to the bearer managed network 300 (FIG. 3a) via, e.g., a cable modem termination system (CMTS) and associated local DOCSIS cable modem (CM) 312, 313, a wireless bearer medium (e.g., an 802.16 WiMAX or millimeter wave system—not shown), a fiber-based system such as FiOS or similar, a third-party medium which the managed network operator has access to (which may include any of the foregoing), or yet other means.

The various components of the exemplary embodiment of the network 300 generally include (i) one or more data and application origination sources 302; (ii) one or more content sources 303, (iii) one or more application distribution servers 304; (iv) one or more video-on-demand (VOD) servers 305, (v) client devices 306, (vi) IoT devices 309, (vii) one or more routers 308, (viii) one or more wireless access node controllers 310 (may be placed more locally as shown or in the headend or "core" portion of network), (ix) one or more cable modems 312, 313, and/or (x) one or more access nodes or hubs 314. The application server(s) 304, VOD servers 305 and client device(s) 306, and IoT devices 309 are connected via a bearer (e.g., HFC) network 301. A simple architecture comprising one of each of certain components 302, 303, 304, 305, 308, 309, 310 is shown in FIG. 3a for simplicity, although it will be recognized that comparable architectures with multiple origination sources, distribution servers, VOD servers, controllers, and/or client or IoT devices (as well as different network topologies) may be utilized consistent with the present disclosure.

It is also noted that cable network architecture is typically a "tree-and-branch" structure, and hence multiple tiered access nodes 314 (and other components) may be linked to each other or cascaded via such structure.

Figure 3B:
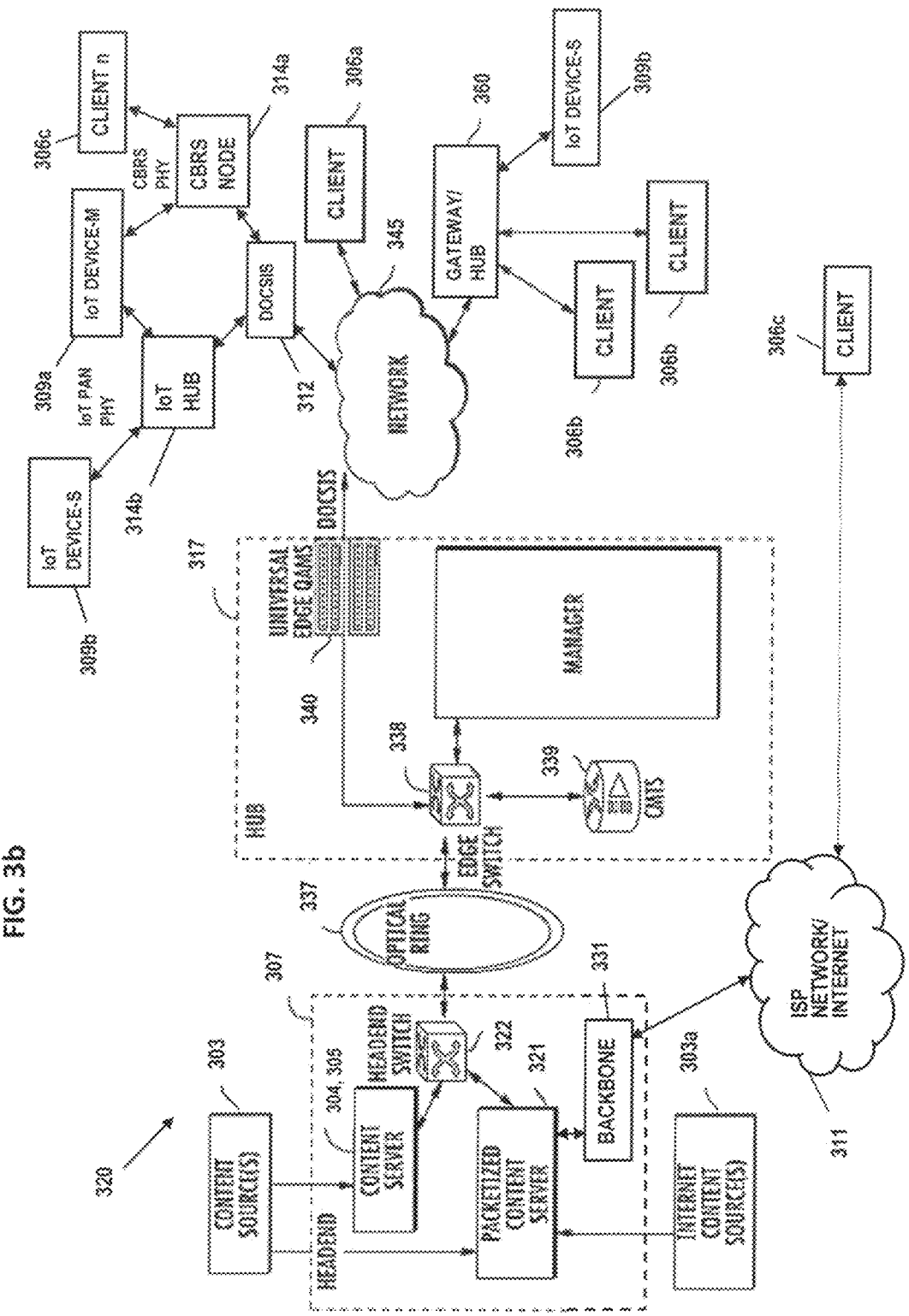
FIG. 3b is a functional block diagram of an exemplary packetized content network architecture useful in conjunction with various principles described herein.

FIG. 3b illustrates an exemplary high-level MSO network architecture for the delivery of packetized content (e.g., encoded digital content carried within a packet or frame structure or protocol) that may be useful with the various aspects of the present disclosure. In addition to on-demand and broadcast content (e.g., live video programming), the system of FIG. 3b may deliver Internet data and OTT (over-the-top) services to the end users (including those of the access nodes or hubs 314) via the Internet protocol (IP) and TCP, although other protocols and transport mechanisms of the type well known in the digital communication art may be substituted.

The network architecture 320 of FIG. 3b generally comprises one or more headends 307 in communication with at least one hub 317 via an optical ring 337. The distribution hub 317 is able to provide content to various user/client devices 306, and gateway devices 360 as applicable, via an interposed network infrastructure 345.

As described in greater detail below, various content sources 303, 303a are used to provide content to content servers 304, 305 and origin servers 321. For example, content may be received from a local, regional, or network content library as discussed in co-owned U.S. Pat. No. 8,997,136 entitled "APPARATUS AND METHODS FOR PACKETIZED CONTENT DELIVERY OVER A BANDWIDTH-EFFICIENT NETWORK", which is incorporated herein by reference in its entirety. Alternatively, content may be received from linear analog or digital feeds, as well as third party content sources. Internet content sources 303a (such as e.g., a web server) provide Internet content to a packetized content origin server(s) 321. Other IP content may also be received at the origin server(s) 321, such as voice over IP (VoIP) and/or IPTV content. Content may also be received from subscriber and non-subscriber devices (e.g., a PC or smartphone-originated user made video).

The centralized media server(s) 321, 304 located in the headend 307 may also be replaced with or used in tandem with (e.g., as a backup) to hub media servers (not shown) in one alternative configuration. By distributing the servers to the hub stations 317, the size of the fiber transport network associated with delivering VOD services from the central headend media server is advantageously reduced. Multiple paths and channels are available for content and data distribution to each user, assuring high system reliability and enhanced asset availability. Substantial cost benefits are derived from the reduced need for a large content distribution network, and the reduced storage capacity requirements for hub servers (by virtue of the hub servers having to store and distribute less content).

It will also be recognized that a heterogeneous or mixed server approach may be utilized consistent with the disclosure. For example, one server configuration or architecture may be used for servicing cable, satellite, etc., subscriber CPE-based session requests (e.g., from a user's DSTB or the like), while a different configuration or architecture may be used for servicing mobile client requests. Similarly, the content servers 321, 304 may either be single-purpose/dedicated (e.g., where a given server is dedicated only to servicing certain types of requests), or alternatively multi-purpose (e.g., where a given server is capable of servicing requests from different sources).

The network architecture 320 of FIG. 3b may further include a legacy multiplexer/encrypter/modulator (MEM; not shown). In the present context, the content server 304 and packetized content server 321 may be coupled via a LAN to a headend switching device 322 such as an 802.3z Gigabit Ethernet (or "10G") device. For downstream delivery via the MSO infrastructure (i.e., QAMs), video and audio content is multiplexed at the headend 307 and transmitted to the edge switch device 338 (which may also comprise an 802.3z Gigabit Ethernet device) via the optical ring 337.

In one exemplary content delivery paradigm, MPEG-based video content (e.g., MPEG-2, H.264/AVC) may be delivered to user IP-based client devices over the relevant physical transport (e.g., DOCSIS channels); that is as MPEG-over-IP-over-MPEG. Specifically, the higher layer MPEG or other encoded content may be encapsulated using an IP network-layer protocol, which then utilizes an MPEG packetization/container format of the type well known in the art for delivery over the RF channels or other transport, such as via a multiplexed transport stream (MPTS). In this fashion, a parallel delivery mode to the normal broadcast delivery exists; e.g., in the cable paradigm, delivery of video content both over traditional downstream QAMs to the tuner of the user's DSTB or other receiver device for viewing on the television, and also as packetized IP data over the DOCSIS QAMs to the user's PC or other IP-enabled device via the user's cable modem 312 (including to end users of the access node 314). Delivery in such packetized modes may be unicast, multicast, or broadcast.

Delivery of the IP-encapsulated data may also occur over the non-DOCSIS QAMs, such as via IPTV or similar models with QoS applied.

Individual client devices such as cable modems 312 and associated end-user devices 306a, 306b of the implementation of FIG. 3b may be configured to monitor the particular assigned RF channel (such as via a port or socket ID/address, or other such mechanism) for IP packets intended for the subscriber premises/address that they serve. The IP packets associated with Internet services are received by edge switch, and forwarded to the cable modem termination system (CMTS) 339. The CMTS examines the packets, and forwards packets intended for the local network to the edge switch. Other packets are in one variant discarded or routed to another component.

The edge switch forwards the packets receive from the CMTS to the QAM modulator, which transmits the packets on one or more physical (QAM-modulated RF) channels to the client devices. The IP packets are typically transmitted on RF channels that are different than the "in band" RF channels used for the broadcast video and audio programming, although this is not a requirement. As noted above, the premises devices such as cable modems 312 are each configured to monitor the particular assigned RF channel (such as via a port or socket ID/address, or other such mechanism) for IP packets intended for the subscriber premises/address that they serve.

In one embodiment, both IP data content and IP-packetized audio/video content is delivered to a user via one or more universal edge QAM devices 340. According to this embodiment, all of the content is delivered on DOCSIS channels, which are received by a premises gateway/hub 360 or cable modem 312, and distributed to one or more respective client devices/UEs 306a, 306b, 306c (or IoT devices 309) in communication therewith.

In one implementation, the CM 312 shown in FIG. 3b services a premises, such as a large structure (e.g., office building or hotel), which includes a CBRS node 314a for CBRS-band (3.5 GHz) access, and an IoT node or hub 314b for IoT "native" access (e.g., within the designated ISM or other band(s) used by the IoT device(s) 309a, 309b). The illustrated IoT devices include a multi-band/RAT IoT device (IoT-M) 309a (e.g., one with IoT PAN RAT and also CBRS capability), and a single-RAT IoT device (IoT-S) 309b, having only its indigenous IoT interface (e.g., 802.15.4-based, Z-Wave, or BLE), or alternatively, a single interface configured (or configurable, such as via an SDR of the device 309b) for communication via the CBRS band(s).

Notably, the client devices 306c and IoT-M devices 309a communicating with the access nodes 314a, 314b, as described in greater detail subsequently herein, can utilize either RAT (CBRS or IoT native) depending on, inter alia, directives received from the MSO controller 310 (FIG. 3a) via one access node 314 or the other, or even indigenous logic on the client or IoT devices 306c, 309a enabling it to selectively access one RAT or the other. Both RATs can operate in tandem when utilizing different frequencies, modulation techniques, interference mitigation techniques, and/or Tx power.

In parallel with (or in place of) the foregoing delivery mechanisms, the MSO backbone 331 and other network components can be used to deliver packetized content to the user's mobile client device 306c via non-MSO networks. For example, so-called "OTT" content (whether tightly coupled or otherwise) can be ingested, stored within the MSO's network infrastructure, and delivered to the user's mobile device via an interposed ISP (Internet Service Provider) network and public Internet 311 (e.g., at a local coffee shop, via a Wi-Fi AP connected to the coffee shop's ISP via a modem, with the user's IP-enabled end-user device 306c utilizing an Internet browser or MSO/third-party app to stream content according to an HTTP-based approach).

Figure 3C:
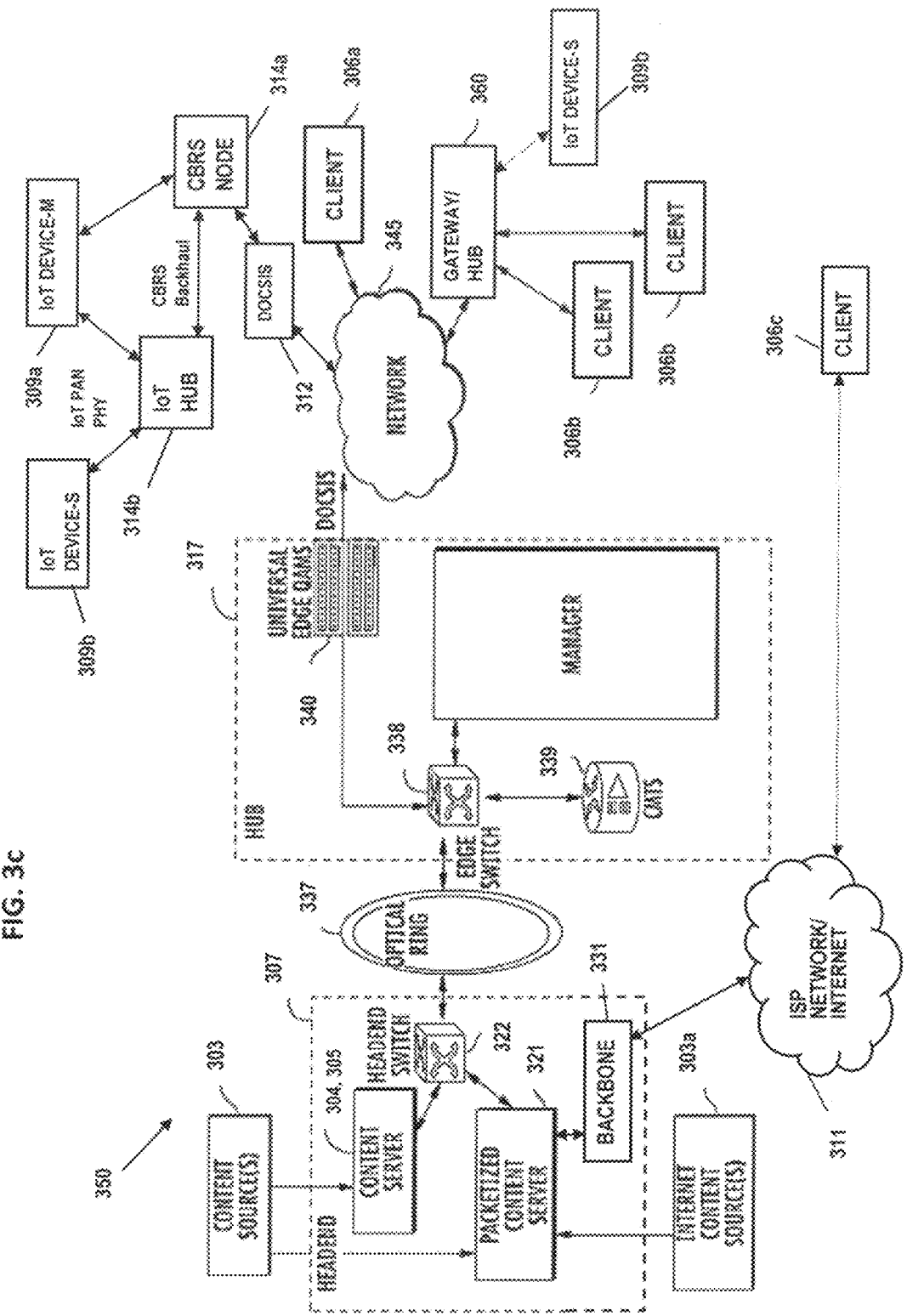
FIG. 3c is a functional block diagram of another embodiment of a packetized content network architecture useful in conjunction with various principles described herein.

FIG. 3c illustrates another embodiment of a network architecture 350, wherein the CBRS node 314a (e.g., CBSD) acts as a backhaul for one or more IoT-enabled hubs or gateways 314b. Specifically, in one variant, the CBSD 314a utilizes a wireless (and comparatively high-bandwidth) CBRS-band link between itself and a transceiver of the hub/gateway 314b to backhaul traffic to/from the individual IoT-S/M devices, the latter utilizing their indigenous PAN interfaces (e.g., BLE, 802.15.4, Z-Wave, or other) to communicate with the hub/gateway 314b. While the data rate associated with the individual PAN interfaces is comparatively low, when the hub/gateway aggregates many sessions, it can represent a significant bandwidth demand (e.g., consider communication by the hub/gateway with 50 individual 10 kbps building or infrastructure sensors, totaling as much as 0.5 Mbps in the aggregate), which is readily handled, and at greater range, by the CBSD(s) 314a, the latter which themselves are backhauled to the network core via the illustrated DOCSIS modem 312 and its associated CMTS 339 and edge QAMs 340. Hence, using this architecture, a large number of comparatively low power PAN-enabled IoT devices can be serviced by a small number of IoT hubs, and a smaller number of CBSDs (e.g., one, when all hubs are within CBRS-band range of the CBSD).

Wireless Services Architecture—

Figure 4A:
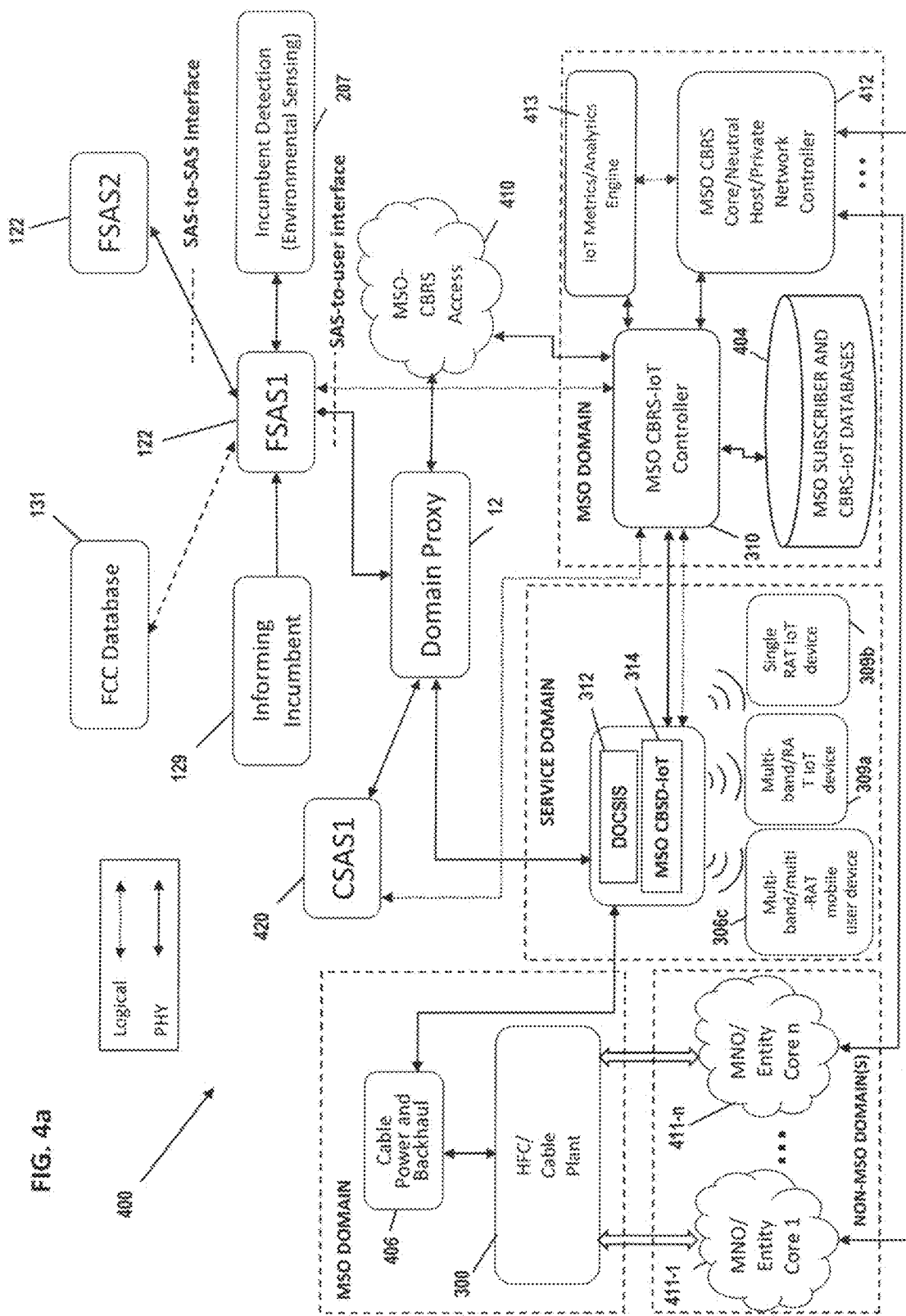
FIG. 4a is a functional block diagram of a first exemplary embodiment of a wireless network infrastructure useful with various aspects of the present disclosure.

FIG. 4a illustrates an exemplary embodiment of a network architecture 400 useful in implementing the CBRS-based wireless RAT IoT access methods of the present disclosure. As used in the present context, the term "users" may include without limitation end users (e.g., individuals, whether subscribers of the MSO network, the MNO network, or other), IoT devices or networks thereof, venue operators, third party service providers, or even entities within the MSO itself (e.g., a particular department, system or processing entity).

As shown, the architecture generally includes an MSO-maintained CBRS and IoT controller 310 (which may be disposed remotely at the backend or headend of the system within the MSO domain as shown or at the served venue, or at an intermediary site), a CBRS Core/Neutral Host/Private Network Controller 413, an IoT metrics/analytics engine 413 in data communication with the CBRS/IoT controller 310, one or more MSO-maintained subscriber and CBRS/IoT databases 404, one or more CBSD-IoT access nodes 314 in data communication with the CBRS/IoT controller 310 (e.g., via existing network architectures including any wired or wireless connection), as well as any number of client devices 306c (smartphones, laptops, tablets, watches, vehicles, etc.), IoT-M devices 309a, and IoT-S devices 309b (e.g., user devices, installed sensors, IoT enabled infrastructure devices, etc.).

The CBSD-IoT 314 includes in the illustrated embodiment an embedded cable modem 312 used for communication with a corresponding CMTS 339 (FIG. 3b) within the MSO's (e.g., cable) plant 300 via cable power and backhaul infrastructure 406, including high-data bandwidth connections to the MSO's backbone 331, and electrical power for the CBSD-IoT. An MNO (mobile network operator) network 411 also communicates with the MSO network via the backhaul 406, such as for inter-operator communications regarding common users/subscribers.

The CBSD-IoT 314 also includes in the illustrated embodiment one or more "native" IoT (e.g., PAN) wireless interfaces for communication with comparably enabled IoT devices 309a, 309b or even client devices 306c. For example, in one implementation, the CBRS-IoT 314 is configured to communicate via (i) the CBRS bands (3.550-3.70 GHz), as well as one or more ISM bands associated with e.g., 802.15.4, BLE, and/or Z-Wave. In this capacity, the CBRS-IoT can conduct multi-range, multi-protocol communications.

In the present context, a Neutral-Host-Network (NHN) is a Radio Access Network (RAN) deployed in 3.5 GHz band, with an associated NHN core. For instance, in one implementation, the MSO acts as an NHN provider via, inter alia, its provision of the CBRS-IoT RAN. Both a the NHN RAN and core may be used to provide/offer services to the subscribers of the MSO's MNO partners, including access to the MNO core via the NHN (MSO) RAN and core.

Conversely, in a private network (or enterprise network), a private entity uses the RAN (e.g., CBRS-based RAN) for its own exclusive use, exclusive of any MNO partners or their subscribers.

In a hybrid network, a CBRS core and RAN can serve UEs having multiple subscriptions (e.g., for the private or enterprise MSO, and the cellular MNO) to provide both the enterprise as well as MNO services through the common CBRS-IoT RAN and core.

Referring again to FIG. 4a, in operation, the Domain Proxy (DP) 128 is in logical communication with the CBSD-IoT disposed at the venue (either directly, as shown, or via MSO backend network infrastructure) and the MSO CBRS-IoT controller 310. The DP 128 provides, inter alia, FSAS interface for the CBSD-IoT, including directive translation between CBSD-IoT 314 and FSAS commands, bulk CBSD directive processing, and interference contribution reporting to the FSAS (i.e., to help an SAS tune or update its predictive propagation models and detect realistic interference issues once CBSD-IoTs are deployed, the CBSD-IoTs can provide signal strength and interference level measurements).

The MSO controller 310 in the illustrated embodiment communicates with the DP 128 via an MSO CBRS access network 410, which may be a public internetwork (e.g., the Internet), private network, or other, depending on any security and reliability requirements mandated by the MSO and/or SAS.

As previously noted, a CBRS "domain" is defined is any collection of CBSDs 314 that need to be grouped for management; e.g.: large enterprises, large infrastructure, venues, etc. The DP 128 aggregate control information flows to the FSAS1 122 and/or any participating Commercial SAS (CSAS) 420, and generate performance reports, channel requests, heartbeats, and other types of data. In the illustrated embodiment, the DP 128 is operated by a third-party service provider, although it will be appreciated that the MSO may operate and maintain the DP 128, and or operate/maintain its own internal DP (as in FIGS. 4b and 4b-1), such as for channel request processing, aggregation, reporting, and other of the above-listed functions for the MSO's internal CBRS domains, for interface with an external DP 128.

Figures 1, 4A:
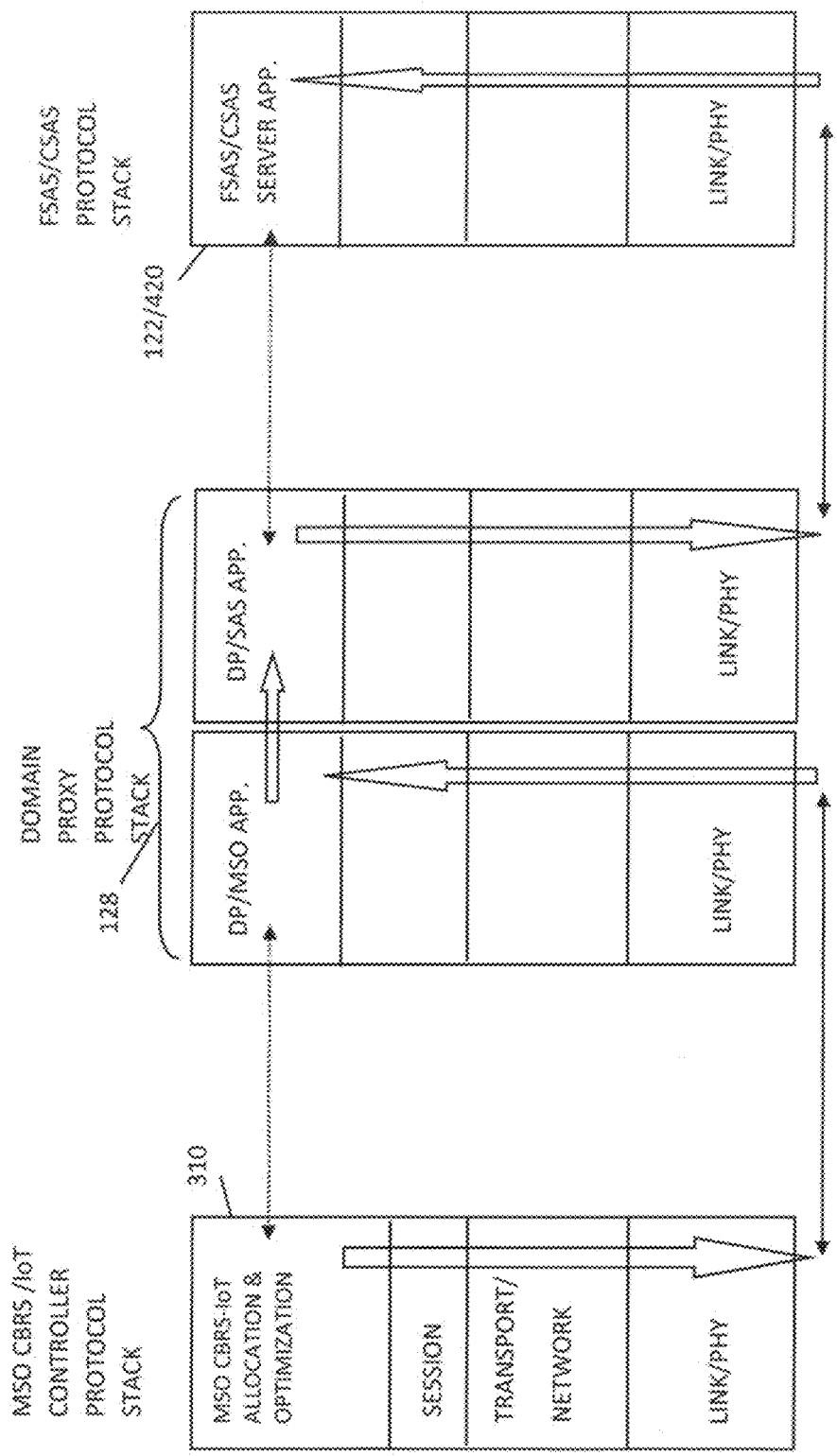
Figures 2, 4A:
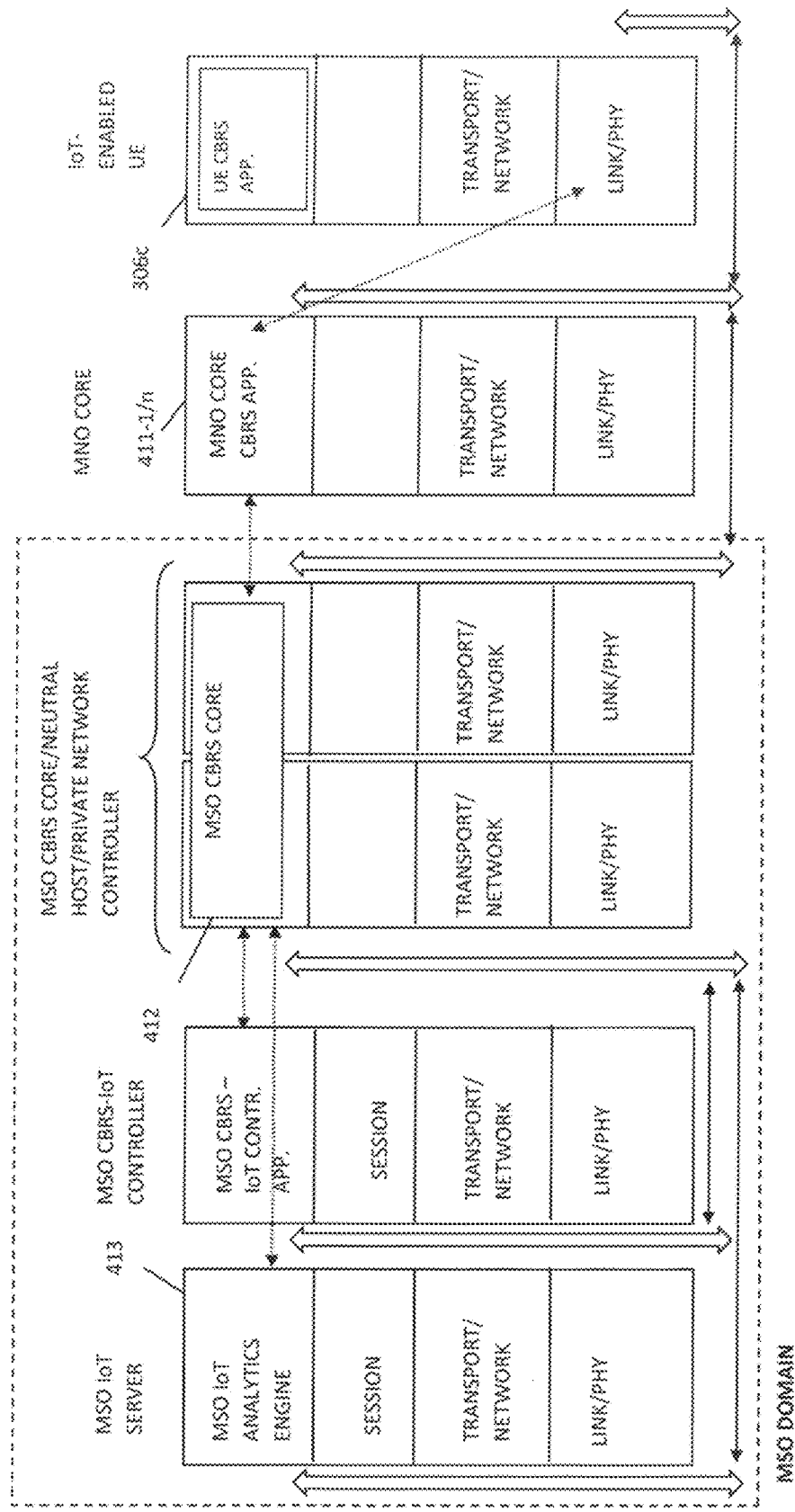

In one variant, the MSO-IoT controller 310 communicates logically with the IoT analytics server engine 413, as well as the MSO core function 412 as shown in FIG. 4a-2. In one embodiment, the MSO core 412 further communicates with one or more MNO cores 411, such as via an application or other computer program operative within the relevant MNO core entity. Also as shown in FIG. 4a-2, the MNO core 411 controls the link layer/PHY of an IoT-enabled UE (i.e., via LTE-FDD signaling and operation between an eNB of the MNO network and the UE), such that the UE can configure its PHY to, inter alia, scan the relevant 3.5 GHz band(s) for energy in support of UE "entry" into the MSO CBRS-IoT RAN, and operate within the CBRS-IoT RAN in LTE-TDD mode. This approach requires at least some level of communication between the UE and its home MNO network (or at least another MNO network which it is visiting which can maintain an LTE-FDD link to an eNB); once the UE loses contact with the home or visited LTE-FDD (cellular) network, it will not be able to enter the MSO CBRS-IoT RAN (at least without prior configuration of its RF functions to do so).

In one operational scenario, an IoT-enabled UE (e.g., the multi-RAT mobile user device 306c of FIG. 4a) is associated with an MNO subscriber, the MNO being a "partner" of the type described elsewhere herein with the MSO. Accordingly, the UE 306c can avail itself of the MSO-provided CBRS band (3.5 GHz) services for, inter alia, connectivity of the UE (and hence its indigenous IoT device), such that the IoT device, which may have only a PAN interface, or none at all, can achieve long-range connectivity to e.g., another user, URL, etc. via the combination of: (i) the CBRS RAN, (ii) the MSO core and backhaul, and (iii) a third party core/network (which may be that of the partner MNO or other). For instance, in one implementation, the mobile device 306c may include one or more IoT sensors, whether as part of the device itself, or in data communication therewith (e.g., via USB/micro-USB, or PAN interface), and the utilization of the CBRS-IoT RAN of the MSO enables the IoT sensor(s) to have data connectivity in areas or infrastructure where it might not otherwise. Consider, for example, an infrastructure application which is underground or otherwise heavily shielded against cellular signals; an LTE-based UE of an MNO may not be able to obtain cellular service, and the UE may be too distant from an WLAN APs (if any are even installed), whereas the putative longer range of the third-party (e.g., MSO) CBRS service may provide the UE with connectivity to its home (MNO) network core.

The MSO CBRS-IoT controller 310 communicates logically with the protocol stack and "server" process of the FSAS1 202 via the DP stack(s), as shown in FIG. 4a-1. In one embodiment, the DP stack provides protocol translation and other functions required by the FSAS 202 (and optionally by the CSAS 420) for the MSO request and report datagrams transmitted by the controller 310, and conversely from communications transmitted from within the FSAS/CSAS domains to MSO-domain protocols. In one implementation, the DP 128 utilizes and publishes a "closed" API for access by various MSO (and other) designated users, such that the MSO spectrum requests and interference reports are submitted via API "calls" to a prescribed URL or other network address.

The MSO subscriber and CBRS-IoT database 404 includes several types of data useful in operation of the system 400. As part thereof, a client/IoT device database not shown is also provided, wherein the MSO CBRS-IoT controller 310 can access and store data relating to, inter alia: (i) individual client devices 306c, such as MAC address or other specific identifying information, (ii) individual IoT-M or IoT-S devices, and/or hubs/gateways 314b that may be associated therewith (iii) any associated subscriber accounts or records, (iv) the LTE (and optionally IoT and/or WLAN) configuration of a client device or IOT-S/M, supported LTE/IoT/Wi-Fi variants, MCS, MIMO capability, etc.

The client/IoT database may also optionally include the multi-RAT provisioning status of the particular client or IoT-S/M (e.g., whether the client/IoT-S/M has had a connection manager (CM) application or IoT application installed, status of "pushed" configuration data to the installed CM/IoT, etc. As described in greater detail below with respect to FIG. 4b, one implementation of the CBRS system of the present disclosure utilizes MSO-provisioned client device CM and/or IoT apps which enable the client or IoT-S/M device, as applicable, to configure and manage its various air interfaces (including WLAN, CBRS-LTE, PAN, and non-CBRS LTE).

The MSO database 404 also includes a CBRS database, which in the illustrated embodiment retains data relating to, among other things: (i) CBSD identification (e.g., MAC), (ii) CBSD location, (iii) association with parent or child nodes or networks (if any), and (iv) CBRS configuration and capabilities data. The CBRS database 404 may also include MSO-maintained data on available IoT interfaces and bands (if any), CBRS spectrum usage and historical patterns, channel withdrawals, and other data which enable the MSO to proactively "plan" channel usage and allocation within the premises, infrastructure or areas of interest where the CBSD(s) 314 operate.

The MSO CBRS-IoT controller 310 includes, inter alia, optimization functions which take into consideration network state and topology, (e.g., for access networks spanning across multiple access bands and technologies, cable backhaul and the core network, such as where a 2.4 GHz Wi-Fi access network together with 2.5 GHZ and 3.5 Ghz LTE network, cable backhaul and MSO (cable) core together can be optimized), loading, and user requirements, and generate standardized requests to the F SAS1 202 or CSAS1 420 services via the DP 128. The controller 310 may also "tune" the response from FSAS/CSAS before sending it to the CBSDs 314. Specifically, in one particular implementation, optimization is performed by the controller 310 by taking FSAS/CSAS channel change, withdrawal, and power change, and other self-optimizing network (SON) functions into account, as described in co-pending U.S. patent application Ser. No. 15/677,940 filed Aug. 15, 2017 previously incorporated herein. The FSAS/CSAS response is first analyzed by the controller logic as to the number of affected downstream devices (e.g., how many small cells or other CBSDs are affected, including any permanent or semi-permanent IoT hubs or gateways or other IoT infrastructure), and the instructions sent to the individual CBSDs in phases/groups, or according to some other scheme so as to mitigate the impact on the IoT-S/M devices, as well as any connected UEs (yet consistent with FSAS/CSAS and CBRS system requirements). In this fashion, an individual IoT-S/M or UE can be "moved around" to other CBSDs and/or frequency bands to the extent possible, and little or no discontinuity in service experienced.

In certain embodiments, each CBSD 314a is located within and/or services one or more areas within one or more premises or infrastructure elements (e.g., a building, room, bridge span, underground tunnel, or plaza for commercial, corporate, academic purposes, open agricultural or farm land, and/or any other space suitable for wireless access). Each CBSD 314 is configured to provide wireless network coverage within its coverage or connectivity range. For example, a building may include a number of IOT-based seismic sensors within range of one or more IoT-compatible hubs or CBSDs, or alternatively a number of CBRS-enabled IoT sensors within range of one or more CBSDs.

Notably, different classes of CBSD 314a (e.g., eNB, IoT, multi-use) may be utilized. For instance, Class A eNBs can transmit up 30 dbm (1watt), while Class-B eNBs can transmit up to 50 dbm, so the average area can vary widely. In practical terms, a Class-A device may have a working range on the order of hundreds of feet, while a Class B device may operate out to thousands of feet or more, the propagation and working range dictated by a number of factors, including the presence of RF or other interferers, physical topology of the venue/area, energy detection or sensitivity of the receiver, etc.

In one implementation, the system and methods of the present disclosure include determining a desired or optimal installation configuration for one or more wireless interface devices (e.g., CBSDs 314a) within a premises, area or application or, such as for example using the methods and apparatus described in co-owned and co-pending U.S. patent application Ser. No. 14/534,067 filed Nov. 5, 2014 and entitled "METHODS AND APPARATUS FOR DETERMINING AN OPTIMIZED WIRELESS INTERFACE INSTALLATION CONFIGURATION". As disclosed therein, a network entity collects information relating to the type of services required, and generates a customer profile. The customer profile is then used to determine a number and type of wireless interface devices required. In one variant, a device chart is generated, which lists a plurality of combinations of categories of service and a respective plurality of device combinations needed to provide optimal (or at least to the desired level of) service thereto. The device chart is consulted to arrive at an appropriate installation work order, which is submitted for premises installation.

In the exemplary embodiment, one or more CBSDs 314a may be indirectly controlled by the CBRS-IoT controller 310 (i.e., via infrastructure of the MSO network), or directly controlled by a local or "client" CBRS controller disposed at or near the target application area/site (not shown). Various combinations of the foregoing direct and indirect control may be implemented within the architecture 400 of FIG. 4a as desired. The controller 310 is implemented in this instance as a substantially unified logical and physical apparatus maintained within the MSO domain, such as at an MSO headend or hubsite. In the embodiment of FIG. 4a, the controller 310 is configured to at least: (i) dynamically monitor RF conditions and performance information in the hosting environment via use of the CBSDs 314a; (ii) cause issuance of interference reports based on the data of (i) for transmission to the DP 128 (and forwarding to the FSAS/CSAS) (iii) cause issuance of spectrum requests to the DP 128 (for forwarding to the cognizant F SAS 122 or CSAS 420). As used herein, the term "forwarding" includes any necessary intermediary protocol translation, processing, repackaging, etc. as necessitated by the receiving FSAS/CSAS domain.

Most notably, the controller 310 includes algorithms to optimize operation of the "local" CBRS network maintained by the MSO, such as within a target service area or application. These optimizations may include for example: (a) utilization of the environmental interference data of (i) above to characterize the CBRS band(s) of the area/application; (b) use the characterization of (a) to structure requests for spectrum allocation within the CBRS band(s) to the DP/SAS (e.g., which will mitigate interference or contention within the venue/are in those bands); (c) use the interference data of (i) above, and other relevant data (e.g., attendance, time, interference/signal as a function of CBSD location, etc.) to build historical profiles of spectrum use a function of various variables, including profiles particular to the venue/area itself, as described in co-owned and co-pending U.S. patent application Ser. No. 15/612,630 filed Jun. 2, 2017 entitled "APPARATUS AND METHODS FOR PROVIDING WIRELESS SERVICE IN A VENUE," incorporated herein by reference in its entirety; (d) utilize data regarding spectrum availability withdrawals (e.g., where DoD assets require use of a previously allocated band) and other events to generate predictive or speculative models on CBRS band utilization as a function of time.

FIGS. 4a-2 through 4a-5 illustrate various exemplary embodiments of MSO/MNO IoT-enabled software architectures useful with the system architecture of FIG. 4a.

In the architecture of FIG. 4a-2, an IoT-enabled UE 306c (e.g., a smartphone of an MNO subscriber) is configured by its home MNO core 411 to utilize CBRS-band communications with CBSDs 314a of the MSO. In this embodiment, the UE includes a CBRS client application, which is communicative with the CBRS controller application via the CBSD (e.g., via a client portion of the CBRS controller app. installed on the CBSD). This way, the CBRS UE functionality (including any software-defined radio functions such as retuning or configuring the UE RF front end for the CBRS 3.5 GHz band(s)) can be invoked by the MSO network directly, rather than through MNO UE/EUTRAN).

In operation, the UE 306c enters the CBRS RAN, synchronizes with the CBSD 314a, and transacts IoT-related "user" data with the CBSD to its home network core 411 via the MSO core 412, under direction of the CBRS-IoT controller. For instance, the UE may be configured to itself act as an IoT sensor or device, and transmit IoT data to the MNO home core via the MSO infrastructure. The IoT analytics engine 413 transacts data with the MSO CBRS core 412 as well, instigating collection of data on the IoT-related transactions, applying one or more IoT-related policies, and other functions.

Figures 3, 4A:
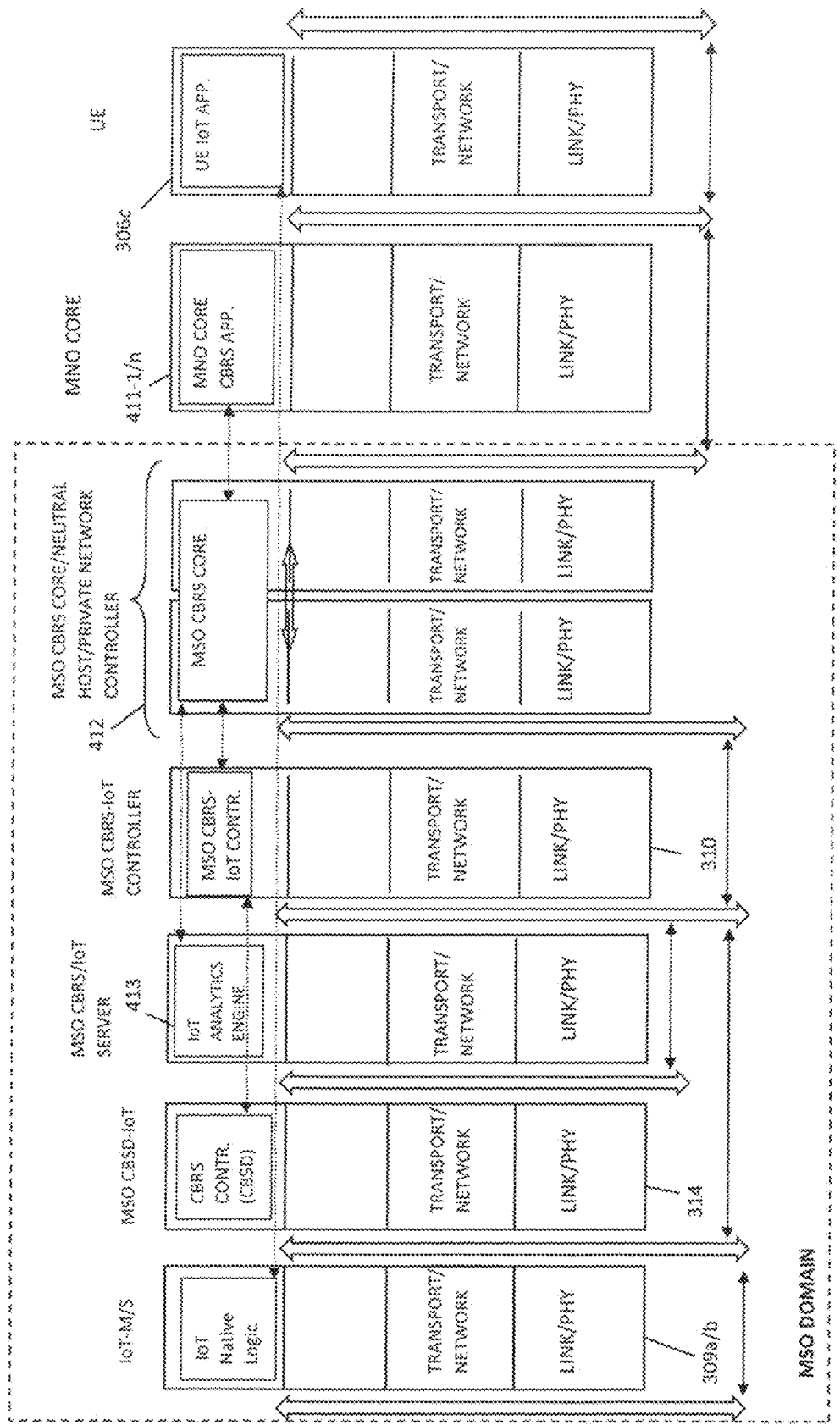

In the architecture of FIG. 4a-3, a UE 306c (e.g., a smartphone of an MNO subscriber) transacts IoT-related "user" data with its home network core 411 via the MSO core 412, under direction of the CBRS-IoT controller; however, in this case an IoT-S/M 309a, 309b device is used to communicate with the CBSD 314a via an indigenous CBRS-compatible air interface (e.g., LTE-U/LAA TDD as described elsewhere herein) and a corresponding interface 809 of the CBSD (see FIG. 8a), whereby the CBSD transmits that data to the MNO home core via the MSO infrastructure including the CBRS "backhaul." The IoT analytics engine 413 again transacts data with the MSO CBRS core 412 as well, instigating collection of data on the IoT-related transactions, applying one or more IoT-related policies, and other functions. The UE 306c is in logical communication with the IoT-S/M 309a, 309b via an app operative to run on the UE; hence, the UE user can interface with the IoT-S/M via its one home cellular network and the MSO CBRS infrastructure.

It will be appreciated that while the embodiment of FIG. 4a-3 contemplates the UE making use of the MNO cellular infrastructure, the UE may, when equipped and configured as in the embodiment of FIG. 4a-2, also utilize the same or different CBSD 314a of the MSO to "connect the call" (i.e., the UE can be serviced by the CBSD via LTE-U/LAA-TDD operation, with the connection routed out from the IoT-S/M serving CBSD through the MSO core, and back to the UE-serving CBSD).

Figures 4, 4A:
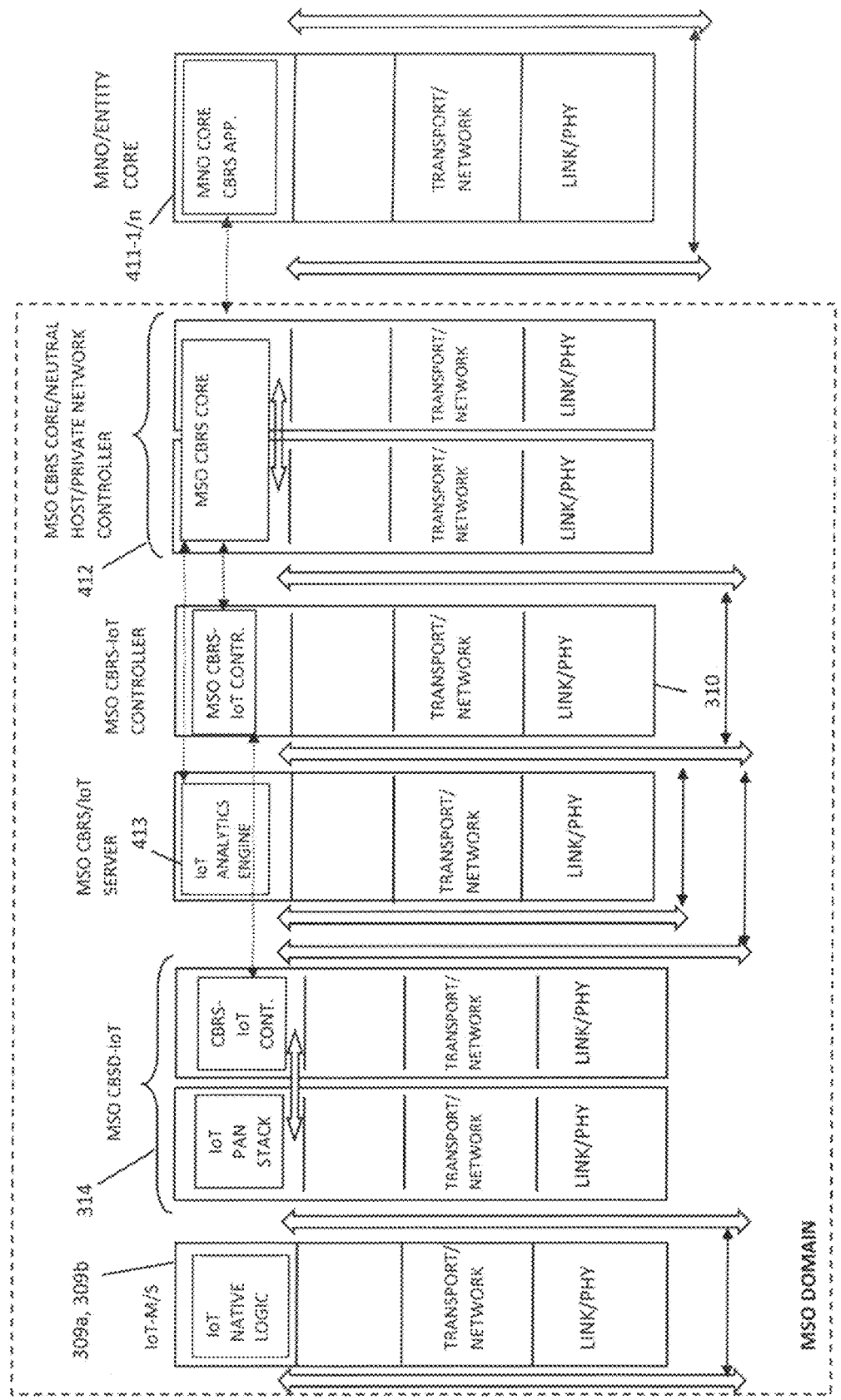

In the architecture of FIG. 4a-4, a UE 306c (e.g., a smartphone of an MNO subscriber) transacts IoT-related "user" data with its home network core 411 via the MSO core 412, under direction of the CBRS-IoT controller; however, in this case an IoT-S/M 309a, 309b device is used to communicate with the CBSD 314a via an indigenous PAN interface (e.g., BLE or 802.15.4) and a corresponding interface 825 of the CBSD (see FIG. 8b), whereby the CBSD transmits that data to the MNO home core via the MSO infrastructure including the CBRS "backhaul." Hence, the architecture uses in one such implementation: (i) an IoT (e.g., ISM) PAN between the IoT-S/M and the CBSD, and (ii) CBRS-band between the "roaming" UE and the CBSD 314a. A wired (e.g., DOCSIS) backhaul is used between the CBSD and the MSO core, logically connecting the CBSD IoT controller logic to the CBRS controller 310.

Figures 4, 4A, 5:
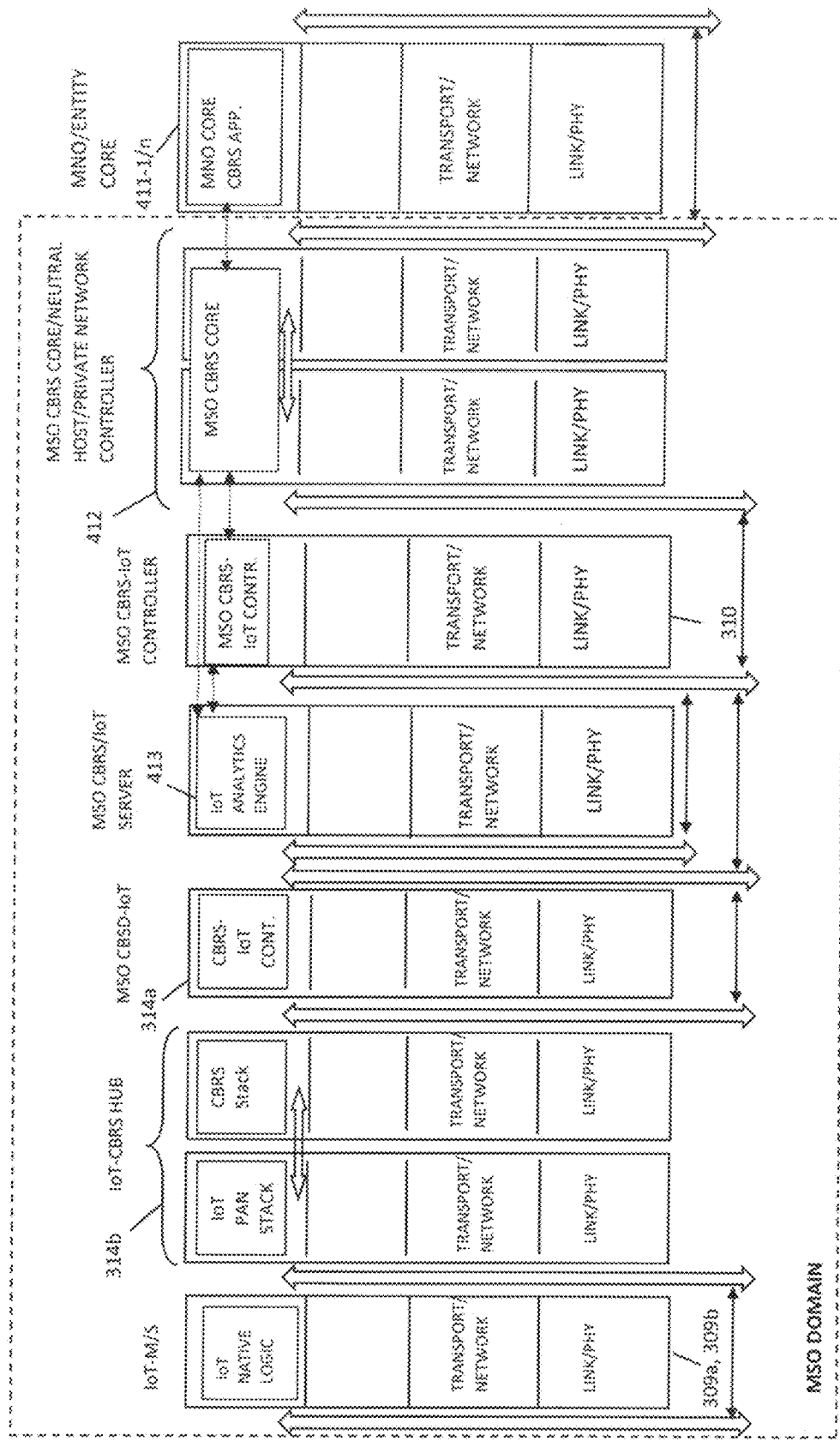

Lastly, in the architecture of FIG. 4a-5, an IoT-S/M 309a, 309b device is used to communicate with an IoT-enabled and CBRS-enabled hub/GW 314b, the latter which communicates with the CBSD 314a via an indigenous PAN interface (e.g., BLE or 802.15.4) and a corresponding interface 809 of the CBSD (see FIG. 8a), whereby the CBSD transmits that data to the MNO home core via the MSO infrastructure including the CBRS "backhaul." Hence, the architecture uses in one such implementation: (i) an IoT (e.g., ISM) PAN between the IoT-S/M and the hub/GW, and (ii) CBRS-band as backhaul between the hub/GW and the CBSD 314a. A wired (e.g., DOCSIS) backhaul is used between the CBSD and the MSO core.

Figure 4B:
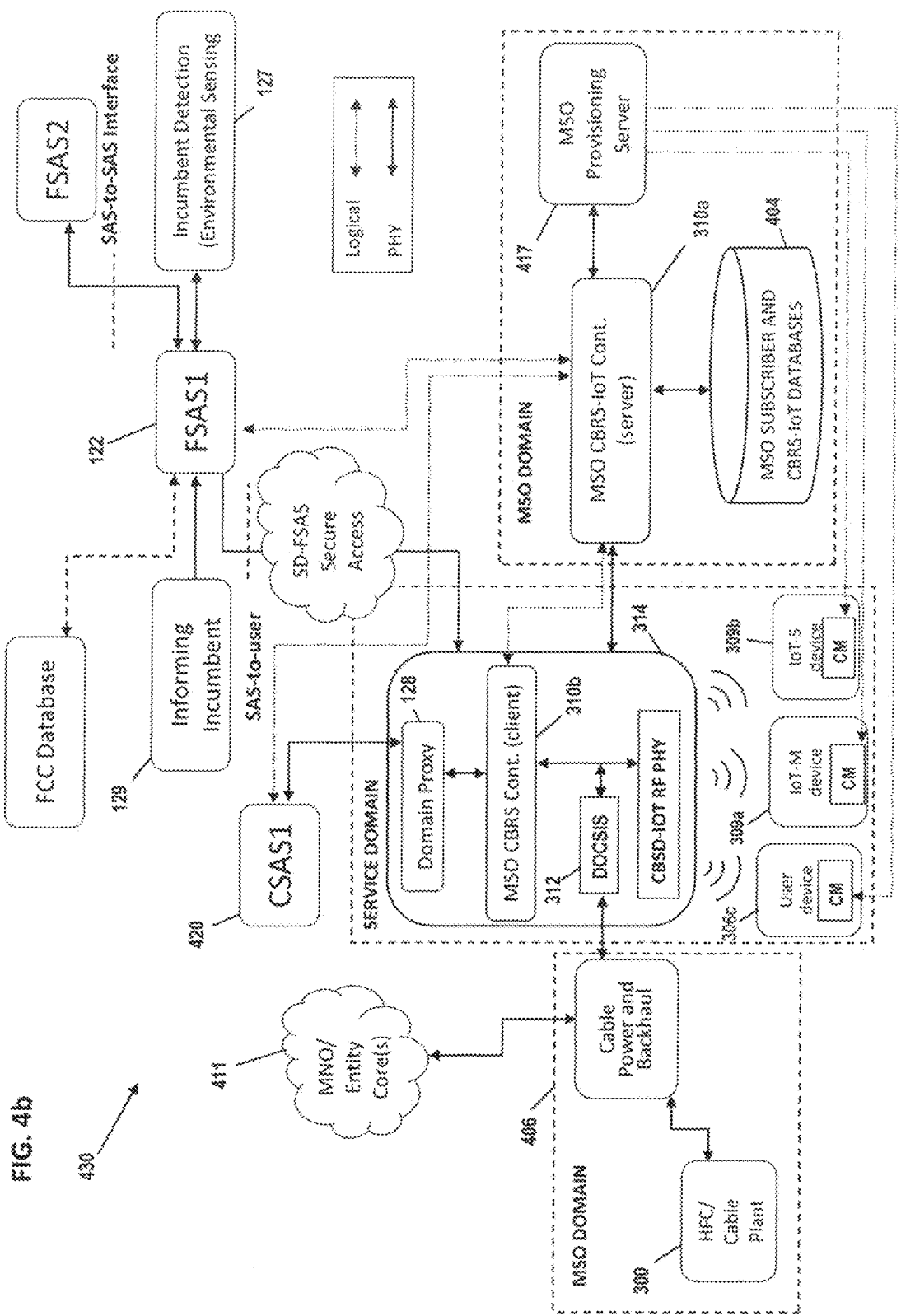
FIG. 4b is a functional block diagram of a second exemplary embodiment of a wireless network infrastructure including distributed controller functionality and client/IoT device provisioning, useful with various aspects of the present disclosure.
Figures 1, 4B:
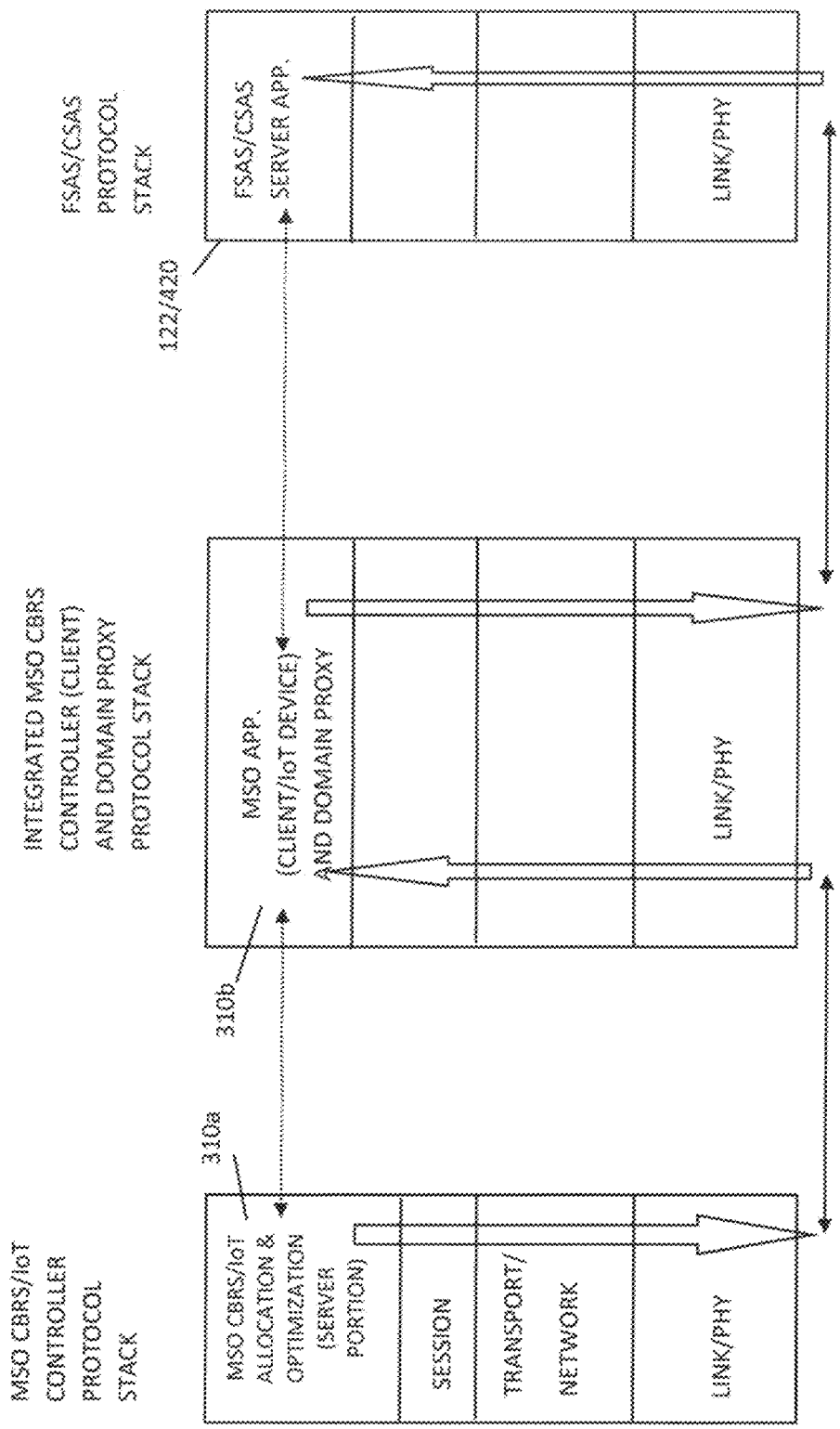

Referring now to FIG. 4b, a second embodiment of a network architecture 430 useful in implementing the CBRS-based wireless RAT access and co-existence methods of the present disclosure. In this embodiment, a distributed architecture for the MSO controller 310 is utilized, and the domain proxy 128 is maintained by the MSO as part of the MSO connection manager "client" disposed at the area or application of interest ("service domain"). Moreover, the IoT analytics engine 413 and the MSO CBRS-IoT controller 310 are combined into a common device/function 310 within the MSO network domain.

In one implementation, the client devices 306c and/or IoT-S/M devices 309a, 309b may each include a connection manager (CM) application computer program 474 operative to run on the client/IoT device and, inter alia, enable the host client/IoT device to operate in a multi-RAT environment (e.g., IoT PAN/WAN, CBRS-LTE, and non-CBRS LTE). As an aside, downloadable application or "app" may be available to client/IoT devices of subscribers of an MSO or cable network (and/or the general public, including MSO "partner" MNO subscribers), where the app allows users to connect to or obtain MSO-provided services while roaming, and/or utilize the MSO infrastructure to access and manage IoT device configuration, operation, including receiving real-time IoT device data generated in situ. Application program interfaces (APIs) may be included in an MSO-provided applications, installed with other proprietary software that comes prepackaged with the client/IoT device, or natively available on the controller apparatus. Such APIs may include common network protocols or programming languages configured to enable communication with other network entities as well as receipt and transmit signals that may be interpreted by a receiving device (e.g., client/IoT device). Alternatively, the relevant MNO may provide its subscribers with the aforementioned functionality (e.g., as a pre-loaded app on the UE at distribution, or later via download), or as a firmware update to the UE stack conducted OTA.

Methods—

Figure 5A:
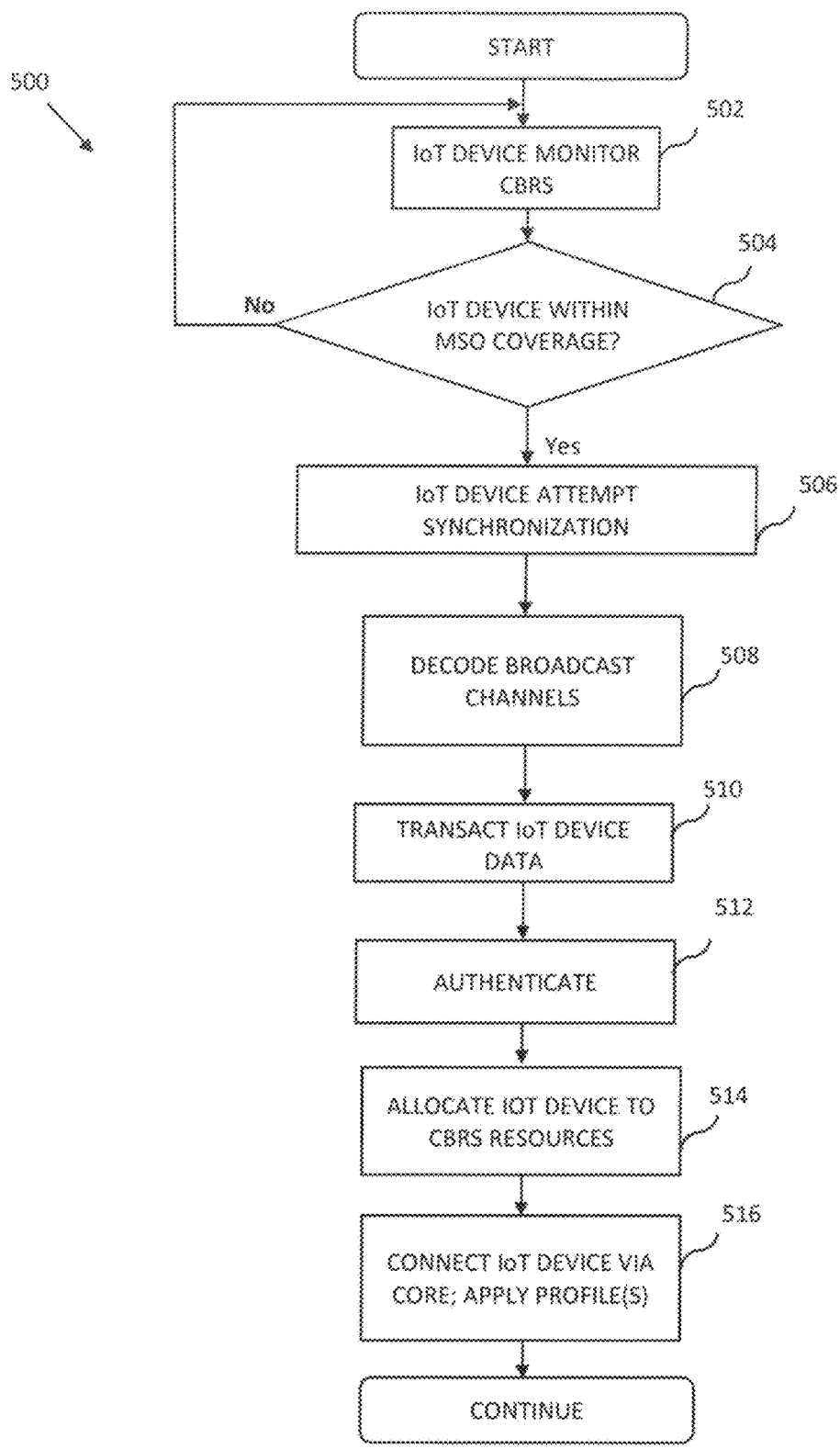
FIG. 5a is logical flow diagram of an exemplary embodiment of a method for enabling connectivity for one or more IoT devices via a quasi-licensed band (e.g., CBRS) according to the present disclosure.
Figure 6:
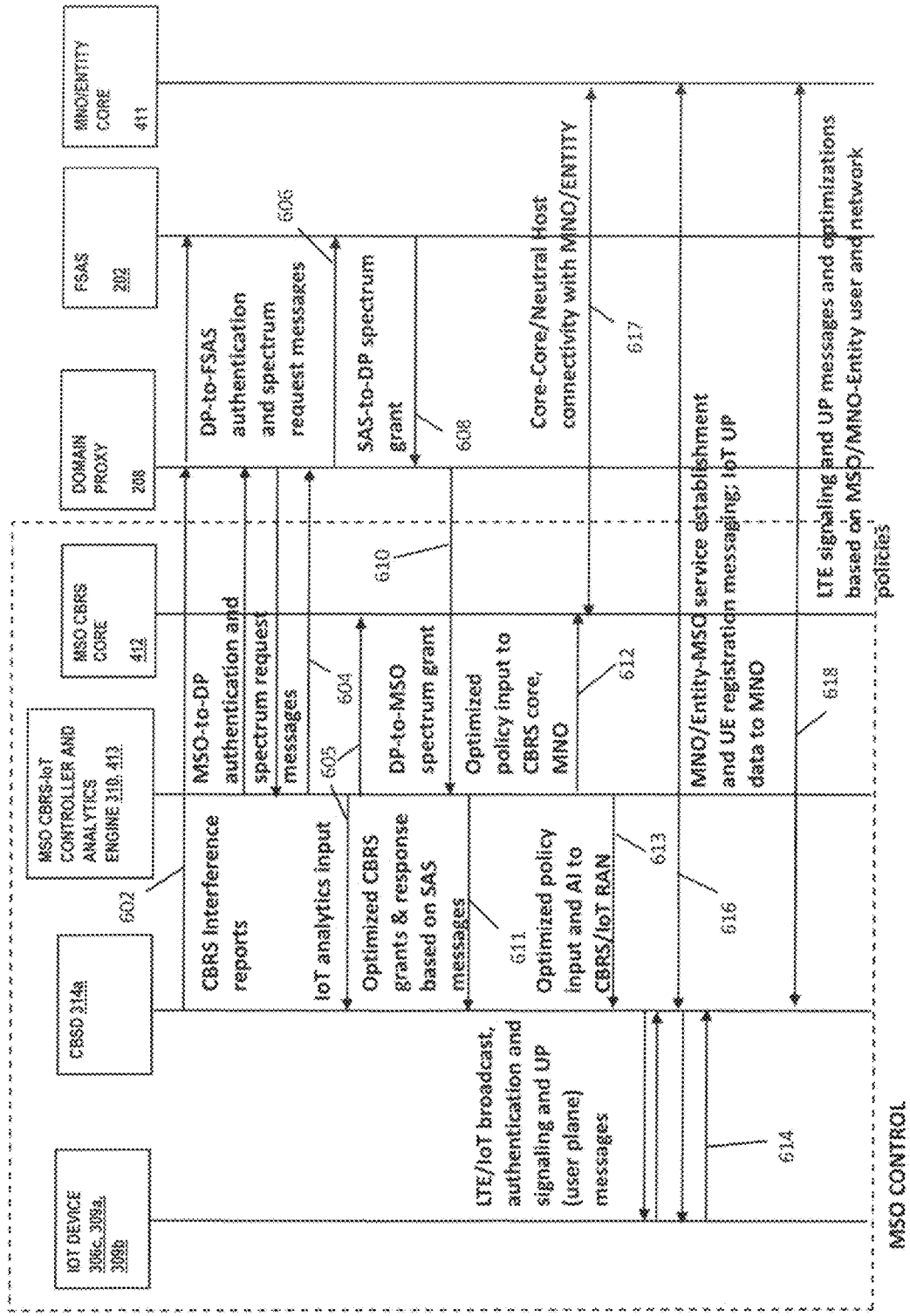
FIG. 6 is a ladder diagram illustrating one embodiment of a communication flow for establishing IoT connectivity via a quasi-licensed band in accordance with the methods of the present disclosure.

Various methods and embodiments thereof for controlling wireless networks according to the present disclosure are now described with respect to FIGS. 5a-6.

Figure 4C:
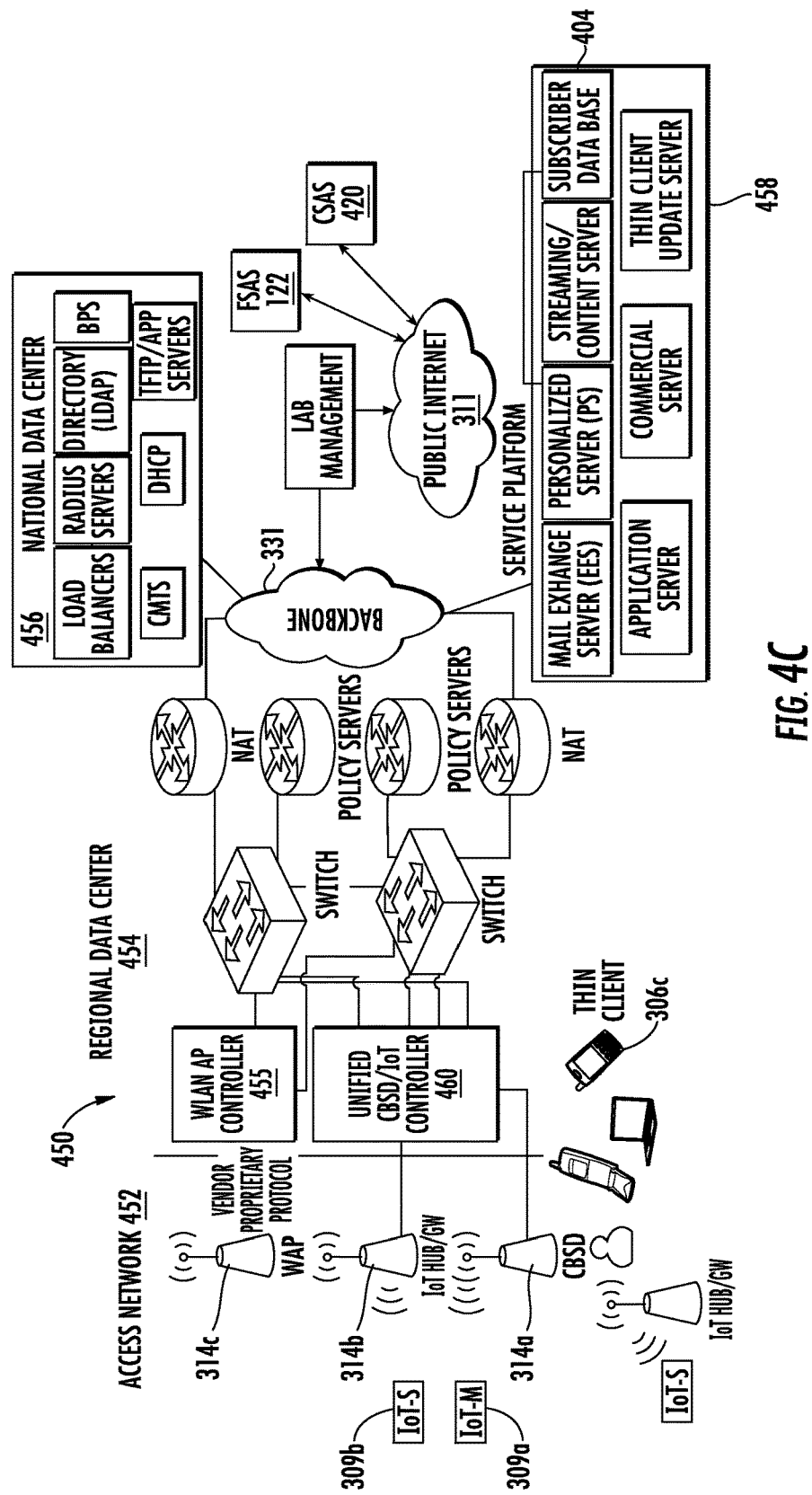
FIG. 4c is a functional block diagram of a third exemplary embodiment of a wireless network infrastructure including unified CBRS, IoT and WLAN control, useful with various aspects of the present disclosure.

FIG. 5a illustrates an exemplary embodiment of a method 500 implemented by the system architecture (e.g., the system 400 as discussed above with respect to FIG. 4a) to enable connectivity to a quasi-licensed wireless network (e.g., CBRS network) by a IoT device (or IoT-enabled client device). The wireless network useful with method 500 is not limited to those embodied in FIGS. 3-4c herein, and may be used with any wireless-enabled IoT or client device and any architecture utilizing data communication among nodes (including those with multiple coexisting networks).

The methodology 500 of FIG. 5a may be used, inter alia, for direct wireless connection of an IoT-enabled device to a CBSD 314a (and hence ultimately to the MSO core and MNO home network as applicable) via the CBRS frequency band, such as via an LTE-U/LTE-LAA TDD technology within the IoT enabled device.

At step 502, the IoT device or IoT-enabled UE monitors the relevant portion of the quasi-licensed spectrum (e.g., the 3.500-3.770 GHz band) to perform energy detection in support of CBRS network entry. The IoT device or UE may be configured to perform such scans indigenously by a home cellular network (e.g., EUTRAN) if applicable, or via an app or other software firmware resident on the IoT device or UE, which may also be supported by the MSO RAN/core. In the exemplary embodiment, the goal of network entry is to identify and synchronize one or more CBSDs 314a within the MSO CBRS network coverage area, and establish a communication session therewith, since the IoT device/UE is presumed to be mobile in this case. Accordingly, in the exemplary embodiments, indigenous LTE-TDD capability is used, since such capability can be readily utilized within an LTE-enabled UE or IoT device. For instance, certain U.S. MNO LTE networks operating within the 2.5 GHz band utilize TDD, and the CBRS "LTE" networks operating within the 3.5 GHz CBRS band of the present disclosure are configured for only TDD operation. Hence, any LTE operator using the 3.5 GHz band per CBRS Alliance specifications will be an (LTE) TDD operator.

Moreover, use of TDD provides certain benefits with respect to unlicensed operation among multiple users (and hence by extension quasi-licensed operation such as within CBRS RANs).

Per step 504, the UE evaluates the monitoring data of the prescribed quasi-licensed spectrum to determine an energy level or establish "detection" of a CBSD 314a of sufficient strength/proximity (e.g., based on RSSI or other value exceeding a prescribed threshold). This will determine if the UE is within the MSO coverage area; other techniques for detection of coverage may be used as well, consistent with the present disclosure. If the UE is not within coverage (e.g., no MSO CBSDs detected), monitoring continues according to a prescribed schedule of higher-layer logic.

Alternatively, if the CBSD 314a is detected, the UE or IoT device attempts to synchronize with the CBSD (step 506) according to the prescribed protocol (e.g., establishing timing via hypothesis testing, reading broadcast channels such as PDCCH and decoding preambles and other data, per step 508) so as to enable the UE/IoT device to at least transact its device-specific data (e.g., IMSI) with the CBSD per step 510. The data is then passed to the MSO controller 310 (and core 412), and the UE/IoT device data is accessed from the MNO (or if resident in the MSO database 404 or prive network 431) so that the UE/IoT device is authenticated to the MSO RAN and core (step 512). Once authenticated, it is provisioned within the CBRS RAN (e.g., as to TDD parameters such as slots, time-frequency resources, CBRS sub-bands, etc.) per step 514, and optionally connected to an MNO core 411 via the MSO core 412 and LTE interfaces 427 per step 516. For example, if the IoT device is an IoT-enabled UE, the UE may have a "home" MNO network operated by their cellular service provider. As described in greater detail below, such connection may also include imposition or enforcement of one or more policies by the user data transacted by the UE/IoT device, such as QoS requirements, prioritization based on MNO identity and/or type of traffic (e.g., voice, data, etc.).

Figure 5B:
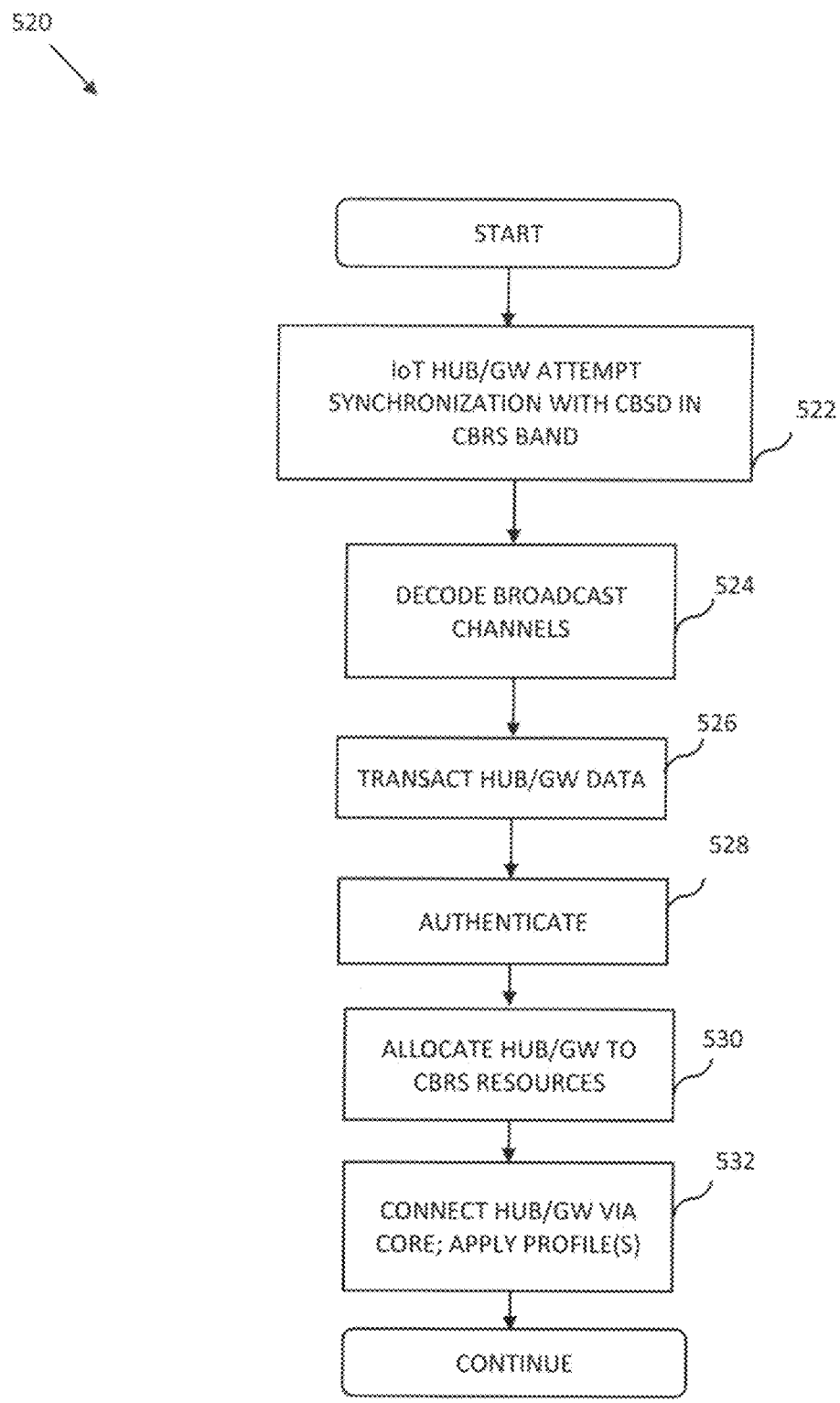
FIG. 5b is logical flow diagram of another exemplary embodiment of a method for enabling connectivity for one or more IoT devices via a quasi-licensed band (e.g., CBRS) according to the present disclosure.

FIG. 5b illustrates another embodiment of a method implemented by the system architecture to enable connectivity to a quasi-licensed wireless network (e.g., CBRS network) by a IoT hub or gateway (GW) device. As with FIG. 5a, the wireless network useful with method 500 is not limited to those embodied in FIGS. 3-4c herein. The methodology 520 of FIG. 5b may be used, for example, in establishing a CBRS-based "backhaul" for an IoT hub or gateway which services a plurality of IoT end devices within a designated CBRS service area. Such area may have multiple hubs or gateways, and hence the CBSD(s) 314a may wirelessly communicate with multiple hubs/gateways in the CBRS band(s), while the latter utilize other bands (e.g., 900 MHz or 2.4 GHz ISM) for end device to hub/GW communications.

At step 522 of the method 520, the IoT hub/GW device 314b attempts to synchronize with the CBSD 314a according to the prescribed protocol (e.g., establishing timing via hypothesis testing, reading broadcast channels such as PDCCH and decoding preambles and other data, per step 524) so as to enable the IoT hub/GW device to at least transact its device-specific data (e.g., IMSI) with the CBSD per step 510. In this instance, the hub/GW device 314b is presumed to be at a fixed location with the designated service area (e.g., at a location with IoT air interface range of the "end" IoT devices (for example building seismic sensors), and hence no evaluation of the presence of the CBSD 314a is required as in FIG. 5a.

Once the hub/GW device 314b synchronizes, the device-specific data is passed to the MSO controller 310 (and core 412) per step 526, and the hub/GW device data is accessed from the MNO (or if resident in the MSO database 404 or private network 431) so that the hub/GW device is authenticated to the MSO RAN and core (step 528). Once authenticated, it is provisioned within the CBRS RAN (e.g., as to TDD parameters such as slots, time-frequency resources, CBRS sub-bands, etc.) per step 530, and optionally connected to an MNO core 411 via the MSO core 412 and LTE interfaces 427 per step 532. Operating profiles may be applied to the hub/GW device 314b, such as those defined by the MSO, and/or any relevant "partner" MNO network as part of step 532. For instance, a structure serviced by a plurality of IoT seismic sensors may be given priority over other applications serviced by the CBSD 314a, due to the emergent need for such data in the event of a seismic event.

Figure 5C:
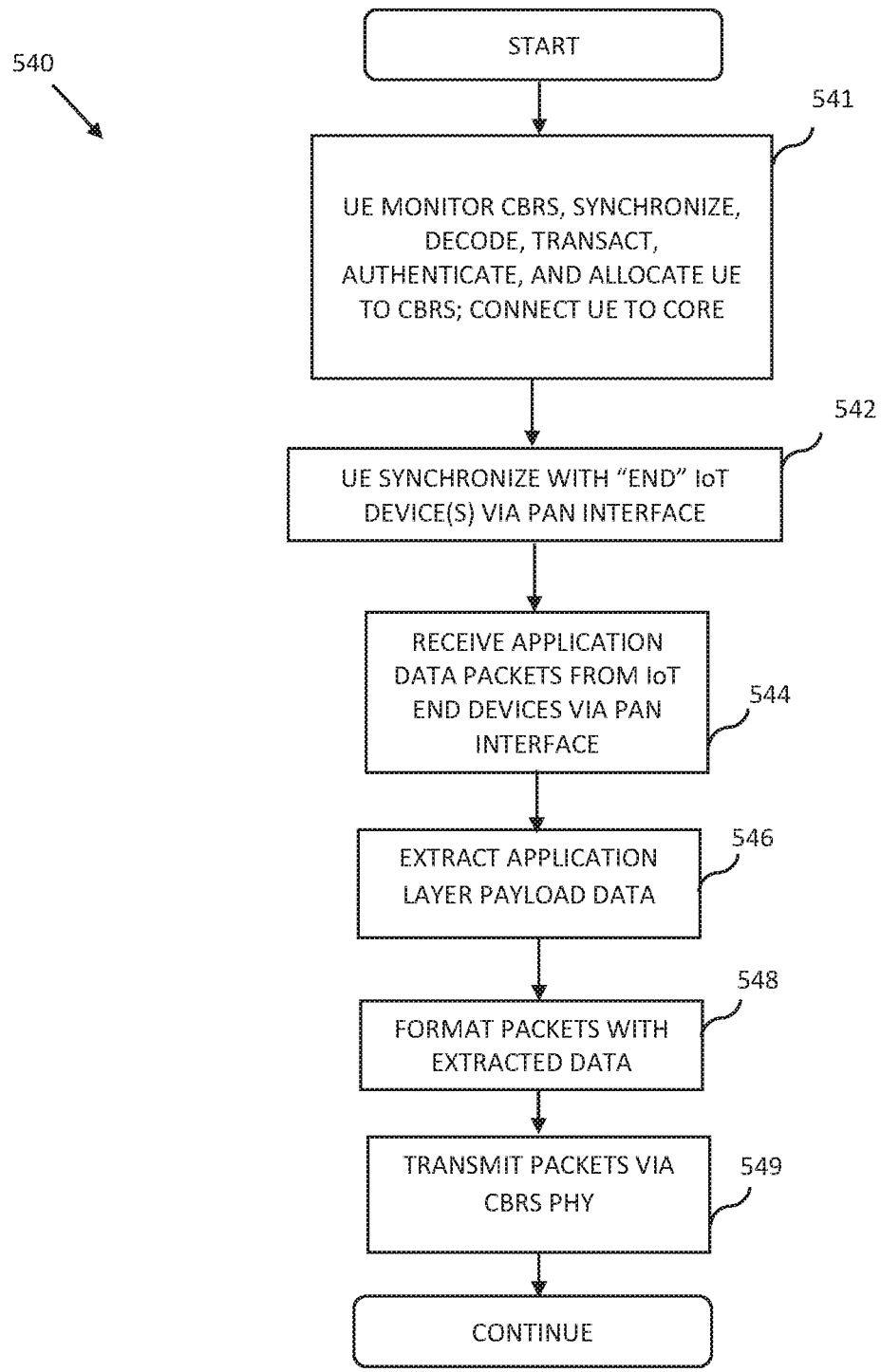
FIG. 5c is logical flow diagram of yet another exemplary embodiment of a method for enabling connectivity for one or more IoT devices via a quasi-licensed band (e.g., CBRS) according to the present disclosure.
Figures 1, 5C:
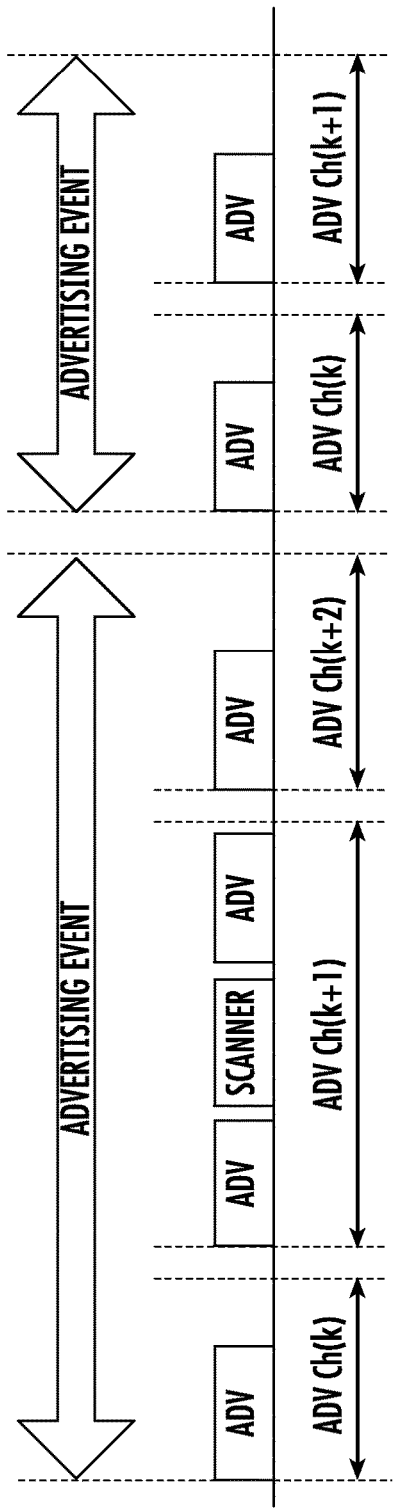
Figures 2, 5C:
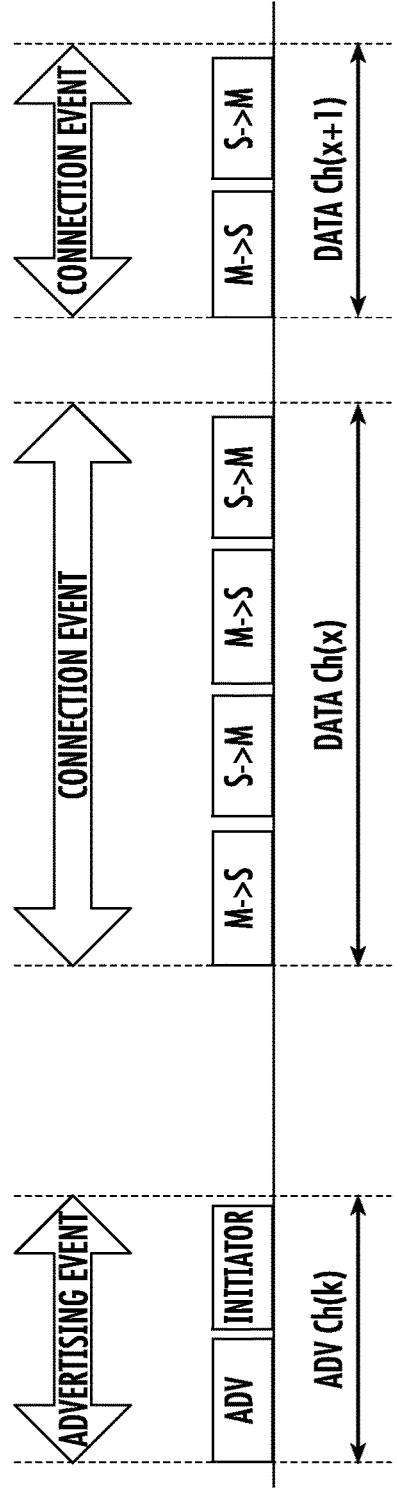
Figures 3, 5C:
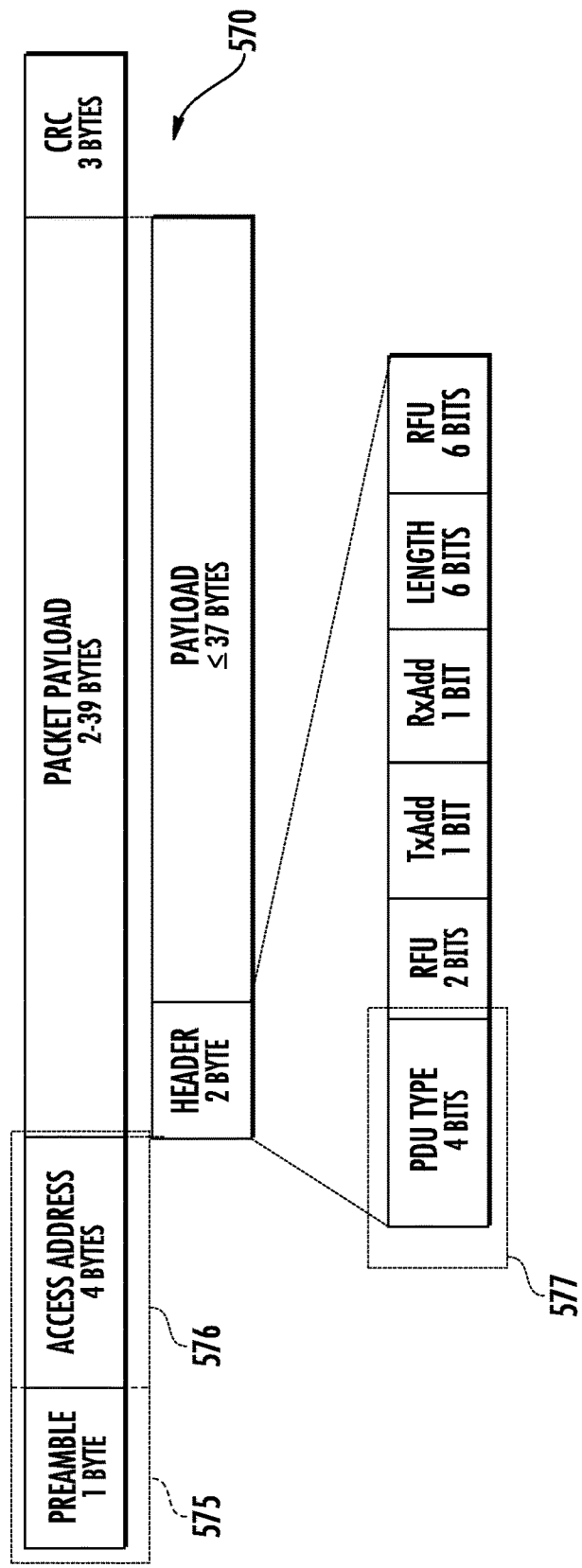
Figures 4, 5C:
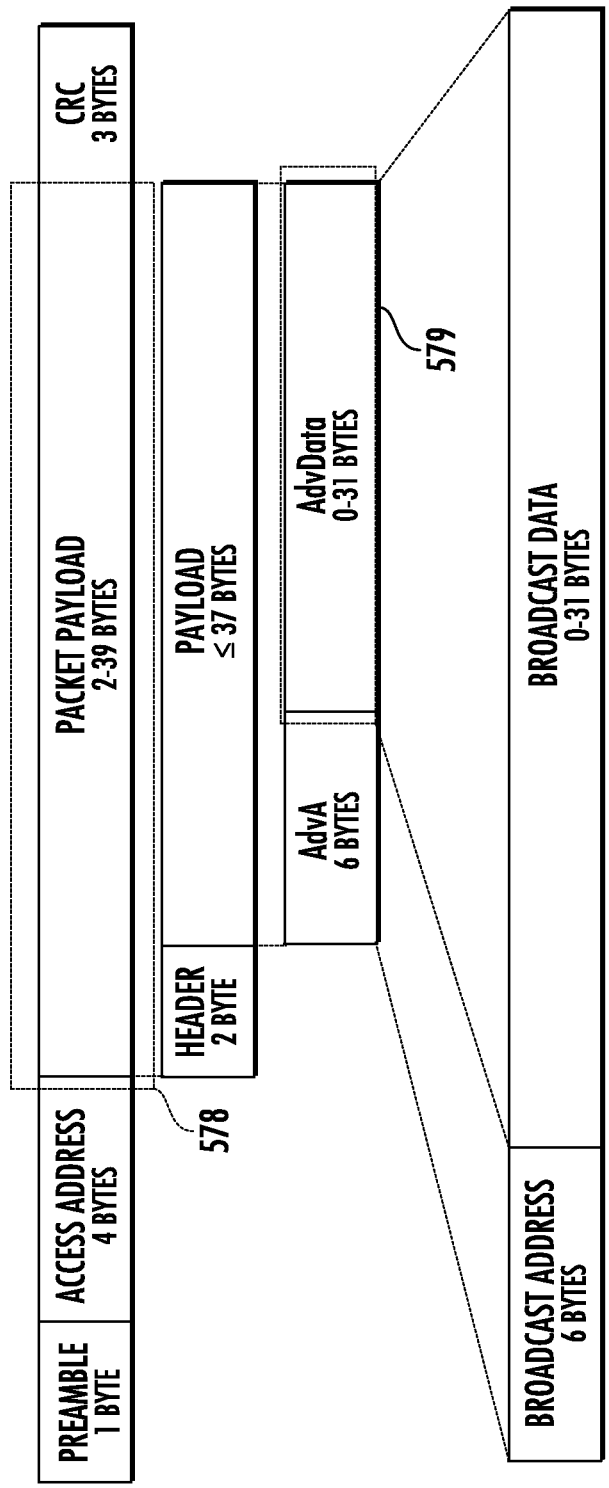

FIG. 5c illustrates yet another embodiment of a method implemented by the system architecture (e.g., the system 400 as discussed above with respect to FIG. 4a) to enable connectivity to a quasi-licensed wireless network (e.g., CBRS network) by a IoT device via a client device. The methodology 540 of FIG. 5a may be used, inter alia, for indirect wireless connection of one or more "end" IoT devices to a CBSD 314a (and hence ultimately to the MSO core and MNO home network as applicable) via the CBRS frequency band, such as via an LTE-U/LTE-LAA TDD technology within a UE, the latter acting as a bridge device between the IoT end devices 309b and the CBSD 314a, since in this scenario the IoT end devices 309b and the CBSD 314a do not share a common air interface technology; for example, the IoT end devices may use BLE or 802.15.4, and the CBSD 314a may use CBRS (over LTE-LAA/U).

At step 541, the IoT device or IoT-enabled UE monitors the relevant portion of the quasi-licensed spectrum (e.g., the 3.500-3.770 GHz band), and identifies and synchronizes with one or more CBSDs 314a within the MSO CBRS network coverage area, establishing a communication session therewith, as described with respect to the method 500 of FIG. 5a above. Upon completion of this portion of the method, the IoT-enabled UE has entered the CBRS domain and established a session, over which it subsequently can transfer IoT application data from any connected IoT end devices 309b.

Per step 542, the UE the establishes one or more communication sessions with one or more IoT end devices 309b via the indigenous PAN (e.g., BLE. Z-Wave, or 802.15.4) interface of the UE, and the corresponding interface of the end IoT device(s) 309b. Once the session(s) is/are established, the UE uses the PAN interface to receive application data packets from the connected IoT device(s) 309b. In one exemplary implementation (see FIGS. 5c-1 through 5c-4), a BLE PAN protocol is used between the UE and the IoT end device(s), as now described in greater detail. It is appreciated that the following discussion is merely exemplary of one possible type of PAN interaction which may be used consistent with the present disclosure.

FIGS. 5c-1 and 5c-2 are graphical representations of prior art BLE advertising and connection event timing, respectively. As shown, for "advertising only" BLE devices, they merely advertise the broadcast packet(s) periodically. For connectable devices, the connection event(s), wherein data can be transacted between the entities, follow the initial advertisement(s).

As an aside, BLE (e.g., 4.2 and 5.0) specifies various categories of "beacons." Non-connectable beacons comprise Bluetooth low energy devices in broadcasting mode; they simply transmit information that is stored internally. Such non-connectable broadcasting does not utilize any receiving overhead, and hence achieves the lowest possible power consumption (i.e., the device wakes up, transmits data and goes back into a sleep mode). The internal data is hence restricted to what is only known to the device internally or what is available through external input via USB, UART, SPI, or other interface of the host device or transmitter. Conversely, connectable beacons are Bluetooth low energy devices in peripheral mode, which can both transmit and receive data. This allows a "host" device (e.g., a UE 306c) to connect and interact with services implemented on the beaconing IoT device, such as where a configurable beacon (device) is updated over the air (OTA) via the BLE interface.

The BLE broadcast data packet 570 (FIGS. 7c-3 and 7c-4) has a preamble 575 of 1 byte and is used for synchronization and timing estimation at the receiver. It always has a value of 0xAA for broadcast packets, as is the access address 576 (set to 0x8E89BED6). The broadcast data packet payload 578 consists of a header and payload. The header describes the packet type, and the PDU type 577 is used to define the purpose of the device. For broadcast applications, there are three different PDU types, as shown in Table 5 below. ADV_IND and ADV_NONCONN_IND refer to the connectable and non-connectable devices described above, while ADV_SCAN_IND comprises a non-connectable broadcast device that can provide additional information via scan responses.

TABLE 5

| PDU Type | Packet Name | Remarks |
| --- | --- | --- |
| 0000 | ADV_IND | Connectable undirected advertising event |
| 0010 | ADV_NONCONN_IND | Non-connectable undirected advertising event |
| 0110 | ADV_SCAN_IND | Scannable undirected advertising event |

The TxAdd bit (FIG. 7c-3) indicates whether the advertiser's address (contained in the payload) is public (TxAdd=0) or random (TxAdd=1). RxAdd is reserved, and does not apply to beacons. The Cyclic Redundancy Check (CRC) is used ensures data integrity for all transmitted packets.

Figure 7A:
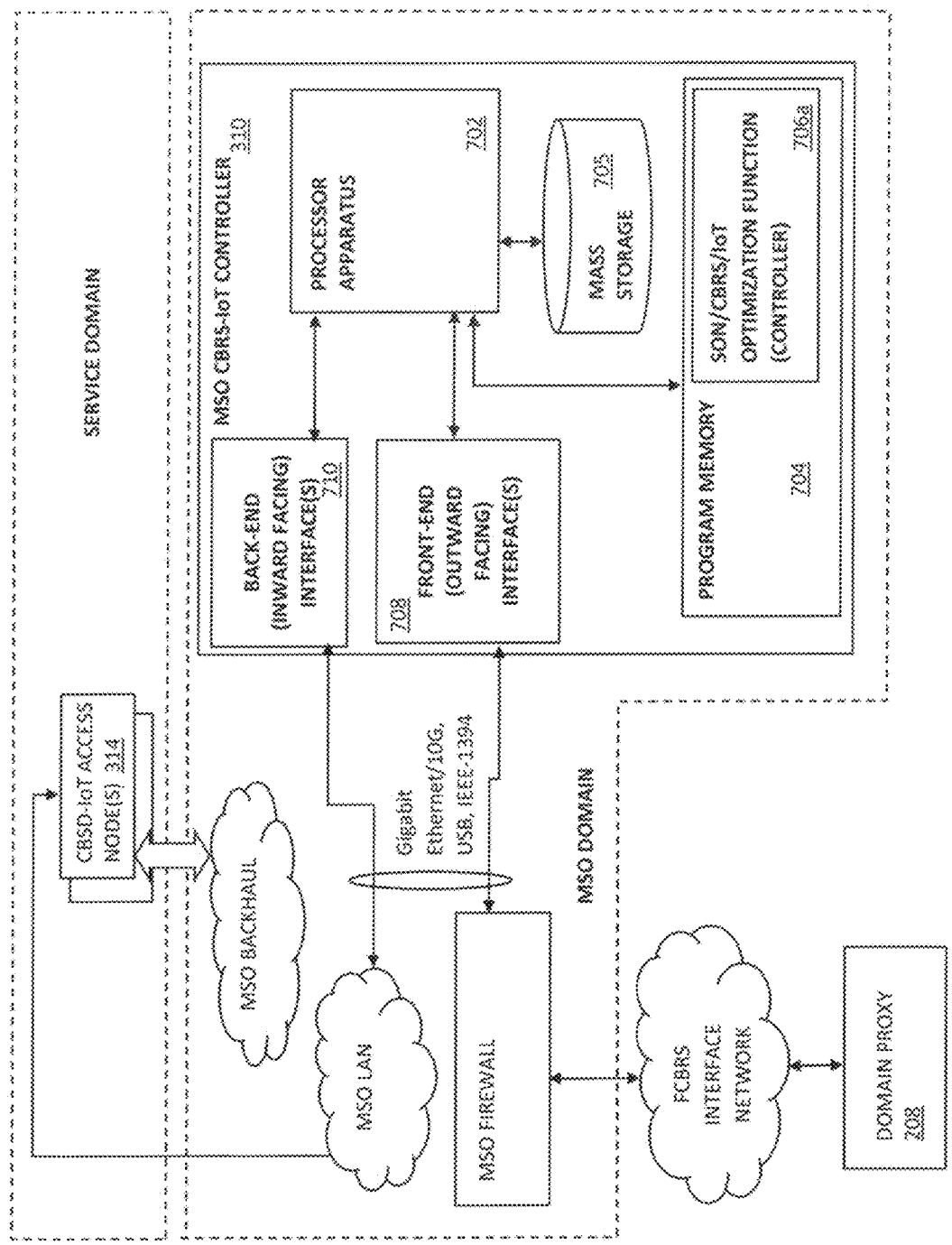
FIG. 7a is a functional block diagram illustrating a first exemplary embodiment of an MSO CBRS-IoT controller apparatus useful with various embodiments of the present disclosure.
Figure 7B:
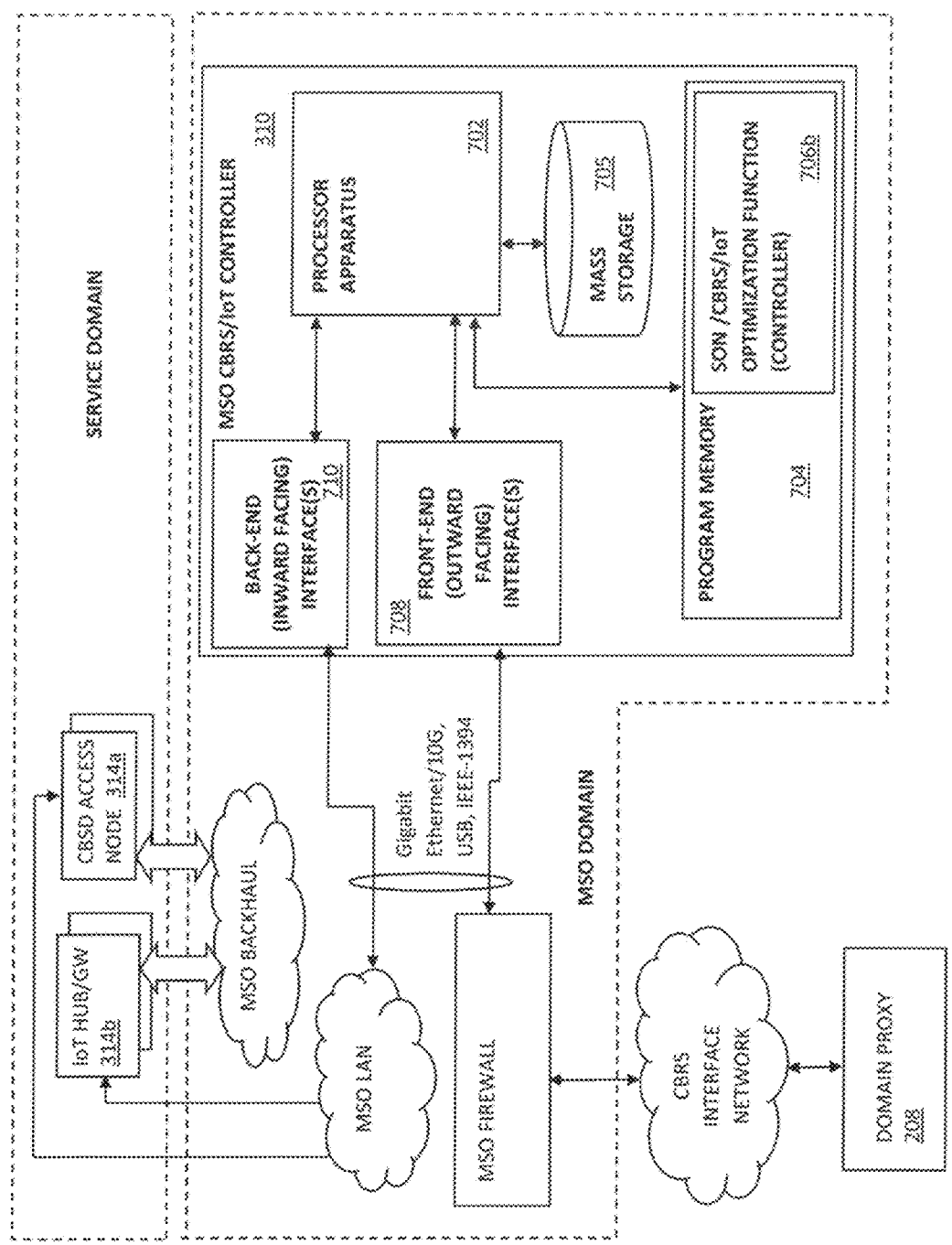
FIG. 7b is a functional block diagram illustrating a second exemplary embodiment of an MSO CBRS-IoT controller apparatus useful with various embodiments of the present disclosure.
Figure 7C:
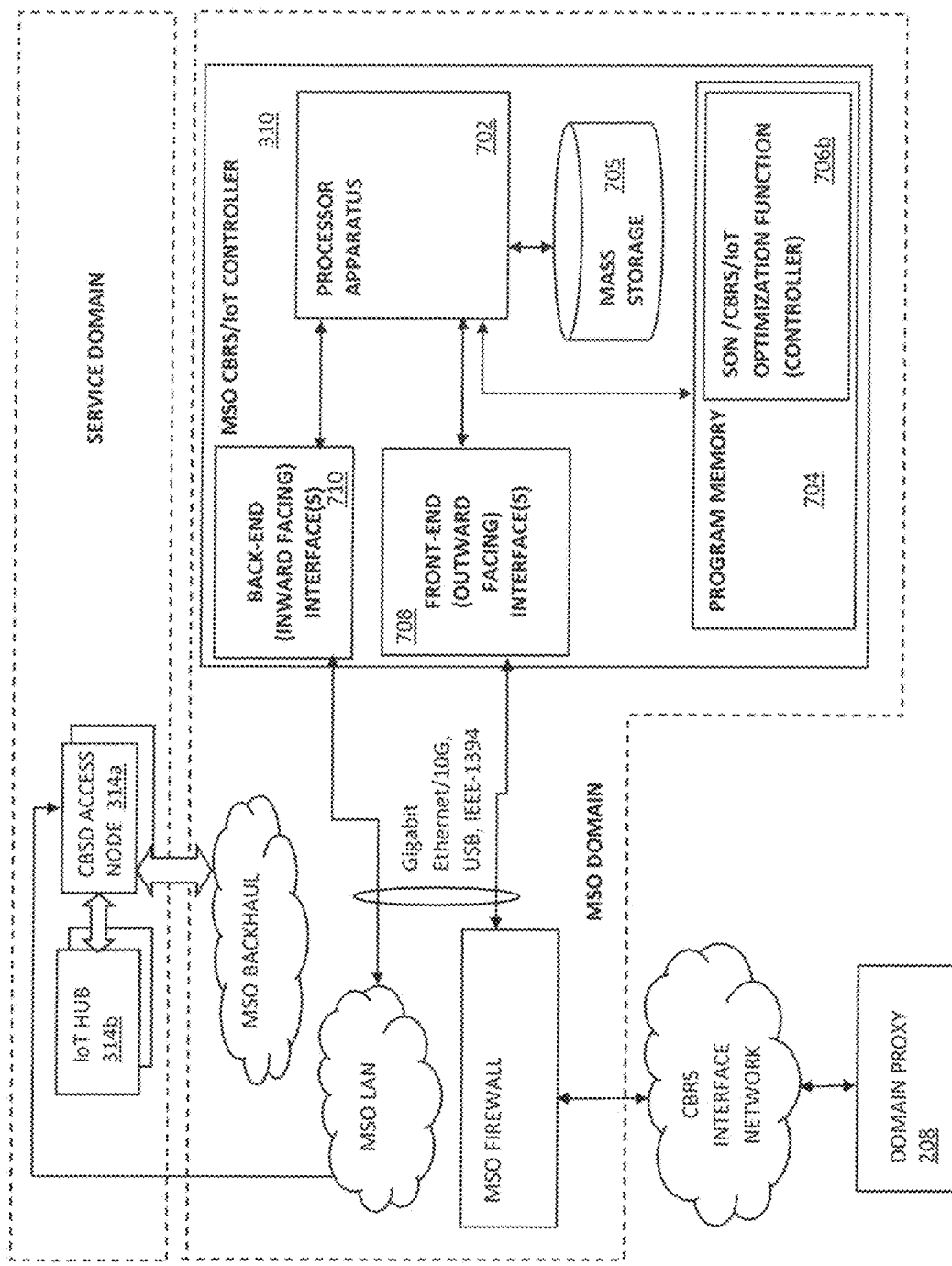
FIG. 7c is a functional block diagram illustrating a third exemplary embodiment of an MSO CBRS-IoT controller apparatus useful with various embodiments of the present disclosure.

The payload 578 of the packet 570 includes the advertiser's address along with user-defined advertised data (see FIG. 7c-4). These fields represent the beacon device's broadcast address and payload data. The broadcast address can be either public or random as noted above; a public address is specified in accordance with IEEE 802-2001 and uses an OUI (Organizationally Unique Identifier), which is obtained from the IEEE Registration Authority. Conversely, random addresses can be generated by the beacon device itself, and can be of multiple types depending on application.

Table 6 shows BLE advertisement data types 779 (FIG. 7c-4).

TABLE 6

| Advertisement Data Type | Value | Remarks |
| --- | --- | --- |
| Flag | 0x01 | Device discovery capabilities |
| Service UUID | 0x02-0x07 | Device GATT services |
| Local name | 0x08-0x09 | Device name |
| TX Power Level | 0x0A | Device output power |
| Manufacturer-Specific Data | 0xFF | User defined |

The first three bytes of the broadcast data (flags—0, 1, 2) define the capabilities of the BLE beacon device, per the BLE Core Specification. The format of these bytes is shown in Table 7 below.

TABLE 7

| Byte | Bit | Value |
| --- | --- | --- |
| 0 | | 0x02 (Length) |
| 1 | | 0x01 |
| 2 | 0 | LE - Limited Discovery |
| | 1 | LE - General Discovery |
| | 2 | BR/EDR not supported |

TABLE 7-continued

| Byte | Bit | Value |
| --- | --- | --- |
| | 3 | LE + BR/EDR (Controller) |
| | 4 | LE + BR/EDR (Host) |
| | 5-7 | Reserved |

Table 8 below shows the format of the manufacturer-specific data (see Table 6) of the packet.

TABLE 8

| Byte | Value | Remarks |
| --- | --- | --- |
| 0 | 0x03-0x1F | Length |
| 1 | 0xFF | Manufacturer data flag |
| 2 | 0x0D | Manufacturer ID |
| 3 | 0x00 | |
| 4-31 | | Optional user data |

The BLE packet format allows a device to broadcast 25 bytes of manufacturer-specific data (ADV_IND or ADV_SCAN_IND). For non-connectable undirected advertising (ADV_NONCONN_IND), the maximum MSD length is 28 bytes.

Returning to FIG. 5c, at step 544, the UE receives via the PAN interface the application data packets (e.g., those of FIGS. 7c-3 and 7c-4 above) from the IoT end device 309b.

At step 546, the UE extracts the relevant payload data from the received packets, and formats the data into new packets (step 548) consistent with transmission over the CBRS PHY bearer per step 549 (e.g., according to an LTE protocol) and the target destination protocol, such as the IoT analytics server 413 and/or an end user (e.g., entity consuming the application data generated by the IoT end device). To the extent the BLE or other IoT data packets can merely be encapsulated in a different "wrapper," such encapsulation may be performed by the UE.

In one variant, the aforementioned extraction and formatting/encapsulation is performed by indigenous processes on the UE; e.g., via an MSO-provided IoT client portion of the type previously described.

Figure 5D:
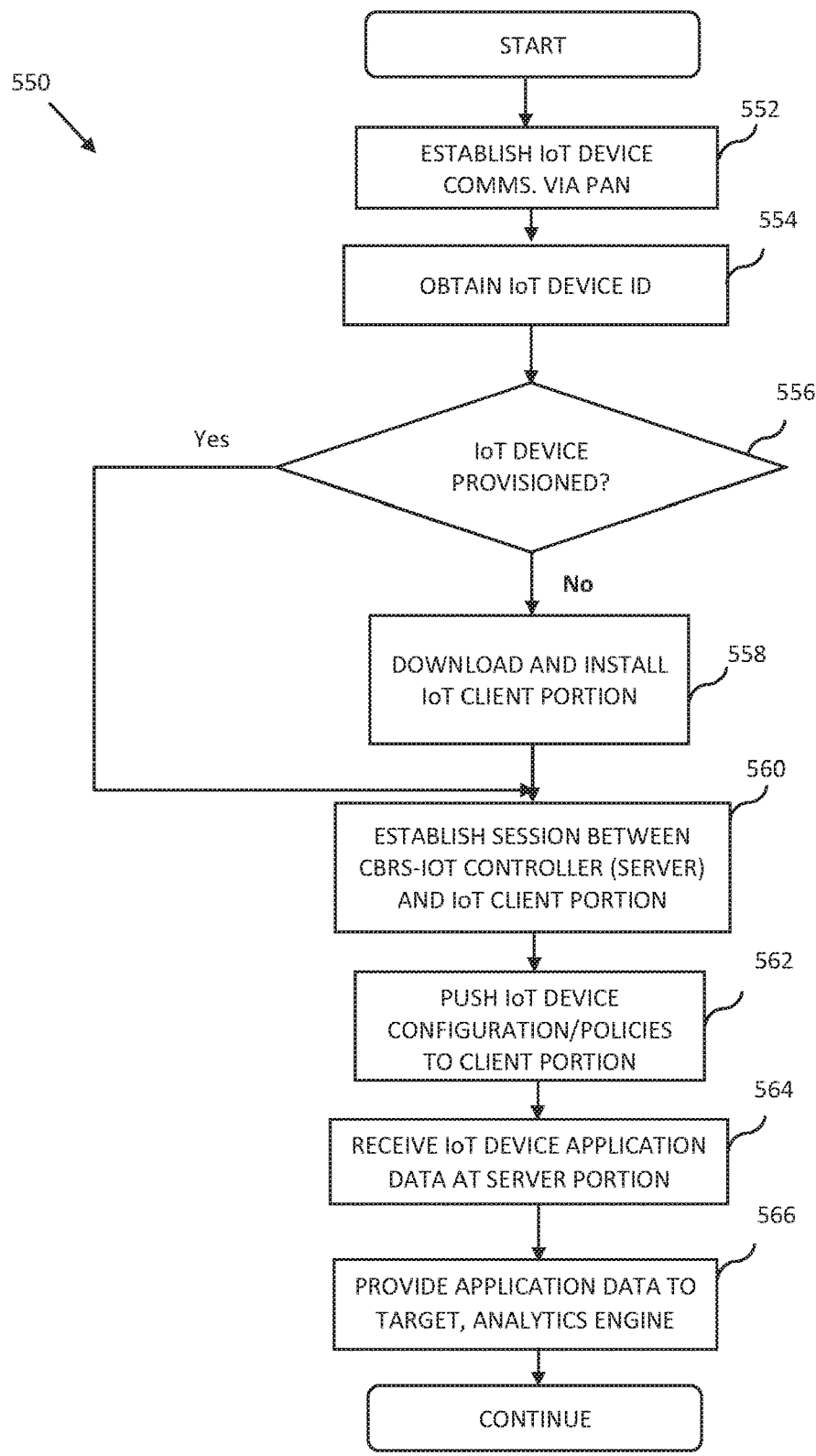
FIG. 5d is logical flow diagram of one exemplary embodiment of a method for provisioning one or more IoT devices for operation within a CBRS-enabled network, according to the present disclosure.

FIG. 5d is logical flow diagram of one exemplary embodiment of a method for provisioning one or more IoT devices for operation within a CBRS-enabled network, according to the present disclosure. Per step 552, communications with the IoT device are established via e.g., a PAN. Per step 554, the IoT device ID is obtained. At step 556, it is determined whether the IoT device is provisioned. If no, then per step 558, an IoT client portion software or firmware is downloaded and installed. If yes, then the method proceeds to step 560, wherein a session is established between the CBRS-IoT controller (server) and the IoT client portion. Per step 562, IoT device configuration and/or policies are pushed to the client portion. Per step 564, IoT application data is subsequently received at the server portion, and the application data distributed to one or more target applications or analytics engines per step 566.

FIG. 6 is a ladder diagram illustrating an exemplary communications flow 600 for configuring and controlling CBRS-IoT connectivity within a target area, premises or infrastructure.

At step 602 of the exemplary embodiment, a CBSD 314a sends an interference report to the designated DP 128. Data of these reports are forwarded to the cognizant FSAS(s) 122 by the DP 128 according to the proper FSAS protocol. The reports may contain information related to, e.g., transmit power of nearby access points and nodes, number of users, channels used, data transmission rates, beamforming settings, modulation/coding scheme (MCS), or other statistics associated with signals propagating within the venue, e.g., signals related to CBRS sub-bands in the 3.550-3.700 GHz range. Per step 604, the MSO controller 310 (here, with integrated metrics/analytics engine 413) decides it needs CBRS spectrum allocated (for whatever reason; e.g., in response to any number of scenarios such as those of FIGS. 5-5c discussed above), and invokes a communication protocol with the DP 128. Such protocol may include for example an authentication (e.g., challenge-response) of the MSO CBRS-IoT controller 310 by the DP, and conversely authentication of the DP 128 by the MSO controller 310 or its security proxy, so as to e.g., mitigate spoofing or MITM attacks.

Per step 605, the CBRS-IoT controller 310 issues messages to the CBSD 314a and MSO core logic 412 providing an IoT analytics "input". The "input" in this embodiment is a command from the analytics engine 413 to gather targeted analytics according to one or more rules or constructs provided by the engine, and send the collected data back to the engine 413 for further processing. It is noted that in certain implementations, the type and/or frequency of the metrics gathered may be changed at the instruction and discretion of the engine 413, such as based on (i) prevailing MSO network conditions, (ii) IoT applications actually in use/operation (and their requirements), (iii) prediction(s) made on insights or trends noted from e.g., previously collected metrics/data; and/or (iv) network operator policies (which may include policies of the hosting MSO, the local IoT application network (e.g., PAN used to service the IoT application prior to backhaul by the MSO network, if independently controlled/operated), or a "partner" MNO with which the IoT application user or controller is associated. Hence, in one implementation, the MSO engine 413 both causes collection of the requisite metrics/data, and utilizes the collected metrics/data in formulating subsequent corrective or adaptive inputs to the CBSDs 314a and other network components (such as the IoT hub 314b) to optimize one or more desired performance attributes for the IoT application.

In response to the input, the CBSD and MSO core logic implement the IoT policies so as to, inter alia, differentiate traffic treatment over the CBSD 314a (CBRS or IoT native) air interface(s) and the MSO backhaul (e.g., DOCSIS cable drop to the CBSDs). Such differential treatment of IoT application traffic may also be extended, via the engine inputs to the MSO core, throughout the MSO network/infrastructure to extend the traffic optimization and prioritization policies throughout the MSO network (including differential treatment of certain traffic types over the others within—the core and infrastructure). For instance, a QoS policy applied to certain IoT application traffic through a portion of the MSO network can be extended "end to end" so as to support requirements of the application. As a simple example, a time-sensitive application such as seismic monitoring may have certain maximum temporal/delay requirements, such that the application implementer may impose such requirements on any MSO or other third party network for carriage of the IoT data traffic. Accordingly, the analytics engine 413 may be programmed to impose these requirements on all such traffic (e.g., as identified by packet, stream, session, or other identifiers) handled by the CBSD(s), DOCSIS backhaul, MSO core, and MSO backbone.

Returning again to FIG. 6, once the DP/controller are mutually authenticated, the DP 128 generates a spectrum request message on behalf of the controller 310 for transmission to the FSAS 122 per step 606. Per step 608, the FSAS 122 responds to the DP with a spectrum grant (or rejection), which is then symmetrically sent to the MSO controller 310 per step 610 using the appropriate MSO/DP protocols (which may differ from those of the FSAS).

Per step 611, the MSO controller 310, after evaluating and conducting optimization of spectrum sub-band allocations to the various CBSDs within a given venue/area (and optionally other venues/areas, depending on coverage), issues its optimized allocations of the sub-bands to the CBSDs 314a of the one or more areas/venues. At this point, the CBSDs configure for operation in the allocated sub-bands (e.g., LTE band 43), and broadcast on their DL channels to advertise their availability to any client/UE within range of the CBSD(s).

Specifically, as is known, LTE systems utilize OFDM on their DL (base to UE), and SC-FDMA on their UL (UE to base), and further employ a number of shared/control channels for a variety of control, signaling, and other functions. These channels exist in both DL and UL directions, and include the: (i) physical downlink control channel (PDCCH); (ii) physical uplink control channel (PUCCH); (iii) physical downlink shared channel (PDSCH); and (iv) physical uplink shared channel (PUSCH). These channels can be decoded by the IoT-enabled device (e.g., UE 306c, and/or IOT-S/M 309a, 309b) and used to establish communication with the CBSD 314a.

Also, per steps 612 and 613, the MSO controller 310 may generate an optimized policy input to the CBRS core (and ultimately the relevant MNO), and the CBRS RAN (i.e., CBSD) based on the policy considerations including MNO user/network policies applicable to the IoT applications being serviced (e.g., where the IoT application is associated with an MNO subscriber or user, whether within the CBRS coverage area or otherwise), such as for bulk billing and provisioning operations, whether by the MSO or MNO.

In the exemplary embodiment, optimization functions within the MSO controller 310 takes into consideration network state, topology (including presence of IoT hubs 314b within the CBRS RAN), load, and user/IoT end device requirements, and generate a request to the SAS service based thereon. The optimization functions also "tune" the response from the SAS entity before sending it to the CBSD 314a (and MNO Core 412 as applicable—see FIGS. 4a and 6). IoT network optimization takes SAS changes, SON functions, and policies, as well as priorities of different traffic types (high priority IoT data such as from real-time seismic or infrastructure failure sensors, etc.) to/from MNO cores or other "consuming" or controlling entities outside the MSO core (such as e.g., a government seismic monitoring agency, enterprise WAN at a university or business campus, etc.). Moreover, priorities of a given MNO or outside serving entity and its users for the CBRS operator (e.g., MSO), as well as the metrics/analytics data generated by the engine 413, are taken into account by the optimization functions of the controller as well, as described in greater detail supra.

In operation, the LTE UE will report its CSI (channel state information, including CQI or channel quality index) via one of the UL channels; i.e., PUSCH or PUCCH, thereby characterizing the RF receiving environment for each reporting UE/IoT device. The eNodeB takes the reported CSI information to develop a schedule for transmission to the UE(s)/IoT device(s) via the PDSCH, and DL resource allocation is made via the PDCCH. UL grants (for UE/IoT device traffic operations such as when no PUSCH is available) are also made by the eNodeB via the PDCCH, based on requests sent via the PUCCH.

Hence, per step 614, the UE(s)/IoT device(s) receive the broadcast channels, synchronize and determine timing (e.g., via CAZAC sequence analysis), and then establish UL communication with the CBSD (operating effectively as an eNodeB) within the sub-bands of interest, including authentication and sign-on of the UE/IoT device to the MNO network. The latter is facilitated in one implementation via one or more service establishment requests to the MNO's designated EUTRAN entity per step 616; e.g., to validate the UE's mobile ID and other subscription information (or IoT identifying data such as MAC address or IoT device ID), and enabling transaction of UP (user plane) data between the client/IoT device and the eNodeB. In this implementation, the MSO infrastructure acts effectively as a conduit or extension of the MNO network, with the MNO core 411 conducing all of the relevant communications operations to establish the UE/IoT and eNB session per the LTE standards, with the CBSD(s) 314a acting as its proxy within the MSO network.

Per step 617, MSO core-to-MNO core user data connectivity is established such that the CBRS-serviced "call" data (e.g., which may be e.g., IoT data generated by the IoT end devices, and/or user data such as voice data or video data) can be transacted between the MSO core and MNO core (or other outside or non-MSO entity) using a high-capacity backhaul (e.g., for at least a portion of the MSO network, a DOCSIS 3.0 or 3.1 backhaul from the CBSD(s) 314a is used, and the data forwarded via the MSO core (e.g., backbone thereof) to the MNO network or other outside entity using for example extant network transport protocols such as TCP/UDP.

Per step 618, the CBSD, the session is optionally configured according to one or more MSO/entity policies as dictated by the controller 310 (and indirectly by the partner MNOs); i.e., according to e.g., previously agreed-upon policies between the MSO and MNO/entity 411, and these policies for the particular session are then communicated to the MNO/entity.

It will also be appreciated that the infrastructure of the present disclosure may be configured to coordinate communication between a "roaming" mobile device (e.g., UE having a CBRS-compatible air interface such as LTE-TDD) associated with a partner MNO and one or more "end" IoT devices, such as for maintaining data session continuity, and/or alerting the IoT devices to the presence (or incipient presence) or absence of the UE within the MSO service area/infrastructure/application. As one example, an MNO-affiliated user may roam into an MSO CBRS coverage area; the MNO/MSO cores may cooperate to establish communication via the CBSD/CBRS infrastructure of the MSO (as described in detail the previously referenced co-pending U.S. patent application Ser. No. 15/785,283 filed Oct. 16, 2017 incorporated supra); e.g., to hand over or maintain an extant communications session previously handled by the MNO (e.g., via LTE licensed spectrum and one or more eNBs of the MNO) to the MSO quasi-licensed spectrum, thereby maintaining continuity of IoT applications for the UE user (e.g., a higher-layer IoT app maintaining a TCP socket/HTTP session running on the UE being utilized by the user while the user is roaming).

Alternatively, it may be advantageous for the IoT end device(s) to be alerted to or aware of the presence (or incipient absence) of the UE, such as for direct communication between the IoT end device(s) and the UE via e.g., PAN interface of the UE and the IoT native interface of the end device(s). For example, the MSO network, once registering the UE and establishing communication therewith via the CBSD 314a (and hence enabling "end to end" communication from the IoT end device(s) through the MSO network and core, and through a CBSD to the UE), may signal the IoT end device(s) and/or intervening hubs or gateways 314b if any (such as via a CBSD or DOCSIS modem being utilized by these devices for backhaul) that the "associated" user's UE is within the CBRS network, and at least prospectively available for direct communication (such as via a 802.15.4 PAN interface). Such signaling may also be used to enable/disable certain functions or features of the IoT end devices or hub s/GWs, such as to awaken them from sleep or dormant mode, enable other apps or functions tailored to user physical presence (e.g., lighting, security, HVAC, audio-visual, data logging, or other "smart infrastructure functions).

CBRS Controller Apparatus—

FIG. 7a illustrates a block diagram of exemplary hardware and architecture of a controller apparatus, e.g., the CBRS-IoT controller 310 of FIG. 4a, useful for operation in accordance with the present disclosure.

In one exemplary embodiment as shown, the controller 310 includes, inter alia, a processor apparatus or subsystem 702, a program memory module 704, a connectivity manager module 706a (here implemented as software or firmware operative to execute on the processor 702), a back-end (inward-facing) network interface 710 for internal MSO communications and control data communication with the relevant CBSD(s) 314a, and a front-end or outward-facing network interface 708 for communication with the DP 128 (and ultimately the FSAS 202 via a Federal secure interface network, or CSAS 420) via an MSO-maintained firewall or other security architecture. Since CBRS controllers could feasibly be employed for surreptitious activity, each should be secure from, inter alia, intrusive attacks or other such events originating from the public Internet/ISP network 311 (FIG. 3a) or other sources.

Accordingly, in one exemplary embodiment, the controllers 310 are each configured to utilize a non-public IP address within a CBRS "DMZ" of the MSO network. As a brief aside, so-called DMZs (demilitarized zones) within a network are physical or logical sub-networks that separate an internal LAN, WAN, PAN, or other such network from other untrusted networks, usually the Internet. External-facing servers, resources and services are disposed within the DMZ so they are accessible from the Internet (and hence e.g., DPs 128 responding to MSO-initiated CBRS spectrum allocation requests), but the rest of the internal MSO infrastructure remains unreachable or partitioned. This provides an additional layer of security to the internal infrastructure, as it restricts the ability of surreptitious entities or processes to directly access internal MSO servers and data via the untrusted network, such as via a DP "spoof" or MITM attack.

In addition, the controller 310 of the exemplary implementation is configured to only respond to a restricted set of protocol functions; i.e., authentication challenges from a valid DP 128 or SAS 122 (i.e., those on a "white list" maintained by the MSO), requests for interference monitoring data from a DP or SAS, resource allocation ACKs, etc.

Although the exemplary CBRS-IoT controller 310 may be used as described within the present disclosure, those of ordinary skill in the related arts will readily appreciate, given the present disclosure, that the controller apparatus may be virtualized and/or distributed within other network or service domain entities (as in the distributed controller architecture of FIGS. 4b and 7b described below), and hence the foregoing apparatus 310 is purely illustrative.

More particularly, the exemplary controller apparatus 310 can be physically located near or within the centralized operator network (e.g., MSO network); within or co-located with a CBSD 314a (as in the embodiment of FIG. 4b); within an intermediate entity, e.g., within a data center, such as a WLAN AP controller (see FIG. 4c); and/or within "cloud" entities or other portions of the infrastructure of which the rest of the wireless network (as discussed supra) is a part, whether owned/operated by the MSO or otherwise. In some embodiments, the CBRS-IoT controller 310 may be one of several controllers, each having equivalent effectiveness or different levels of use, e.g., within a hierarchy (e.g., the controller 310 may be under a "parent" controller that manages multiple slave or subordinate controllers, with each of the "slaves" for example being designated to control functions within their own respective venue(s)).

In one embodiment, the processor apparatus 702 may include one or more of a digital signal processor, microprocessor, field-programmable gate array, or plurality of processing components mounted on one or more substrates. The processor apparatus 702 may also comprise an internal cache memory. The processing subsystem is in communication with a program memory module or subsystem 704, where the latter may include memory which may comprise, e.g., SRAM, flash and/or SDRAM components. The memory module 704 may implement one or more of direct memory access (DMA) type hardware, so as to facilitate data accesses as is well known in the art. The memory module of the exemplary embodiment contains one or more computer-executable instructions that are executable by the processor apparatus 702. A mass storage device (e.g., HDD or SSD, or even NAND flash or the like) is also provided as shown.

The processor apparatus 702 is configured to execute at least one computer program stored in memory 704 (e.g., the logic of the CBRS-IoT controller in the form of software or firmware that implements the various controller functions described herein with respect to CBRS spectrum allocation, CBSD environmental monitoring, provisioning of IOT devices, etc.). Other embodiments may implement such functionality within dedicated hardware, logic, and/or specialized co-processors (not shown).

In one embodiment, the connectivity optimization manager 706a is further configured to register known downstream devices (e.g., access nodes including CBSDs 314a and IoT hubs or gateways 314b), other backend devices, and wireless client or IoT devices (remotely located or otherwise), and centrally control the broader wireless network (and any constituent peer-to-peer and IoT sub-networks). Such configuration include, e.g., providing network identification (e.g., to CBSDs, IoT hubs/gateways, client/IoT devices, and other devices, or to upstream devices), identifying network congestion, Self Optimization (SO) functions, and managing capabilities supported by the wireless network. In one implementation, one or more primary factors is/are used as a basis to structure the optimization to maximize or optimize the primary factor(s). For example, if the goal at given instance is to push a larger amount of data (i.e., throughput) such as in the uplink direction (UL) from a network of connected IoT sensor devices, the IoT devices/hubs with better signaling may be chosen by the optimization logic to transact more data in an efficient manner (effectively "path of least resistance" logic). This can also be applied to for instance a higher priority or service tier vs. a lower tier; the higher tier may be allocated available bandwidth (at least to a prescribed degree or value) before bandwidth is allocated to the lower tier, so as to ensure the connectivity for the higher tier devices is sufficient. Alternatively, the goal may be more equitable distribution of resources (i.e., radio/backhaul/core resources) among different users, access networks, partners and/or different types of services (e.g., QoS versus non-QoS, time-sensitive versus non-time sensitive, etc.), logic to balance the resources across the different IoT end user network, etc. may be employed. See, e.g., U.S. Pat. No. 9,730,143 to Gormley, et al. issued Aug. 8, 2017 and entitled "Method and apparatus for self organizing networks;" U.S. Pat. No. 9,591,491 to Tapia issued Mar. 7, 2017 entitled "Self-organizing wireless backhaul among cellular access points;" and U.S. Pat. No. 9,730,135 to Rahman issued Aug. 8, 2017, entitled "Radio access network resource configuration for groups of mobile devices," each of the foregoing incorporated herein by reference in its entirety, for exemplary SON implementations useful with various aspects of the present disclosure.

In some embodiments, the connectivity optimization manager 706a may also be capable of obtaining data, and even use M2M learning or other logic to identify and learn patterns among detected RF signals (e.g., CBSD allocations and/or withdrawals occur at certain times of day or locations, or how often a particular CBSD 314a needs to implement re-allocation of CBRS spectrum). Patterns may be derived from, for example, analysis of historical data collected from the reports from the LTE radio suite 809 (FIG. 8a), the MSO database 404, or other sources over time.

In one embodiment, the optimization manager 706a accesses the mass storage 705 (or the CBRS DB 404) to retrieve stored data. The data or information may relate to reports or configuration files as noted above. Such reports or files may be accessible by the optimization manager 706a and/or processor 702, as well as other network entities, e.g., a CM 444 provisioning server 417 (FIG. 4b) or wireless nodes (CBSDs 314a or hubs/GWs 314b).

In other embodiments, application program interfaces (APIs) such as those included in an application program provided by the MSO or an IoT managing entity, installed with other proprietary software, or natively available on the controller apparatus (e.g., as part of the computer program noted supra or exclusively internal to the optimization manager 706a) may also reside in the internal cache or other memory 704. Such APIs may include common network protocols or programming languages configured to enable communication with other network entities as well as receipt and transmit signals that a receiving device (e.g., CBSD, hub/GW, client/IoT device) may interpret.

In another embodiment, the optimization manager 706 is further configured to communicate with one or more authentication, authorization, and accounting (AAA) servers of the network. The AAA servers are configured to provide services for, e.g., authorization and/or control of network subscribers for controlling access and enforcing policies related thereto with respect to computer resources, auditing usage, and providing the information necessary to bill for services. AAA servers may further be useful for providing subscriber-exclusive features or content via, e.g., downloadable MSO-provided applications.

In some variants, authentication processes are configured to identify a CBSD 314a or a hub/GW 314b, a client device 306c, IoT-S/M device 309a, 309b, or an end user, such as by having the IoT device or a user/manager thereof identify provide valid credentials (e.g., user name and password, or Globally Unique Identifier (GUID)) before network access or other services provided by the operator may be granted to the client/IoT device and its user. Following authentication, the AAA servers may grant authorization to a subscriber user for certain features, functions, and/or tasks, including access to MSO-provided IoT management account, cloud storage account, network availability or other performance data, billing information, etc. Authentication processes may be configured to identify or estimate which of the known CBSDs 314a serviced by the CBRS controller 310 tend to serve users or client-IoT devices that subscribe to the MSO's services, thereby providing additional insights with respect to how a particular CBSD may be treated. For example, if a first CBSD serves many clients/IoT devices relative to another CBSD, the controller 310 may favor the first CBSD by, e.g., allocating CBRS sub-bands preferentially or in greater number/bandwidth, resulting in a better or additional end-device connectivity for subscribers/devices using that first CBSD.

Returning to the exemplary embodiment as shown in FIG. 7a, one or more network "front-end" or outward-facing interfaces 708 are utilized in the illustrated embodiment for communication with external (non-MSO) network entities, e.g., DPs 128, via, e.g., Ethernet or other wired and/or wireless data network protocols.

In the exemplary embodiment, one or more backend interfaces 710 are configured to transact one or more network address packets with other MSO networked devices, particularly backend apparatus such as the MSO-operated CBSDs 314a and IoT hub s/GWs 314b (FIG. 7b) within the target service area or application. Other MSO entities such as the MSO CMTS, Layer 3 switch, network monitoring center, AAA server, etc. may also be in communication with the controller 310 according to a network protocol. Common examples of network routing protocols include for example: Internet Protocol (IP), Internetwork Packet Exchange (IPX), and Open Systems Interconnection (OSI) based network technologies (e.g., Asynchronous Transfer Mode (ATM), Synchronous Optical Networking (SONET), Synchronous Digital Hierarchy (SDH), Frame Relay). In one embodiment, the backend network interface(s) 710 operate(s) in signal communication with the backbone of the content delivery network (CDN), such as that of FIGS. 3-4c. These interfaces might comprise, for instance, GbE (Gigabit Ethernet) or other interfaces of suitable bandwidth capability.

It will also be appreciated that the two interfaces 708, 710 may be aggregated together and/or shared with other extant data interfaces, such as in cases where a controller function is virtualized within another component, such as an MSO network server performing that function.

FIG. 7b is a functional block diagram illustrating a second exemplary embodiment of an MSO CBRS-IoT controller apparatus. In the embodiment of FIG. 7b, the controller 310 is configured to interface with one or more IoT hubs/GWs 314b within the service area or application (in addition to the CBSDs 314a), and includes a connectivity optimization function 706b that considers data relating to both hub/GW and CBSD functions, and optimizes MSO user or subscriber performance for both collectively. For example, in one implementation, the logic of the controller function 706b obtains hub/GW performance data relating to one or more MSO users or subscribers in the service area or application (including e.g., data throughput; frequency of dropped connections, other sensed interferers in the selected IoT frequency band(s), which may differ from the CBRS bands), and utilizes such data to (i) allocate CBRS spectrum to any users experiencing IoT PAN degradation (and whose client/IoT devices include the appropriate RAT technology for the co-located CBSDs; e.g., LTE, and (ii) cause request for spectrum within the CBRS band(s) from the relevant SAS function if not already allocated to the venue. Moreover, the controller function 706b can provide the aforementioned CBRS interference reporting functions (as may be mandated by the FSAS or CSAS), and manage frequency band migration within the CBRS bands in the case of spectrum withdrawal by the cognizant SAS.

FIG. 7c is a functional block diagram illustrating a third exemplary embodiment of an MSO CBRS-IoT controller apparatus. In this embodiment, the controller 310 controls the CBSD(s) 314a within the target area/application, and the hubs/GWs 314b utilize respective CBSDs 314a as "backhaul." Specifically, as previously described, the IoT-S end devices 309b interface with the hub/GW 314b via their respective IoT (e.g., PAN) interfaces to transact end-device data, while the hub/GW 314b uses the allocated CBRS spectrum to communicate with the CBSD 314a, the latter backhauled to the MSO core via e.g., DOCSIS cable drop.

Figure 7D:
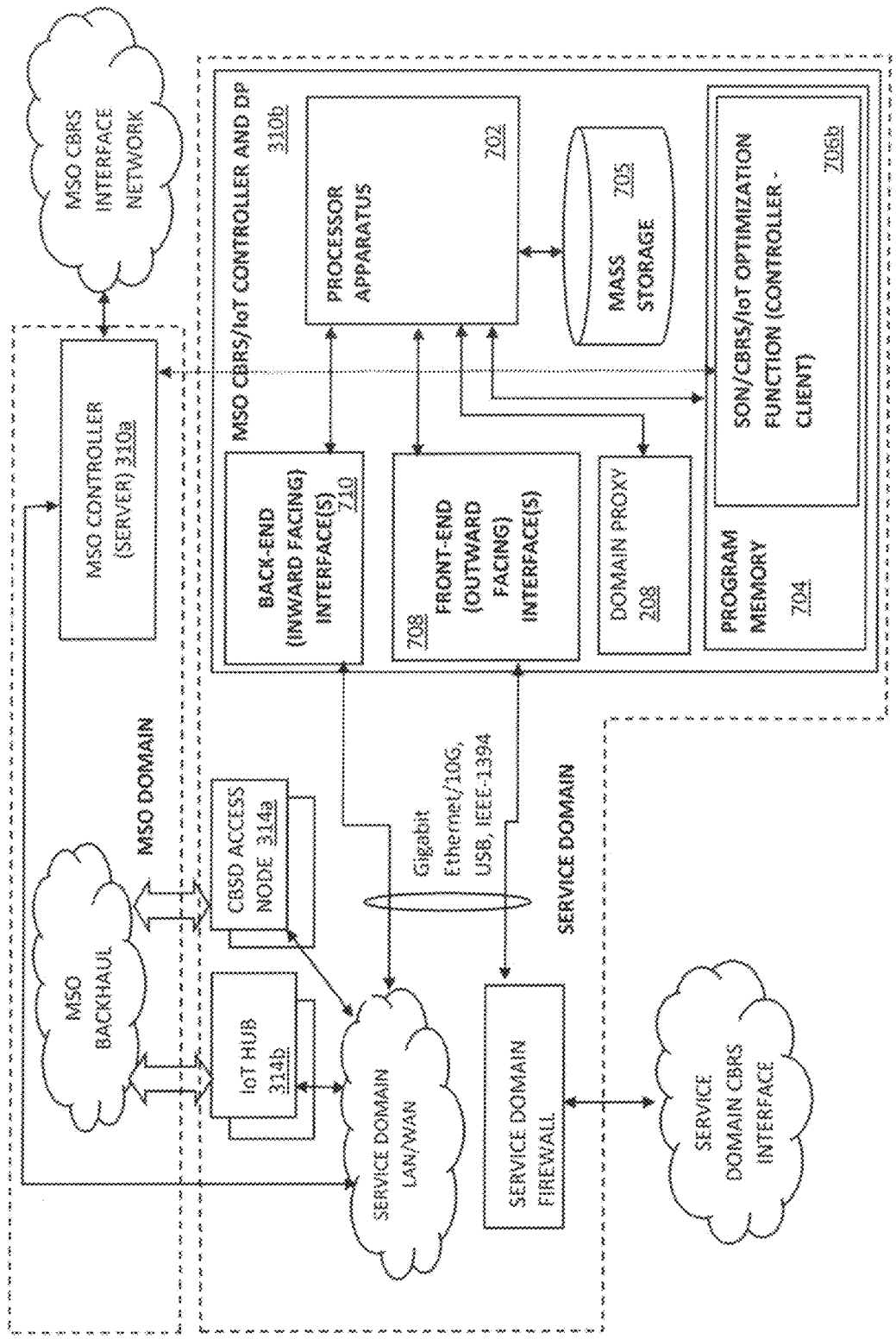
FIG. 7d is a functional block diagram illustrating a fourth exemplary embodiment of an MSO CBRS-IoT controller apparatus useful with various embodiments of the present disclosure.

FIG. 7d is a functional block diagram illustrating a fourth exemplary embodiment of an MSO CBRS-IoT controller apparatus. In this embodiment, the controller 310 (client portion in the form of the mobility optimization process 706b), CBSDs 314a, hubs/GWs 314b, and DP 128 are integrated into the controller apparatus 310b disposed within the target service domain. The hub/GW and CBSD utilize the MSO backhaul 311 as the high-speed "data pipe" for IoT and CBRS communications within the venue (which can operate in parallel), and the CBSD and hub/GW are connected for control functions to the controller 310b via a local service area LAN or WAN (e.g., LAN/WAN operative to connect the MSO to the target area). Logical communication is maintained between the server and client controller portions 310, 310b via the LAN/WAN or other means. The server portion 310a can communicate via its own CBRS access network to the FSAS 122 or CSAS 420 (e.g., via an external DP, not shown), as can the target area/application system. In this manner, at least some communications such as CBSD environment reporting to the FSAS 122 can be conducted independently of the MSO if desired, and likewise the MSO server portion 310b can access data and make spectrum allocation requests (e.g., for other venues) independently of the local controller 310b or target area/application system.

CBSD Apparatus—

Figure 8A:
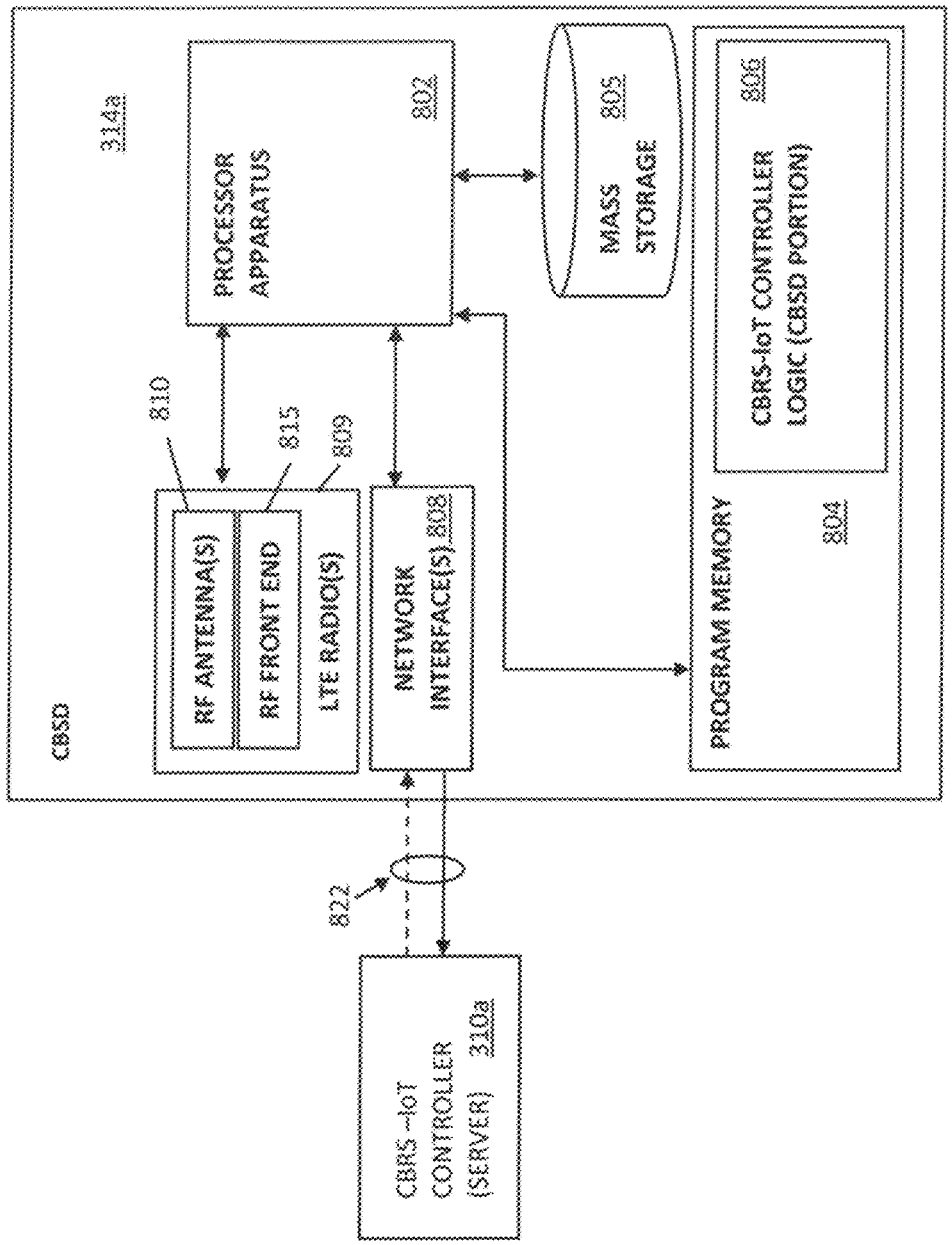
FIG. 8a is a functional block diagram illustrating an exemplary Citizens Broadband radio Service Device (CBSD) useful with various embodiments of the present disclosure.

FIG. 8a illustrates an exemplary CBSD access node 314a according to the present disclosure. As shown, the CBSD 314a includes, inter alia, a processor apparatus or subsystem 802, a program memory module 804, mass storage 805, a CBRS client or local portion 806, one or more network (e.g., controller server portion 310a and LAN) interfaces 808, as well as one or more radio frequency (RF) devices 809 having, inter alia, antenna(e) 810 and one or more RF tuners 815.

In the exemplary embodiment, the processor 802 may include one or more of a digital signal processor, microprocessor, field-programmable gate array, or plurality of processing components mounted on one or more substrates. The processor 802 may also comprise an internal cache memory, and is in communication with a memory subsystem 804, which can comprise, e.g., SRAM, flash and/or SDRAM components. The memory subsystem may implement one or more of DMA type hardware, so as to facilitate data accesses as is well known in the art. The memory subsystem of the exemplary embodiment contains computer-executable instructions which are executable by the processor 802.

The RF antenna(s) 810 are configured to detect signals from radio access technologies (RATs) in the venue. For example, LTE (including, e.g., LTE, LTE-A, LTE-U, LTE-LAA) signals may be detected, along with networking information such as number and type of RATs (e.g., LTE, LTE-A, LTE-U, LTE-LAA), frequency bands used (e.g., 2.4, CBRS bands, or 5.0 GHz among others), channels the signals are occupying, number of connections, etc. As referenced elsewhere herein, the antenna(s) 810 of the scanner may include multiple spatially diverse individual elements in e.g., a MIMO- or MISO-type configuration, such that spatial diversity of the received signals can be utilized. Moreover, a phased array or similar arrangement can be used for spatial resolution within the environment, such as based on time delays associated with signals received by respective elements.

The tuner 815 in one embodiment comprises a digitally controlled RF tuner capable of reception of signals via the RF front end (receive chain) of the scanner radio 809 in the aforementioned bands, including simultaneous reception (e.g., both 2.4 and 5.0 GHz band at the same time), and has sufficient reception bandwidth to identify emitters that are significantly below or above the above-listed nominal frequencies, yet still within the relevant operating band restrictions (e.g., within the relevant ISM band).

The processing apparatus 802 is configured to execute at least one computer program stored in memory 804 (e.g., a non-transitory computer readable storage medium); in the illustrated embodiment, such programs include a scanner portion of the CM application 806. Other embodiments may implement such functionality within dedicated hardware, logic, and/or specialized co-processors (not shown).

In the illustrated embodiment, the CBSD 314a includes the connectivity manager module portion 806. The connectivity manager 806 is a firmware or software module that collects information regarding the radio signals via the radio 809 into a report or other data structure that is parse-able and capable of analysis by the CBRS-IoT 310 (server portion) and/or other upstream or backend entities such as the analytics engine 413.

In some embodiments, the connectivity manager program 806 utilizes memory 804 or other storage 805 configured to temporarily hold a number of data reports or files before transmission via the backend interface(s) 810 to the controller 310. In other embodiments, application program interfaces (APIs) such as those included in an MSO-provided application or those natively available on the AP (e.g., as part of the computer program noted supra or associated with the connectivity manager 806) may also reside in the internal cache or other memory 804. Such APIs may include common network protocols or programming languages configured to enable communication with the controller 310 and other network entities as well as use procedures for collecting, compressing and/or parsing information obtained via the antenna(s) 808 and radio 809 such that a receiving device (e.g., controller 310 may interpret the reports in order to extract and analyze the relevant information.

Figure 8B:
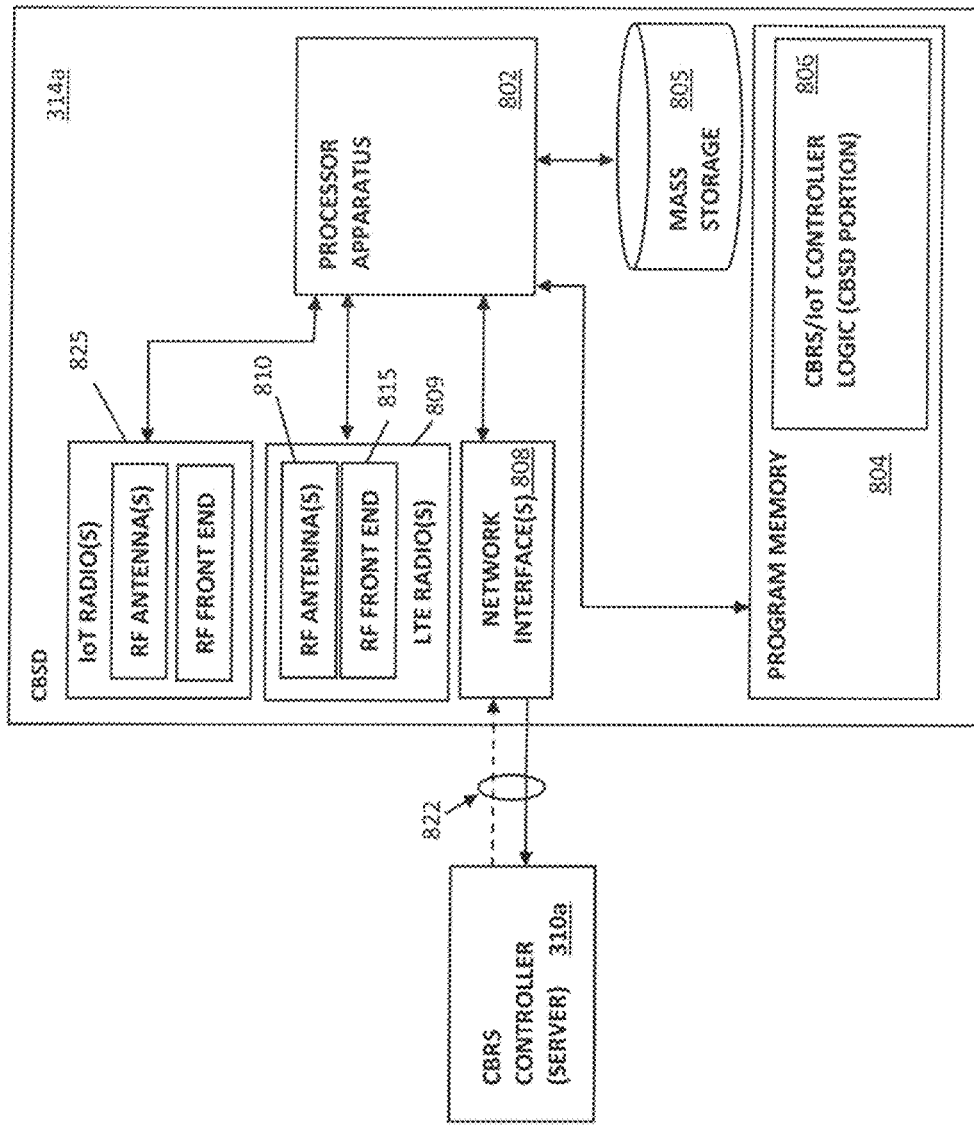
FIG. 8b is a functional block diagram illustrating another embodiment of an exemplary Citizens Broadband radio Service Device (CBSD) including WLAN AP functionality, useful with various embodiments of the present disclosure.

FIG. 8b is a functional block diagram illustrating another embodiment of an exemplary Citizens Broadband radio Service Device (CBSD) including IoT functionality. In this embodiment, an IoT radio device 825 is included, and is configured to operate within (and optionally characterize) one or more sub-bands within one or more identified RF bands commonly used by IoT equipment. While not so limited, it is contemplated that in nearly all applications, unlicensed spectrum will be utilized for IoT communications other than those via quasi-licensed bands (e.g., CBRS), such as that within the so-called ISM-bands, as described supra.

The IoT radio module(s) 825 is/are in data communications (e.g., via PCIe or other data bus structure) with the CPU 802, and in logical communication with the CBRS-IoT logic 806, the latter to enable the logic to, inter alia, receive data obtained by the module(s) 825, and control their operation and/or configuration. The CBRS-IoT controller (CBSD portion) 806 is also optionally in logical communication with the provisioning server 417 (i.e., for updates, configuration changes, or other functions), as well as the controller 310 (server portion), as discussed elsewhere herein. For instance, the controller logic 806 may utilize a socket or port by which it can be addressed by the provisioning server 417 or controller 310 via the interposed network architecture (i.e., the MSO LAN and HFC distribution network).

Figure 2A:
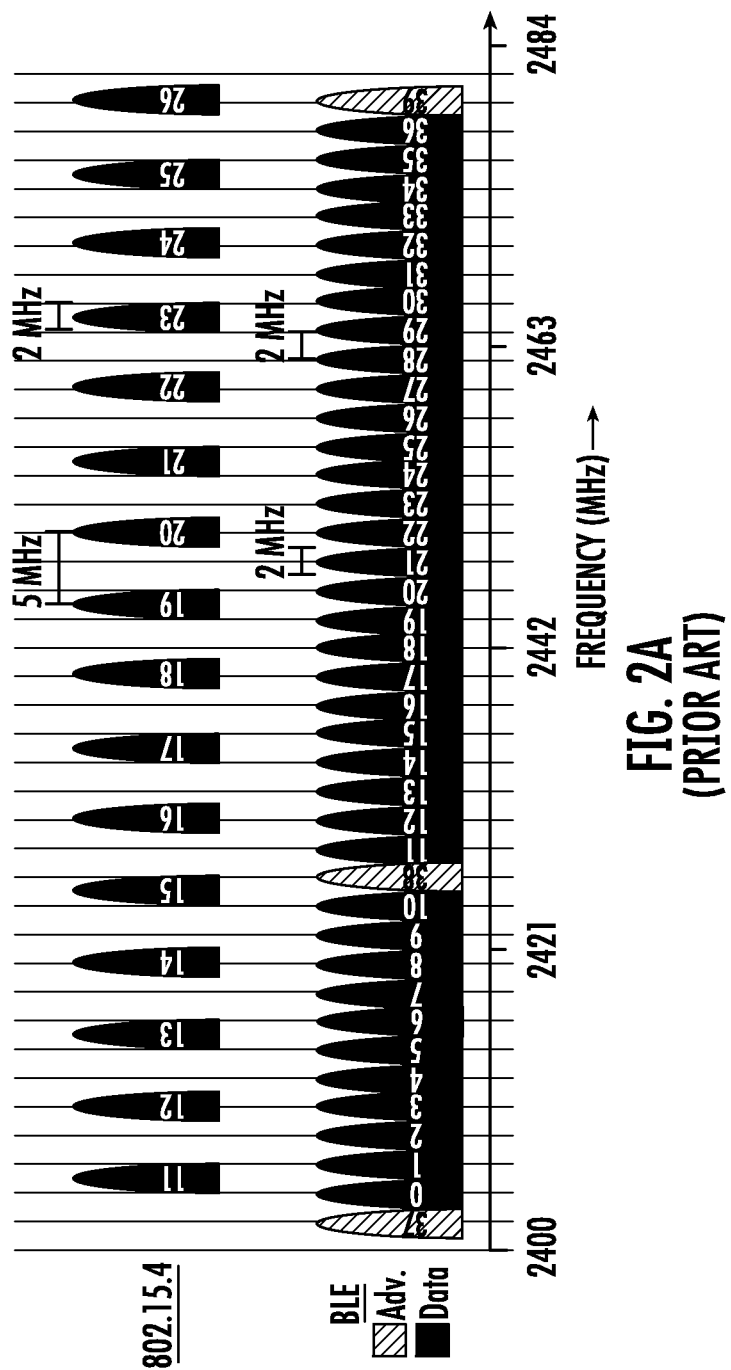
FIG. 2a is a graphical representation of frequency bands associated with prior art IEEE Std. 802.15.4 and Bluetooth Low Energy (BLE) wireless interfaces.
Figure 2B:
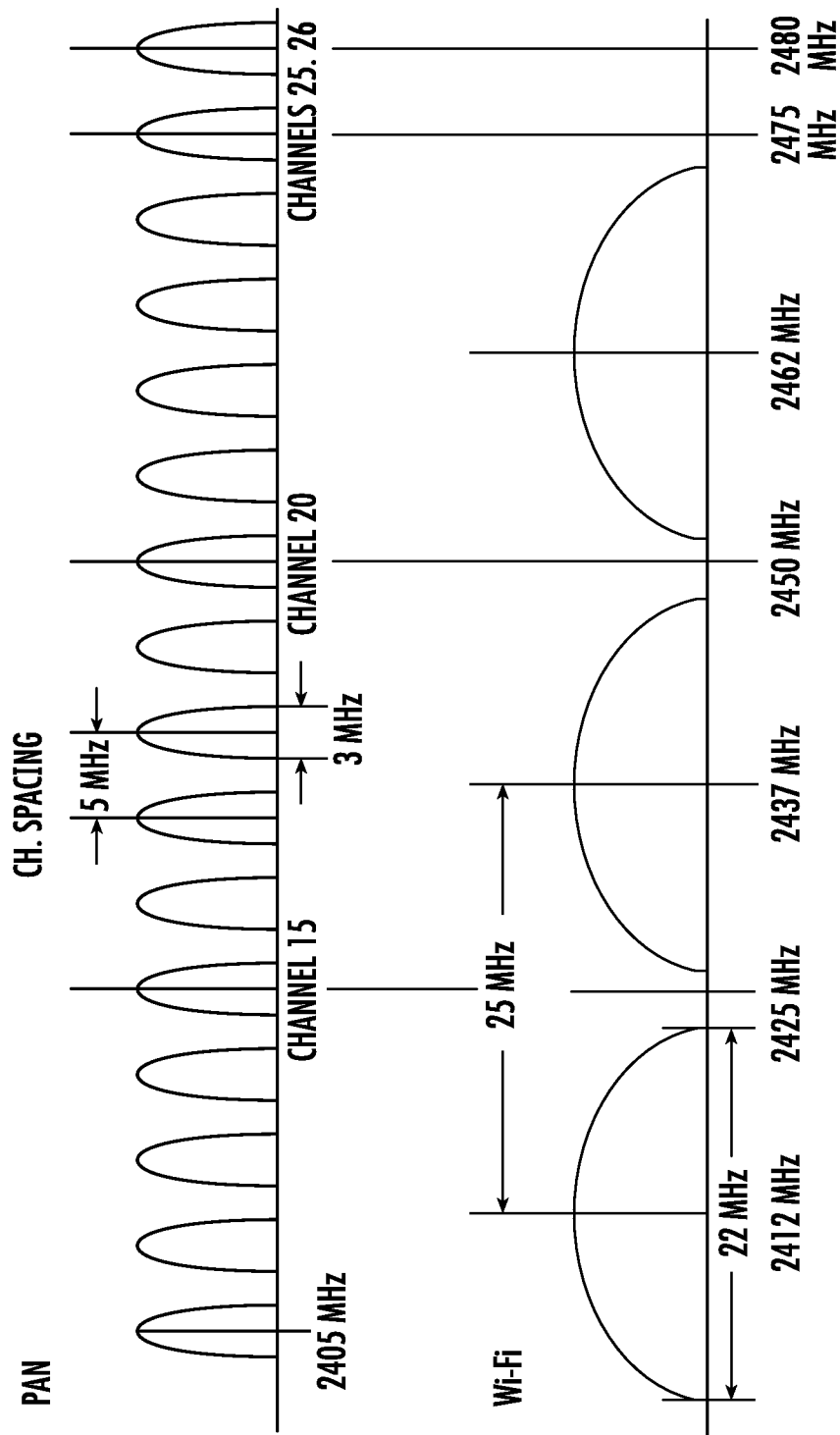
FIG. 2b is a graphical representation of frequency bands associated with prior art IEEE Std. 802.15.4 and Wi-Fi wireless interfaces.
Figure 2C:
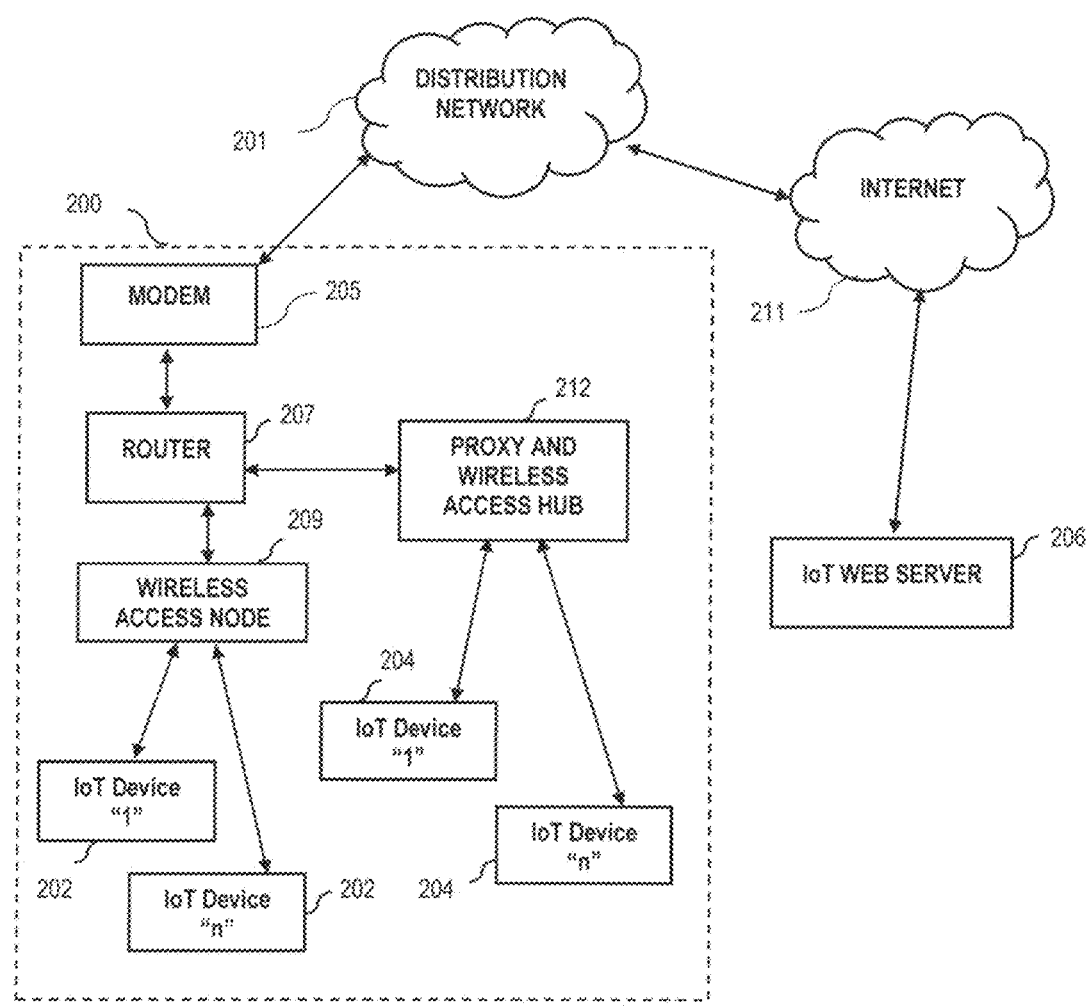
FIG. 2c is a functional block diagram illustrating typical prior art premises IoT configurations.

In terms of structure, one exemplary embodiment of the IoT radio suite 825 includes a software-defined radio (SDR) having one or more antennae elements tuned for the RF frequency band(s) of interest. For example, in one variant, the antennae elements operate in the 2.4 GHz sub-bands associated with IEEE Std. 802.15.4 and BLE, so as to permit at least detection of energy and reception of data (e.g., beacons or broadcast packets) generated by IoT devices within the target service area or application using those sub-bands. Advantageously, the SDR of one exemplary implementation is software-controlled e.g., by the CBRS-IoT controller client portion 806, and/or logic of the SDR (such as via firmware operative to execute on a microcontroller or ASIC of the SDR chipset, or on the CPU 802) so as to configure its receive front-end chain and transmit chain to operate at the prescribed frequency and utilize the prescribed MCS (modulation and coding scheme) associated with the "target" IoT interface(s). For instance, the SDR can be configured to identify a BLE energy signature within the three (3) "advertising" sub-bands shown in FIG. 2a (i.e., 37, 38, and 39 at 2402, 2426, and 2480 MHz respectively). A PCIe or other data interface is utilized within the CSD to provide internal data transfers between the SDR and other components of the CBSD 314a.

Exemplary implementations of the SDR of the IoT-enabled CBSD 314a of FIG. 8a and aspects thereof are described in U.S. Pat. No. 9,654,149 to Piipponen, et al. issued May 16, 2017 and entitled "Multiple radio instances using software defined radio," U.S. Pat. No. 9,612,816 to Choi, et al. issued Apr. 4, 2017 and entitled "Method for operating software defined radio application," and U.S. Pat. No. 9,564,932 to Pack, et al. issued Feb. 7, 2017 and entitled "Software defined radio front end," each of the foregoing incorporated herein by reference in its entirety.

It is also noted that while the term "sub-band(s)" as used herein can refer to discrete frequencies or bands of frequency, it can also represent broader swaths of frequency spectrum. For instance, in one implementation, the SDR is implemented to receive and analyze a broader range of frequencies (e.g., 800 MHz to 2.5 GHz) contemporaneously, such as to identify relative energy peaks within that spectrum (as opposed to analyzing a number of narrow bands successively). In one such implementation, a FFT (fast Fourier transform) is utilized by the SDR to identify energy peaks at certain frequencies within the broader spectrum relative to the prevailing noise floor. Hence, the CBRS-IoT controller logic may be configured to evaluate the relative magnitude of the peaks relative to the surrounding frequencies, such as via ratio of absolute amplitudes, to identify energy "spikes" that are putatively associated with IoT transmitters in the target area or application.

Applications and Use Cases—

The foregoing examples and embodiments may be utilized for, inter alia, methods directed to furthering business or operational goals of service providers (e.g., cable operators).

In one exemplary aspect, the present disclosure couples the prior realization that LTE can be utilized with unlicensed spectrum (i.e., per LTE/LTE-A, LTE-LAA or LTE-U) and its inherent advantage in range over, inter alia, PAN and WLAN technologies such as 802.15.4 and BLE and Wi-Fi (802.11), with some of the stronger attributes of the "Wi-Fi" model (i.e., easy and free access, ubiquity, comparatively good performance), to provide MSO users and subscribers with end-to-end connectivity for IoT installations and functions. The following example use cases and applications are provided to further illustrate these principles; it will be appreciated by those of ordinary skill, given the present disclosure, that any number of other applications and use cases may utilize various aspects described herein.

Pallet Tracking for Logistics—

As a first example, the methods and apparatus described herein to provide users or subscribers (or their proxies) with an ability to track pallets or other modular freight or shipping containers. Being able to track pallets or other containers to determine, e.g., the location and/or condition of goods is highly desirable for any number of reasons, and can be readily leveraged using LTE—U/LAA or any other unlicensed technologies which are suited to these requirements. For example, in one implementation, an MSO subscriber with extant DOCSIS cable "drops" can install one or more CBSDs 314a (e.g., small cells or the like); built-in LTE-U/LAA-enabled sensors of the pallets or modular containers communicate with the CBSDs 314a via the CBRS band, as previously described herein. Such CBSDs may be fixed in nature (e.g., positioned by the end user or a logistics contractor so as to ensure complete coverage and achieve other goals such as redundancy), or even mobile, such as where one or more CBSD units are deployed on a moving vehicle such as a crane, forklift, or other logistics-related vehicle or moving structure.

Moreover, recipient subscribers can utilize one or more small-cell CBSDs 314a within their premises or facility to track the received LTE-U/LAA enabled goods (e.g., via pallets or containers), and communicate receipt of such to the shipping entity.

Utility Metering—

Utility providers (e.g., electric, water, gas) may require high data rates, frequent communication, and/or low latency for support of metering operations. Since utility meters typically have a power source available (i.e., the serving grid, low-voltage supplies at the premises, etc.), they do not require ultra-low power consumption (or associated long battery lifetime). Utility companies need real-time monitoring of the grid, so they can make immediate decisions based on load, outages and other interruptions (and hence can be considered a "high priority" application in certain cases). Accordingly, utility meters implemented with LTE-U/LAA in the 3.5 GHz are contemplated so as to provide the desired low latency and high data throughput. In that such meters are also often disposed in stationary locations in mostly densely populated areas, coverage by e.g., an MSO with LTE-U/LAA in 3.5 GHz service can be readily provided by a limited number of fixed CBSDs 314a.

"Smart" Infrastructure and Homes—

Monitoring temperature/humidity, security, smoke, moisture, occupancy, HVAC, water flow, breakers, and electric outlets can provide building property managers with alerts and alarms (such as directly to their mobile device vi an app) to prevent damage and respond to requests instantly without having manually monitor in the building or other infrastructure component. Monitoring of usage, and cleaning of, buildings such as shopping malls or airports can also be accomplished more efficiently, due in part to the ability to distribute a large number of low-power sensors throughout the infrastructure, and have them communicate in real time with one or more hubs or gateways that are backhauled to the MSO core. For instance, in one embodiment, the sensors include shorter-range IoT native PAN interfaces (e.g., BLE or 802.15.4) which utilize largely commoditized and inexpensive radio modem ICs, for communication with one or more hubs which are backhauled via extant DOCSIS cable drops (and corresponding DOCSIS modem) on the premises. In another embodiment, LTE-U/LAA-enabled sensors can communicate directly with the MSO CBSD(s) (such as according to a non-QoS paradigm); hence, the infrastructure owner need only place a small number of the CBSDs (again, backhauled by extant MSO service infrastructure) on the site to service the many longer-range sensors.

Advantageously, the high-bandwidth backhaul of the MSO at local service drops (e.g., the aforementioned DOCSIS modem cable drop within a building) can also be used to support multi-location visual band/IR imaging within a premises.

It is also appreciated that "smart" infrastructure such as office buildings, bridges, tunnels, universities, shopping malls, or even homes can benefit from such CBSD coverage, whether alone (e.g., with IoT-S sensor devices communicating directly with the CBSD 314a, or via an IoT PAN enabled hub or GW 314b), in that low latency can be provided for sensed data. For example, a bridge or building undergoing a seismic event (e.g., as reflected by S/P waves detected by installed sensors) can communicate such data in real time via the MSO backhaul and backbone to and end-user entity, such as USGS or the like. Such data may allow for real-time alerts or warnings; e.g., closure of a road or bridge, evacuation of a building, such as based on analysis of the data indicating a high probability of aftershocks.

Such system can also be used as a "reverse 911" system of sorts, such as where the CBRS infrastructure can push data or messaging, via the CBSD(s) 314, to correlated user devices, such as those maintained in the MSO subscriber database. For instance, MSO subscribers working in an affected office building can be immediately warned or alerted via their mobile devices (e.g., LTE-U/LAA-enabled smartphones) of an impending event or evacuation notice, either in place or in parallel with licensed spectrum or other modalities. So, for example, workers in an underground infrastructure facility could receive notifications or alerts via the local CBSD 314a on their smartphones, whereas licensed (cellular) coverage is not available due to shielding of the cellular eNB signal emitted by even the closest above-ground cell.

Agriculture—

For agriculture, irrigation control—including the use of moisture, temperature, and alkalinity sensors—can significantly improve the yield and reduce water consumption. In typical applications, the indigenous sensors need to update their information only infrequently (e.g., a few times per hour), as the conditions do not change radically over time. In one implementation, LTE-U/LAA enabled sensors throughout the agricultural area of concern may communicate with the MSOs CBSD(s) 314a, the latter fed by an extant cable drop or satellite uplink/feed. Moreover, such sensors may be used for animal tracking; e.g., wherein animals kept within a reasonably confined area may be served by a hub/GW 314b (or even directly by a CBSD 314a) via low-power consumption tags or similar devices, thereby apprising the owner or other entity of data such as temperature, light intensity, motion (e.g., via accelerometer), position (e.g., via miniature GPS receiver), and so forth.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure. The scope of the disclosure should be determined with reference to the claims.

It will be further appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

APPENDIX I

| | | Downlink (MHz) | | | Bandwidth | Uplink (MHz) | | | Duplex | Equivalent |
|---|---|---|---|---|---|---|---|---|---|---|
| Band | Name | Low | Middle EARFCN[1] | High | DL/UL (MHz) | Low | Middle EARFCN | High | spacing (MHz) | UMTS band |
| 1 | 2100 | 2110 | 2140 | 2170 | 60 | 1920 | 1950 | 1980 | 190 | 1 |
| | | 0 | 300 | 599 | | 18000 | 18300 | 18599 | | |
| 2 | 1900 PCS | 1930 | 1960 | 1990 | 60 | 1850 | 1880 | 1910 | 80 | 2 |
| | | 600 | 900 | 1199 | | 18600 | 18900 | 19199 | | |
| 3 | 1800+ | 1805 | 1842.5 | 1880 | 75 | 1710 | 1747.5 | 1785 | 95 | 3 |
| | | 1200 | 1575 | 1949 | | 19200 | 19575 | 19949 | | |
| 4 | AWS-1 | 2110 | 2132.5 | 2155 | 45 | 1710 | 1732.5 | 1755 | 400 | 4 |
| | | 1950 | 2175 | 2399 | | 19950 | 20175 | 20399 | | |
| 5 | 850 | 869 | 881.5 | 894 | 25 | 824 | 836.5 | 849 | 45 | 5 |
| | | 2400 | 2525 | 2649 | | 20400 | 20525 | 20649 | | |
| 6 | UMTS only | 875 | 880 | 885 | 10 | 830 | 835 | 840 | 45 | 6 |
| | | 2650 | 2700 | 2749 | | 20650 | 20700 | 20749 | | |
| 7 | 2600 | 2620 | 2655 | 2690 | 70 | 2500 | 2535 | 2570 | 120 | 7 |
| | | 2750 | 3100 | 3449 | | 20750 | 21100 | 21449 | | |
| 8 | 900 GSM | 925 | 942.5 | 960 | 35 | 880 | 897.5 | 915 | 45 | 8 |
| | | 3450 | 3625 | 3799 | | 21450 | 21625 | 21799 | | |
| 9 | 1800 | 1844.9 | 1862.4 | 1879.9 | 35 | 1749.9 | 1767.4 | 1784.9 | 95 | 9 |
| | | 3800 | 3975 | 4149 | | 21800 | 21975 | 22149 | | |
| 10 | AWS-1+ | 2110 | 2140 | 2170 | 60 | 1710 | 1740 | 1770 | 400 | 10 |
| | | 4150 | 4450 | 4749 | | 22150 | 22450 | 22749 | | |
| 11 | 1500 Lower | 1475.9 | 1485.9 | 1495.9 | 20 | 1427.9 | 1437.9 | 1447.9 | 48 | 11 |
| | | 4750 | 4850 | 4949 | | 22750 | 22850 | 22949 | | |
| 12 | 700 a | 729 | 737.5 | 746 | 17 | 699 | 707.5 | 716 | 30 | 12 |
| | | 5010 | 5095 | 5179 | | 23010 | 23095 | 23179 | | |
| 13 | 700 c | 746 | 751 | 756 | 10 | 777 | 782 | 787 | −31 | 13 |
| | | 5180 | 5230 | 5279 | | 23180 | 23230 | 23279 | | |
| 14 | 700 PS | 758 | 763 | 768 | 10 | 788 | 793 | 798 | −30 | 14 |
| | | 5280 | 5330 | 5379 | | 23280 | 23330 | 23379 | | |
| 17 | 700 b | 734 | 740 | 746 | 12 | 704 | 710 | 716 | 30 | |
| | | 5730 | 5790 | 5849 | | 23730 | 23790 | 23849 | | |
| 18 | 800 Lower | 860 | 867.5 | 875 | 15 | 815 | 822.5 | 830 | 45 | |
| | | 5850 | 5925 | 5999 | | 23850 | 23925 | 23999 | | |
| 19 | 800 Upper | 875 | 882.5 | 890 | 15 | 830 | 837.5 | 845 | 45 | 19 |
| | | 6000 | 6075 | 6149 | | 24000 | 24075 | 24149 | | |
| 20 | 800 DD | 791 | 806 | 821 | 30 | 832 | 847 | 862 | −41 | 20 |
| | | 6150 | 6300 | 6449 | | 24150 | 24300 | 24449 | | |
| 21 | 1500 Upper | 1495.9 | 1503.4 | 1510.9 | 15 | 1447.9 | 1455.4 | 1462.9 | 48 | 21 |
| | | 6450 | 6525 | 6599 | | 24450 | 24525 | 24599 | | |
| 22 | 3500 | 3510 | 3550 | 3590 | 80 | 3410 | 3450 | 3490 | 100 | 22 |
| | | 6600 | 7000 | 7399 | | 24600 | 25000 | 25399 | | |
| 23 | 2000 S-band | 2180 | 2190 | 2200 | 20 | 2000 | 2010 | 2020 | 180 | |
| | | 7500 | 7600 | 7699 | | 25500 | 25600 | 25699 | | |
| 24 | 1600 L-band | 1525 | 1542 | 1559 | 34 | 1626.5 | 1643.5 | 1660.5 | −101.5 | |
| | | 7700 | 7870 | 8039 | | 25700 | 25870 | 26039 | | |
| 25 | 1900+ | 1930 | 1962.5 | 1995 | 65 | 1850 | 1882.5 | 1915 | 80 | 25 |
| | | 8040 | 8365 | 8689 | | 26040 | 26365 | 26689 | | |

APPENDIX I-continued

LTE frequency bands - TS 36.101 (Rel. 14 Jun 2017)

| Band | Name | Downlink (MHz) Low / Middle EARFCN[1] / High | | | Bandwidth DL/UL (MHz) | Uplink (MHz) Low / Middle EARFCN / High | | | Duplex spacing (MHz) | Equivalent UMTS band |
|---|---|---|---|---|---|---|---|---|---|---|
| 26 | 850+ | 859 / 8690 | 876.5 / 8865 | 894 / 9039 | 35 | 814 / 26690 | 831.5 / 26865 | 849 / 27039 | 45 | 26 |
| 27 | 800 SMR | 852 / 9040 | 860.5 / 9125 | 869 / 9209 | 17 | 807 / 27040 | 815.5 / 27125 | 824 / 27209 | 45 | |
| 28 | 700 APT | 758 / 9210 | 780.5 / 9435 | 803 / 9659 | 45 | 703 / 27210 | 725.5 / 27435 | 748 / 27659 | 55 | |
| 29 | 700 d | 717 / 9660 | 722.5 / 9715 | 728 / 9769 | 11 | Downlink only | | | | |
| 30 | 2300 WCS | 2350 / 9770 | 2355 / 9820 | 2360 / 9869 | 10 | 2305 / 27660 | 2310 / 27710 | 2315 / 27759 | 45 | |
| 31 | 450 | 462.5 / 9870 | 465 / 9895 | 467.5 / 9919 | 5 | 452.5 / 27760 | 455 / 27785 | 457.5 / 27809 | 10 | |
| 32 | 1500L-band | 1452 / 9920 | 1474 / 10140 | 1496 / 10359 | 44 | Downlink only | | | | 32 |
| 65 | 2100+ | 2110 / 65536 | 2155 / 65986 | 2200 / 66435 | 90 | 1920 / 131072 | 1965 / 131522 | 2010 / 131971 | 190 | |
| 66 | AWS-3 | 2110 / 66436 | 2155 / 66886 | 2200 / 67335 | 90/70 | 1710 / 131972 | 1745 / 132322 | 1780 / 132671 | 400 | |
| 67 | 700 EU | 738 / 67336 | 748 / 67436 | 758 / 67535 | 20 | Downlink only | | | | |
| 68 | 700 ME | 753 / 67536 | 768 / 67686 | 783 / 67835 | 30 | 698 / 132672 | 713 / 132822 | 728 / 132971 | 55 | |
| 69 | 2500 | 2570 / 67836 | 2595 / 68086 | 2620 / 68335 | 50 | Downlink only | | | | |
| 70 | AWS-4 | 1995 / 68336 | 2007.5 / 68461 | 2020 / 68585 | 25/15 | 1695 / 132972 | 1702.5 / 133047 | 1710 / 133121 | 300 | |
| 252 | Unlicensed NII-1 | 5150 / 255144 | 5200 / 255644 | 5250 / 256143 | 100 | Downlink only | | | | |
| 255 | Unlicensed NII-3 | 5725 / 260894 | 5787.5 / 261519 | 5850 / 262143 | 125 | Downlink only | | | | |
| | | | | | TDD | | | | | |
| 33 | TD 1900 | 1900 / 36000 | 1910 / 36100 | 1920 / 36199 | 20 | | | | | A(lo) |
| 34 | TD 2000 | 2010 / 36200 | 2017.5 / 36275 | 2025 / 36349 | 15 | | | | | A(hi) |
| 35 | TD PCS Lower | 1850 / 36350 | 1880 / 36650 | 1910 / 36949 | 60 | | | | | B(lo) |
| 36 | TD PCS Upper | 1930 / 36950 | 1960 / 37250 | 1990 / 37549 | 60 | | | | | B(hi) |
| 37 | TD PCS Center gap | 1910 / 37550 | 1920 / 37650 | 1930 / 37749 | 20 | | | | | C |
| 38 | TD 2600 | 2570 / 37750 | 2595 / 38000 | 2620 / 38249 | 50 | | | | | D |
| 39 | TD 1900+ | 1880 / 38250 | 1900 / 38450 | 1920 / 38649 | 40 | | | | | F |
| 40 | TD 2300 | 2300 / 38650 | 2350 / 39150 | 2400 / 39649 | 100 | | | | | E |
| 41 | TD 2500 | 2496 / 39650 | 2593 / 40620 | 2690 / 41589 | 194 | | | | | |
| 42 | TD 3500 | 3400 / 41590 | 3500 / 42590 | 3600 / 43589 | 200 | | | | | |
| 43 | TD 3700 | 3600 / 43590 | 3700 / 44590 | 3800 / 45589 | 200 | | | | | |
| 44 | TD 700 | 703 / 45590 | 753 / 46090 | 803 / 46589 | 100 | | | | | |
| 45 | TD 1500 | 1447 / 46590 | 1457 / 46690 | 1467 / 46789 | 20 | | | | | |
| 46 | TD Unlicensed | 5150 / 46790 | 5537.5 / 50665 | 5925 / 54539 | 775 | | | | | |
| 47 | TD V2X | 5855 / 54540 | 5890 / 54890 | 5925 / 55239 | 70 | | | | | |
| 48 | TD 3600 | 3550 / 55240 | 3625 / 55990 | 3700 / 56739 | 150 | | | | | |

[1]EUTRA Absolute RF Channel Number

What is claimed is:

1. Computerized access node apparatus for use within a managed content distribution network, the computerized access node apparatus comprising:
processor apparatus;
first wireless interface apparatus in data communication with the processor apparatus;
quasi-licensed band wireless interface apparatus in data communication with the processor apparatus; and
storage apparatus in data communication with the processor apparatus and comprising at least one computer program, the at least one computer program comprising a plurality of instructions which are configured to, when executed by the processor apparatus, cause the computerized access node apparatus to:
establish one or more first wireless data communication sessions via the first wireless interface apparatus with a plurality of Internet-of-Things (IoT)-enabled end devices;
establish a second wireless data communication session via the quasi-licensed band wireless interface apparatus with at least one wireless access node of the managed content distribution network; and
cause transfer of data received from the plurality of IoT-enabled end devices via the one or more first wireless data communication sessions to the wireless access node via the second wireless data communication session.

2. The computerized access node apparatus of claim 1, wherein:
the first wireless interface apparatus comprises a software defined radio (SDR) apparatus, the SDR apparatus configured to communicate with the plurality of IoT-enabled devices via at least first and second IoT wireless protocols; and
the quasi-licensed band interface comprises an LTE-TDD (Long Term Evolution, time division duplex) enabled interface configured to operate in the 3.550 GHz to 3.700 GHz range using at least one of LTE bands 43 and 44; and
wherein the managed content distribution network comprises a hybrid fiber coax (HFC) cable network.

3. A managed network architecture for providing connectivity between a plurality of Internet-of-Things (IoT)-enabled devices and an IoT data consuming entity, the managed network architecture comprising:
at least one quasi-licensed band wireless access node disposed so as to be within communications range of the plurality of IoT-enabled devices;
a managed network core, the managed network core configured for data communication with an external network serving the data consuming entity;
a data communications backhaul in data communication with the at least one wireless access node and the managed network core, the data communications backhaul configured to provide backhaul and aggregation of data from the respective ones of the plurality of IoT-enabled devices to the managed network core for subsequent distribution to the data consuming entity via the external network; and
controller apparatus in data communication with the at least one wireless access node, the controller apparatus configured to:
obtain data relating to operation of the at least one wireless access node in support of the plurality of IoT-enabled devices;
determine one or more operational policies relating to the plurality of IoT-enabled devices; and
communicate data to the at least one wireless access node to implement the determined one or more operational policies.

4. The managed network architecture of claim 3, wherein the one or more operational policies comprise a QoS (quality of service) policy required by an application type associated with the plurality of IoT-enabled devices, the application type comprising a time-sensitive monitoring application, the QoS policy comprising a maximum latency requirement for delivery to the data consuming entity.

5. The managed network architecture of claim 3, wherein the one or more operational policies comprise a QoS (quality of service) policy required by an application type associated with the plurality of IoT-enabled devices, the QoS policy comprising a minimum data rate policy required by the application type.

6. The managed network architecture of claim 3, wherein the communication of the data to the at least one wireless access node to implement the determined one or more operational policies comprises application of the one or more operational policies from at least one wireless access node to an egress point of the managed network architecture.

7. A method for providing wireless connectivity for at least one Internet-of-Things (IoT)-enabled device, the at least one IoT-enabled device comprising a first wireless interface configured to use a first wireless protocol in a first frequency band, the method comprising:
establishing wireless communication according to the first wireless protocol with a first access node, the first wireless protocol comprising a Bluetooth Low Energy (BLE) protocol, the first access node comprising: (i) a second wireless interface configured to use a second wireless protocol, and (ii) an Long Term Evolution (LTE)-enabled mobile user equipment (UE) having a Bluetooth wireless interface, the second wireless protocol: (i) configured to use a quasi-licensed spectral band, and (ii) comprising an LTE-based protocol configured to utilize one or more CBRS (Citizens Broadband Radio Service) frequency bands;
establishing wireless communication according to the second wireless protocol with a second access node, the second access node comprising a wireless interface configured to use the second wireless protocol, the second access node configured to transmit data generated by the at least one IoT-enabled device to a network entity via a managed network backhaul and infrastructure; and
causing at least a portion of the data generated by the at least one IoT-enabled device to be received by the LTE-enabled mobile UE via the BLE protocol, passed via inter-process communication to the second wireless interface, and transmitted to the second access node via the LTE-based protocol.

8. The method of claim 7, wherein:
the first wireless protocol comprises a wireless personal area network (PAN) (WPAN) protocol;
the LTE-based protocol is compliant with a Long Term Evolution (LTE)-based standard;
the first frequency band comprises an ISM (industrial, scientific and medical) band; and
the one or more CBRS bands comprise a CBRS band between 3.550 and 3.700 GHz.

9. The method of claim 8, wherein the LTE-based standard comprises at least one of: (i) LTE/LTE-A, (ii) LTE-U (Long Term Evolution in unlicensed spectrum), and (iii) LTE-LAA (Long Term Evolution, Licensed Assisted Access).

10. The method of claim 8, further comprising transmitting data to a domain proxy (DP), the DP configured to communicate at least a portion of the data to a Spectrum Access System (SAS) to obtain access to the CBRS band.

11. The method of claim 8, wherein the establishing communication according to the first wireless interface and the second wireless interface comprises providing greater wireless range extension for the at least one IoT-enabled device as compared to communication via the first wireless interface alone.

12. The method of claim 7, further comprising applying a QoS (quality of service) policy for the transmitted data over at least the managed network backhaul and infrastructure.

13. The method of claim 12, wherein the at least one IoT-enabled device comprises a plurality of IoT-enabled devices having respective ones of QoS requirements, and the method further comprises applying respective ones of QoS policies to transmitted data associated with each of the plurality of IoT-enabled devices.

14. The method of claim 12, further comprising:
gathering a plurality of data relating to the transmitted data of the at least one IoT-enabled device over a period of time;
algorithmically analyzing the gathered plurality of data to identify one or more characteristics of the transmitted data as a function of time;
generating an operational policy, the operational policy based at least on the algorithmic analysis; and
transmitting one or more commands to the second access node, the one or more commands configured to cause the second access node to subsequently adjust at least one aspect of the established communication via the second wireless protocol.

15. The method of claim 14, wherein the subsequent adjustment of the at least one aspect of the established communication via the second wireless protocol comprises at least one of: (i) causing the second access node to cause the first access node, via the second wireless protocol, to transition from a first CBRS frequency band to a second CBRS frequency band; and (ii) causing the second access node to cause the first access node, via the second wireless protocol, to transition from a first time-frequency resource allocation to a second time-frequency resource allocation.

16. The method of claim 14, wherein the subsequent adjustment of the at least one aspect of the established communication via the second wireless protocol comprises causing the second access node to cause the first access node, via the second wireless protocol, to transition from communication with the second access node to a third access node, the third access node within range of the first access node via the second wireless protocol.

17. A method for providing wireless connectivity for at least one Internet-of-Things (IoT)-enabled device, the device comprising a first wireless interface configured to use a first wireless protocol in a first frequency band, the method comprising:
establishing wireless communication according to the first wireless protocol with an access node, the first wireless protocol configured to use a quasi-licensed radio frequency (RF) spectral band, the access node configured to transmit data generated by the at least one IoT-enabled device to a network entity via a managed content distribution network backhaul and infrastructure;
determining an application type used by the at least IoT enabled device to generate the data; and
applying at least one data policy to at least a portion of the generated data as part of the transmission thereof, the applying of the at least one data policy to at least the portion of the generated data as part of the transmission thereof comprising applying the at least one data policy from at least the access node to an egress point of the managed content distribution network.

18. The method of claim 17, wherein the at least one data policy comprises a QoS (quality of service) policy required by the determined application type.

19. The method of claim 18, wherein the determined application type comprises a time-sensitive monitoring application, and the QoS policy comprises a maximum latency requirement.

20. The method of claim 17, wherein the at least one policy comprises a minimum data rate policy required by the determined application type.

* * * * *